(12) United States Patent
Tateishi et al.

(10) Patent No.: US 10,355,589 B2
(45) Date of Patent: *Jul. 16, 2019

(54) SWITCHING REGULATOR

(71) Applicant: Rohm Co., Ltd., Kyoto (JP)

(72) Inventors: Tetsuo Tateishi, Kyoto (JP); Yuhei Yamaguchi, Kyoto (JP); Shingo Hashiguchi, Kyoto (JP); Kiyotaka Umemoto, Kyoto (JP)

(73) Assignee: Rohm Co., Ltd., Kyoto (JP)

( * ) Notice: Subject to any disclaimer, the term of this patent is extended or adjusted under 35 U.S.C. 154(b) by 398 days.

This patent is subject to a terminal disclaimer.

(21) Appl. No.: 15/133,384

(22) Filed: Jun. 28, 2016

(65) Prior Publication Data

US 2016/0373009 A1    Dec. 22, 2016

(30) Foreign Application Priority Data

Apr. 23, 2015   (JP) ................................. 2015-088340
May 27, 2015    (JP) ................................. 2015-107136
Jun. 19, 2015   (JP) ................................. 2015-123961
Apr. 1, 2016    (JP) ................................. 2016-073796

(51) Int. Cl.
*H02M 3/156*   (2006.01)
*H02M 3/158*   (2006.01)

(52) U.S. Cl.
CPC ............ *H02M 3/156* (2013.01); *H02M 3/158* (2013.01)

(58) Field of Classification Search
CPC .............................. H02M 3/156; H02M 3/158
USPC ......................................................... 307/10.1
See application file for complete search history.

(56) References Cited

U.S. PATENT DOCUMENTS

| | | |
|---|---|---|
| 6,977,488 B1 | 12/2005 | Nogawa et al. |
| 2014/0354250 A1* | 12/2014 | Deng .................. H02M 3/1582 323/271 |
| 2017/0237271 A1* | 8/2017 | Kelly-Morgan ...... H02J 7/0026 320/166 |

FOREIGN PATENT DOCUMENTS

JP           3556652        5/2004

* cited by examiner

*Primary Examiner* — Carlos Amaya
(74) *Attorney, Agent, or Firm* — Fish & Richardson P.C.

(57) ABSTRACT

In a switching regulator, a first switch and a second switch are turned ON and OFF complementarily according to an output voltage. In a step-up/down mode, a third switch and a fourth switch are turned ON and OFF complementarily while the ON-duty D of the third switch is kept fixed.

30 Claims, 37 Drawing Sheets

STEP-DOWN MODE | STEP-UP/DOWN MODE | STEP-DOWN MODE

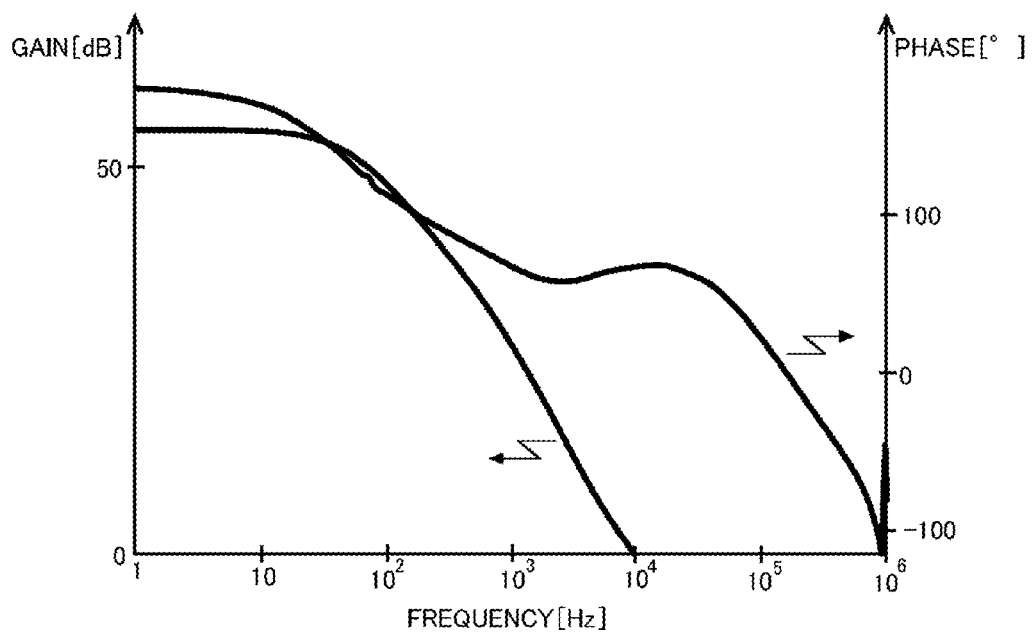

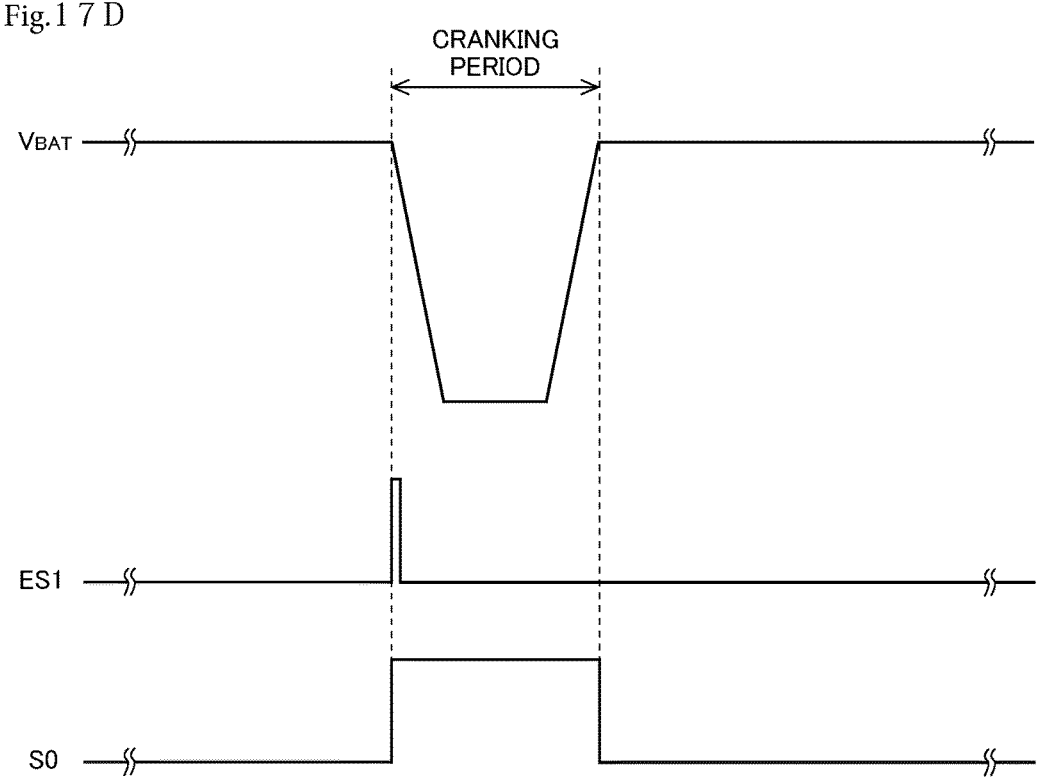

SWITCHING REGULATOR

CROSS-REFERENCE TO RELATED APPLICATIONS

This nonprovisional application claims priority under 35 U.S.C. § 119(a) on Patent Application No. 2015-88340 filed in Japan on Apr. 23, 2015, Patent Application No. 2015-107136 filed in Japan on May 27, 2015, Patent Application No. 2015-123961 filed in Japan on Jun. 19, 2015, and Patent Application No. 2016-73796 filed in Japan on Apr. 1, 2016, the entire contents of which are hereby incorporated by reference.

BACKGROUND OF THE INVENTION

Field of the Invention

The present invention relates to step-up/down switching regulators.

Description of Related Art

In start-stop (reduced-idling) vehicles, in which the engine is restarted many times, during a period when the engine is stopped temporarily, the electric power of the battery keeps being consumed by vehicle-mounted appliances such as audiovisual and air-conditioning equipment. Such vehicles thus suffer a severer drop then ever in the battery voltage at the time of cranking (when the engine is restarted). By use of a step-up/down switching regulator, which holds the output voltage on occurrence of a drop in the input voltage (battery voltage), it is possible to let vehicle-mounted appliances operate normally even on occurrence of a sharp drop in the battery voltage at the time of cranking.

Accordingly, needs for step-up/down switching regulators are increasing in the market of vehicle-mounted appliances.

A description will now be given of the configuration and operation of a common step-up/down switching regulator. FIG. 38 is a diagram showing the configuration of a common step-up/down switching regulator.

The switching regulator shown in FIG. 38 includes MOS transistors Q11 and Q12 as step-down switches, an inductor L11, MOS transistors Q13 and Q14 as step-up switches, an output capacitor C11, resistors R11 to R14, and a controller CNT11.

The controller CNT11 monitors the output voltage $V_{OUT}$ on the basis of the output of a voltage division circuit constituted by the resistors R11 and R12, and monitors the battery voltage $V_{BAT}$ on the basis of the output of a voltage division circuit constituted by the resistors R13 and R14.

When the battery voltage $V_{BAT}$ is higher than a first predetermined value A1, the controller CNT11 selects a step-down mode (see FIG. 39). In the step-down mode, the controller CNT11 turns ON and OFF the MOS transistors Q11 and Q12 according to the output voltage $V_{OUT}$, while keeping the MOS transistor Q13 OFF and the MOS transistor Q14 ON all the time. As a result, a first switching voltage $V_{SW1}$, which is the voltage at the connection node between the MOS transistors Q11 and Q12, and a second switching voltage $V_{SW2}$, which is the voltage at the connection node between the MOS transistors Q13 and Q14, behave as shown in FIG. 40A.

When the battery voltage $V_{BAT}$ is equal to or lower than the first predetermined value A1 but higher than a second predetermined value A2, the controller CNT11 selects a step-up/down mode (see FIG. 39). In the step-up/down mode, the controller CNT11 turns ON and OFF the MOS transistors Q11 and Q12 according to the output voltage $V_{OUT}$, and turns ON and OFF the MOS transistors Q13 and Q14 according to the output voltage $V_{OUT}$. As a result, the first switching voltage $V_{SW1}$, which is the voltage at the connection node between the MOS transistors Q11 and Q12, and the second switching voltage $V_{SW2}$, which is the voltage at the connection node between the MOS transistors Q13 and Q14, behave as shown in FIG. 40B.

When the battery voltage $V_{BAT}$ is equal to or lower than the second predetermined value A2, the controller CNT11 selects a step-up mode (see FIG. 39). In the step-up mode, the controller CNT11, while keeping the MOS transistor Q11 ON and the MOS transistor Q12 OFF all the time, turns ON and OFF the MOS transistors Q13 and Q14 according to the output voltage $V_{OUT}$. As a result, the first switching voltage $V_{SW1}$, which is the voltage at the connection node between the MOS transistors Q11 and Q12, and the second switching voltage $V_{SW2}$, which is the voltage at the connection node between the MOS transistors Q13 and Q14, behave as shown in FIG. 40C.

In the step-up/down and step-up modes, in which the MOS transistors Q13 and Q14 perform step-up operation, the transfer function H(s) of the PWM (pulse-width modulation) modulator constituted by the MOS transistors Q13 and Q14 in the step-up/down switching regulator shown in FIG. 38 includes a term T(s) that is given by formula (1) below.

$$T(s) = 1 - \frac{\alpha L \bar{I}_L}{(1-D)\bar{V}_{OUT}} s \quad (1)$$

where $\bar{I}_L$ represents the average current through the inductor L11;

L represents the inductance value of the inductor L11;

$\bar{V}_{OUT}$ represents the average value of the output voltage $V_{OUT}$;

D represents the ON-duty of the MOS transistor Q13; and

α represents the constant of proportion.

The term T(s) given by formula (1) above represents right-half-plane-zero characteristics (characteristics in which a zero point exists in the right half plane). With the step-up/down switching regulator shown in FIG. 38, a satisfactory response is expected only in a range lower than the frequency f given by formula (2) below. Formula (2) below is obtained by substituting s=jω=j·2πf in formula (1) above.

$$f = \frac{1}{2\pi} \cdot \frac{(1-D)\bar{V}_{OUT}}{\alpha L \bar{I}_L} \quad (2)$$

One way to improve the response is to increase the capacitance of the output capacitor C11 in the step-up/down switching regulator shown in FIG. 38. Another way is to switch to a configuration in which a step-down switching regulator portion is provided in a stage subsequently to a step-up switching regulator portion.

However, the former measure suffers from increased cost for the output capacitor C11, and the latter measure suffers from increased cost for reactors because the step-up and step-down switching regulator portions each require a separate reactor.

Japanese Patent No. 3556652 (claim 7, FIG. 11) discloses a DC-DC converter that solves the above problems. Inconveniently, however, its circuit configuration is such that the duty of a first control signal generated by a feedforward control circuit depends on the input voltage; consequently, if the duty causes linear variation in the transfer function of the DC-DC converter, it is difficult to compensate for.

SUMMARY OF THE INVENTION

An object of the present invention is to provide a step-up/down switching regulator that can be prevented from having right-half-plane-zero characteristics while suppressing an increase in cost and that exhibits response characteristics similar to step-down characteristics.

According to one aspect of what is disclosed herein, a switching regulator for generating an output voltage from an input voltage includes: a first switch of which the first end is connected to a first application terminal to which the input voltage is applied; a second switch of which the first end is connected to the second end of the first switch and of which the second end is connected to a second application terminal to which a predetermined voltage lower than the input voltage is applied; an inductor of which the first end is connected to the connection node between the first and second switches; a third switch of which the first end is connected to the second end of the inductor and of which the second end is connected to the second application terminal; a fourth switch of which the first end is connected to the connection node between the inductor and the third switch and of which the second end is connected to a third application terminal to which the output voltage is applied; a first control circuit that generates a step-down control signal for complementarily turning ON and OFF the first and second switches according to the output voltage; and a second control circuit that generates a step-up control signal for complementarily turning ON and OFF the third and fourth switches while keeping the ON-duty D ($0 \le D \le 1$) of the third switch fixed at a fixed value D' ($0 < D' < 1$) in a step-up/down mode.

According to another aspect of what is disclosed herein, a switching regulator for generating an output voltage from an input voltage includes: a first switch of which the first end is connected to a first application terminal to which the input voltage is applied; a second switch of which the first end is connected to the second end of the first switch and of which the second end is connected to a second application terminal to which a predetermined voltage lower than the input voltage is applied; an inductor of which the first end is connected to the connection node between the first and second switches; a third switch of which the first end is connected to the second end of the inductor and of which the second end is connected to the second application terminal; a fourth switch of which the first end is connected to the connection node between the inductor and the third switch and of which the second end is connected to a third application terminal to which the output voltage is applied; a first control circuit that generates a step-down control signal for complementarily turning ON and OFF the first and second switches according to the output voltage; and a second control circuit that generates a step-up control signal for complementarily turning ON and OFF the third and fourth switches while setting the ON-duty of the third switch independently of either of the output voltage and the input voltage in a step-up/down mode.

The significance and effect of the present invention will become clear from the description of embodiments that follows. It should however be understood that the embodiments disclosed herein are merely examples of how the present invention can be implemented, and that the meanings of the terms referring to various elements and features of the present invention are not limited to those in which those terms are used in the following description of embodiments.

BRIEF DESCRIPTION OF THE DRAWINGS

FIG. 7C is a Bode plot in a step-up/down mode after gain compensation;

FIG. 17D is a diagram showing an outline of waveforms of a battery voltage, an external signal, and a cranking period signal;

DETAILED DESCRIPTION OF PREFERRED EMBODIMENTS

Overall Configuration (First Embodiment)

Figure 1:
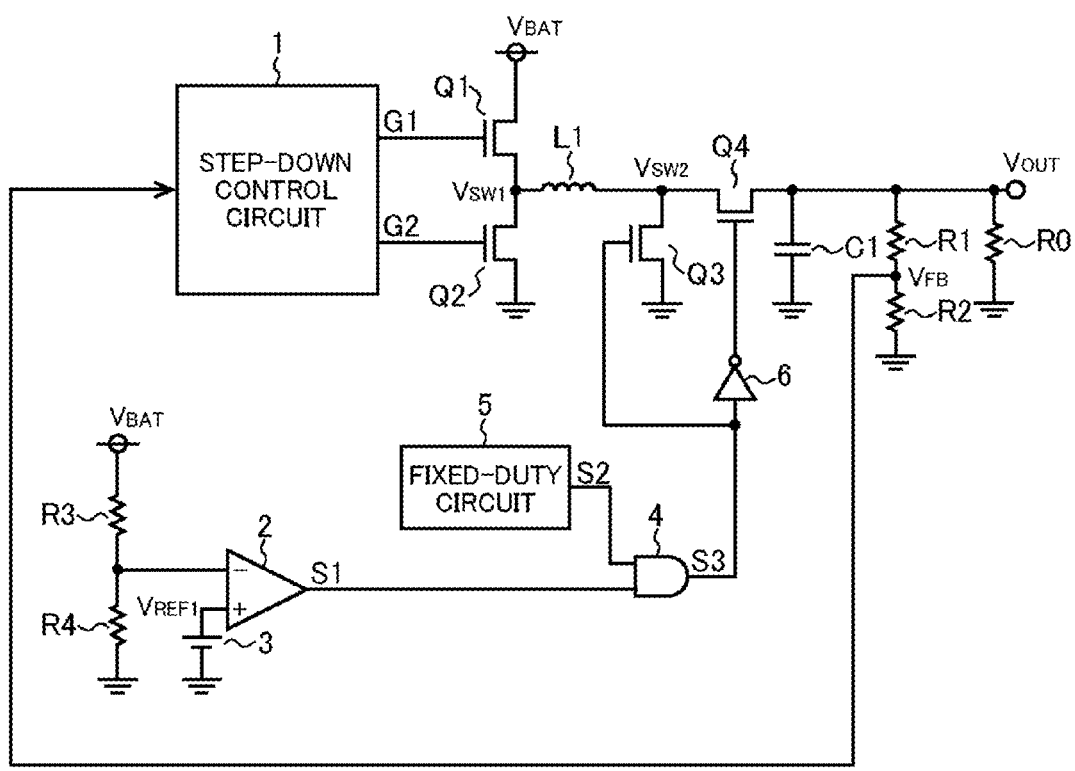
FIG. 1 is a diagram showing an exemplary overall configuration of a switching regulator according to a first embodiment of the present invention.

FIG. 1 is a diagram showing an exemplary overall configuration of a switching regulator according to a first embodiment of the present invention. The switching regulator 101 of this exemplary configuration is a step-up/down switching regulator, and includes a step-down control circuit 1, MOS transistors Q1 to Q4, an inductor L1, an output capacitor C1, an output resistor R0, a voltage division resistors R1 to R4, a comparator 2, a reference voltage source 3, an AND gate 4, a fixed-duty circuit 5, and a NOT gate 6.

The MOS transistor Q1 is an N-channel MOS transistor, and is one example of a switch that switches between a conducting state and a cut-off state a current path that leads from an input voltage application terminal, to which a battery voltage $V_{BAT}$ is applied as an input voltage, to one end of the inductor L1. The drain of the MOS transistor Q1 is connected to the input voltage application terminal, to which the battery voltage $V_{BAT}$ is applied. The source of the MOS transistor Q1 is connected to one end of the inductor L1 and to the drain of the MOS transistor Q2.

The MOS transistor Q2 is an N-channel MOS transistor, and is one example of a switch that switches between a conducting state and a cut-off state a current path that leads from a ground terminal to one end of the inductor L1. The drain of the MOS transistor Q2 is connected, as described above, to one end of the inductor L1 and to the source of the MOS transistor Q1. The source of the MOS transistor Q2 is connected to the ground terminal. A diode may be used instead of the MOS transistor Q2.

The MOS transistor Q3 is an N-channel MOS transistor, and is one example of a switch that switches between a conducting state and a cut-off state a current path a current path that leads from the other end of the inductor L1 to the ground terminal. The drain of the MOS transistor Q3 is connected to the other end of the inductor L1. The source of the MOS transistor Q3 is connected to the ground terminal.

The MOS transistor Q4 is an N-channel MOS transistor, and is one example of a switch that switches between a conducting state and a cut-off state a current path that leads from the other end of the inductor L1 to an output voltage application terminal, to which an output voltage $V_{OUT}$ is applied. The drain of the MOS transistor Q4 is connected to the other end of the inductor L1 and to the drain of the MOS transistor Q3. The source of the MOS transistor Q4 is connected to one end of the output capacitor C1 and to the output voltage application terminal, to which the output voltage $V_{OUT}$ is applied. The other end of the output capacitor C1 is grounded. A diode may be used instead of the MOS transistor Q4.

The output capacitor C1 is a smoothing capacitor for reducing ripples in the output voltage $V_{OUT}$. The output voltage $V_{OUT}$ is subjected also to phase compensation by a phase compensation circuit that is constituted by the output capacitor C1 and the output resistor R0.

The voltage division resistors R1 and R2 divide the output voltage $V_{OUT}$ to produce a feedback voltage $V_{FB}$, and feeds the feedback voltage $V_{FB}$ to the step-down control circuit 1.

The step-down control circuit 1 generates, for the MOS transistors Q1 and Q2 respectively, gate signals G1 and G2 for turning ON and OFF the MOS transistors Q1 and Q2 in a complementary fashion according to the feedback voltage $V_{FB}$, and feeds the gate signals G1 and G2 to the gates of the MOS transistors Q1 and Q2 respectively. Preferably, a dead time in which the MOS transistors Q1 and Q2 are both OFF is provided during the ON-OFF transition of the MOS transistors Q1 and Q2.

The comparator 2 compares a division voltage of the battery voltage $V_{BAT}$, which is produced by the voltage division resistors R3 and R4, with a first reference voltage $V_{REF1}$, which is output from the reference voltage source 3. The comparator 2 turns an output signal S1 to high level when the division voltage of the battery voltage $V_{BAT}$ is equal to or lower than the first reference voltage $V_{REF1}$, and turns the output signal S1 to low level when the division voltage of the battery voltage $V_{BAT}$ is higher than the first reference voltage $V_{REF1}$. A hysteresis comparator may be used as the comparator 2 so that hysteresis is introduced in the check of whether or not the division voltage of the battery voltage $V_{BAT}$ is equal to or lower than the first reference voltage $V_{REF1}$.

The AND gate 4 outputs a signal S3 that is the logical product of the output signal S1 of the comparator 2 and a pulse signal S2, which is a fixed-ON-duty signal output from the fixed-duty circuit 5.

The output signal S3 of the AND gate 4 is, on one hand, fed to the gate of the MOS transistor Q3, and is, on the other hand, logically inverted by the NOT gate 6 and then fed to the gate of the MOS transistor Q4. Preferably, a dead-time generation circuit is used instead of the NOT gate 6 so that a dead time in which the MOS transistors Q3 and Q4 are both OFF is provided during the ON-OFF transition of the MOS transistors Q3 and Q4.

Figure 2A:
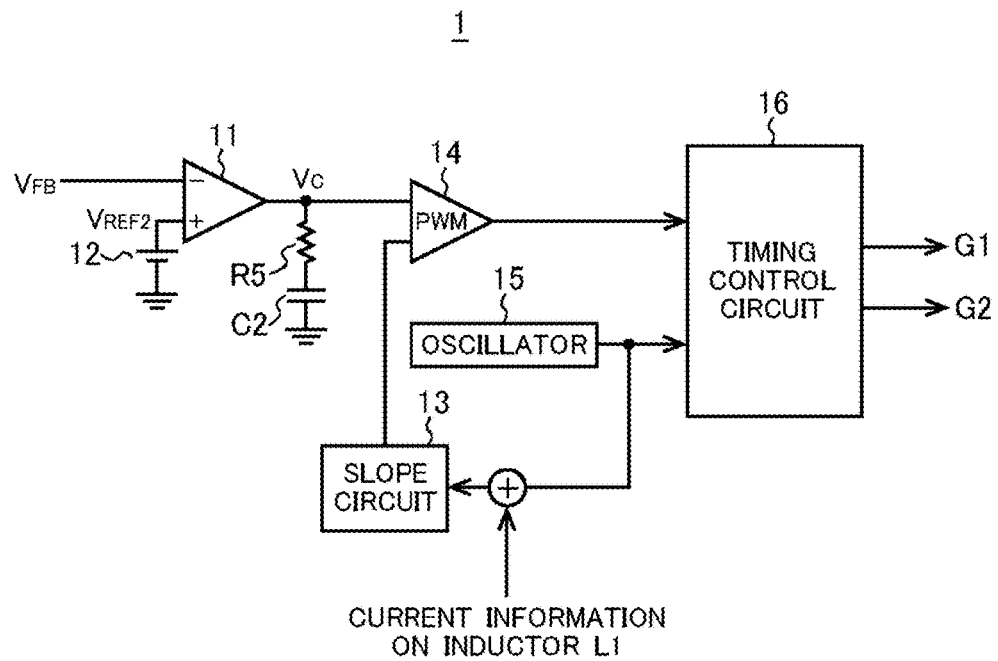
FIG. 2A is a diagram showing one exemplary configuration of a step-down control circuit in the first embodiment.

Exemplary Configuration of the Step-Down Control Circuit:

FIG. 2A is a diagram showing one exemplary configuration of the step-down control circuit 1. In the example shown in FIG. 2A, the step-down control circuit 1 includes an error amplifier 11, a reference voltage source 12, a resistor R5, a capacitor C2, a slope circuit 13, a comparator 14, an oscillator 15, and a timing control circuit 16.

The error amplifier 11 generates an error signal that is commensurate with the difference between the feedback voltage $V_{FB}$ and a second reference voltage $V_{REF2}$, which is output from the reference voltage source 12. The error signal is subjected to phase compensation by a phase compensation circuit that is constituted by the resistor R5 and the capacitor C2.

The slope circuit 13 is controlled on the basis of a clock signal of a predetermined frequency that is output from the oscillator 15, and has current information as to the inductor L1. The slope circuit 13 generates and outputs a slope voltage that reflects the current information as to the inductor L1. Thus, the switching regulator 101 is configured as a so-called current-mode-control switching regulator. The current information as to the inductor L1 can be acquired, for example, by a current detector (unillustrated) that is provided so as to detect the current that passes through the MOS transistor Q1, or by a current detector (unillustrated) that is provided so as to detect the current that passes through the MOS transistor Q2.

The comparator 14 compares the phase-compensated error signal with the output voltage of the slope circuit 13 to generate a reset signal as a comparison signal. The slope voltage generated by the slope circuit 13 has a fixed cycle, and thus the reset signal is a PWM signal.

The oscillator 15 feeds a clock signal of a predetermined frequency to the slope circuit 13 as described above, and also feeds it as a clock signal of a predetermined frequency to the timing control circuit 16.

The timing control circuit 16 turns the gate signal G1 from low level to high level when the set signal turns from high level to low level, and turns the gate signal G1 from high level to low level when the reset signal turns from low level to high level.

Figure 2B:
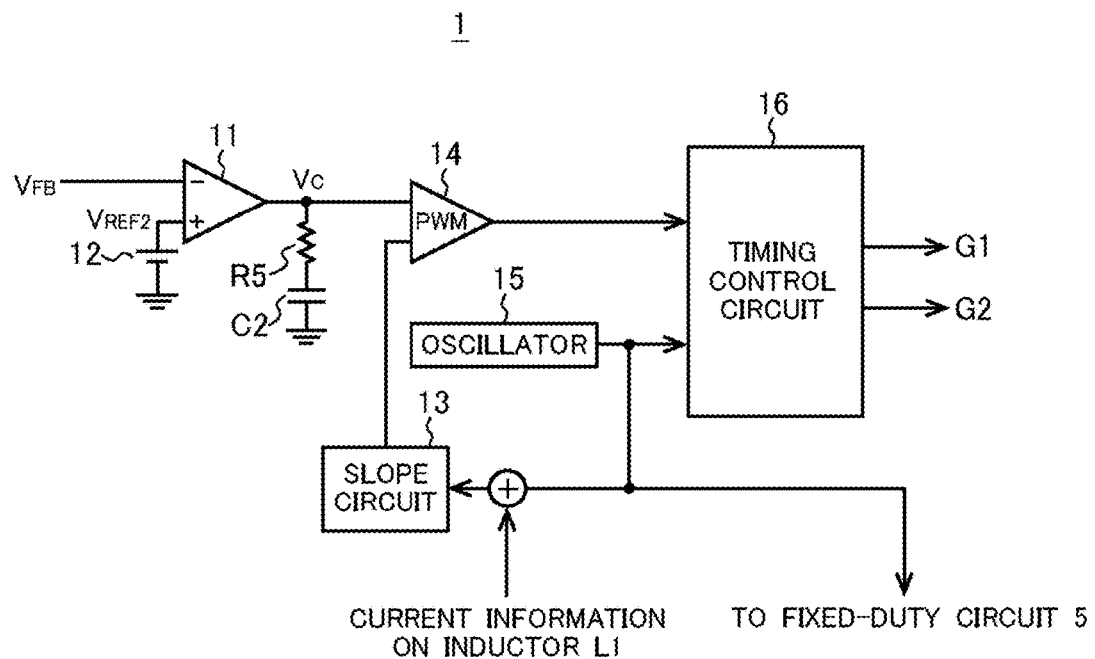
FIG. 2B is a diagram showing another exemplary configuration of a step-down control circuit in the first embodiment.

FIG. 2B is a diagram showing another exemplary configuration of the step-down control circuit 1. In the example shown in FIG. 2B, the oscillator 15 feeds the clock signal of the predetermined frequency, as well as to the slope circuit 13 and the timing control circuit 16, also to the fixed-duty circuit 5. In this case, the fixed-duty circuit 5 generates the pulse signal S2 on the basis of the clock signal of the predetermined frequency output from the oscillator 15. By contrast, in the example shown in FIG. 2A described previously, the fixed-duty circuit 5 has an oscillator that is separate from the one provided in the step-down control circuit 1.

Figure 3:
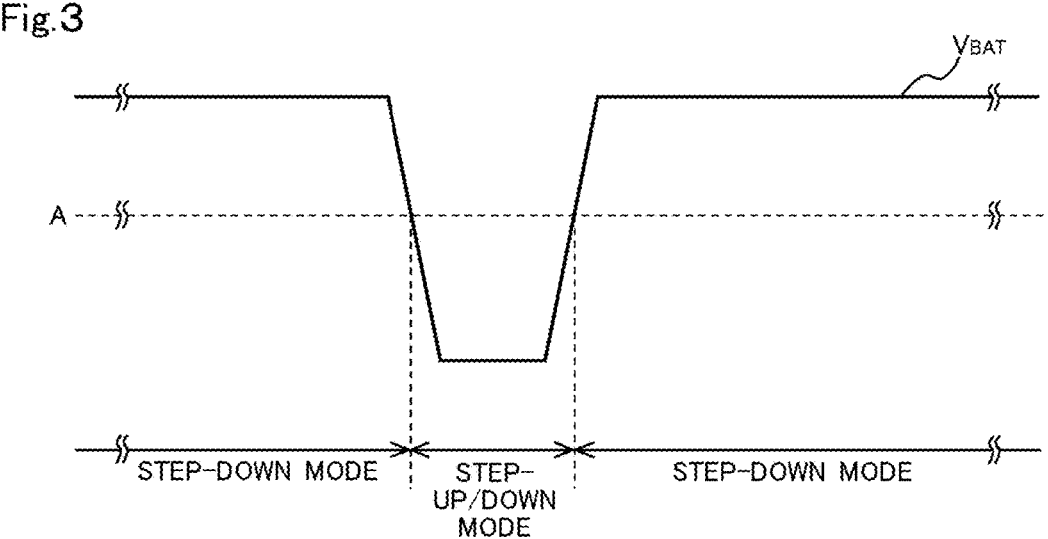
FIG. 3 is a diagram showing an outline of a waveform of a battery voltage.
Figure 4A:
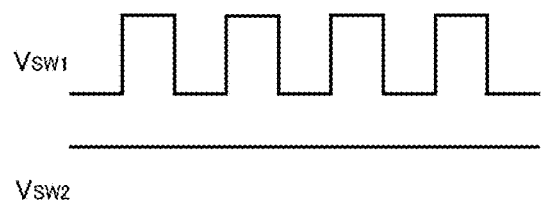
FIG. 4A is a diagram showing an outline of waveforms of switching voltages in a step-down mode.

Operation Modes:

When the division voltage of the battery voltage $V_{BAT}$ is higher than the first reference voltage $V_{REF1}$, that is, when the battery voltage $V_{BAT}$ is higher than a predetermined value A, the switching regulator 101 operates in a step-down mode (see FIG. 3). In the step-down mode, the step-down control circuit 1 turns ON and OFF the MOS transistors Q1 and Q2 according to the feedback voltage $V_{FB}$; meanwhile, the output signal S1 of the comparator 2 remains at low level, so that the MOS transistor Q3 is kept OFF and the MOS transistor Q4 is kept ON. As a result, a first switching voltage $V_{SW1}$, which is the voltage at the connection node between the MOS transistors Q1 and Q2, and a second switching voltage $V_{SW2}$, which is the voltage at the connection node between the MOS transistors Q3 and Q4, behave as shown in FIG. 4A.

In the step-down mode, the transfer characteristics of the entire switching regulator 101 are expressed by formula (3) below.

$$\frac{\Delta V_{OUT}}{\Delta V_C} = \frac{R}{R_s} \cdot \frac{1}{1 + R \cdot C \cdot s} \tag{3}$$

where $V_C$ represents the output voltage of the error amplifier 11;
R represents the resistance value of the output resistor R0;
$R_S$ represents the current sense gain; and
C represents the capacitance of the output capacitor C1.

Figure 4B:
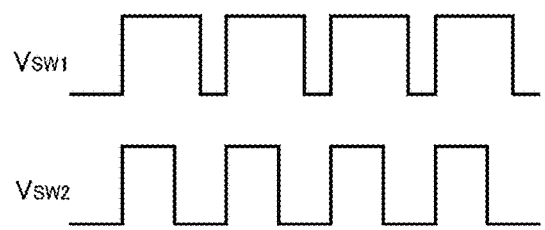
FIG. 4B is a diagram showing an outline of waveforms of switching voltages in a step-up/down mode.

On the other hand, when the division voltage of the battery voltage $V_{BAT}$ is equal to or lower than the first reference voltage $V_{REF1}$, that is, when the battery voltage $V_{BAT}$ is equal to or lower than the predetermine value A, the switching regulator 101 operates in a step-up/down mode (see FIG. 3). In the step-up/down mode, the step-down control circuit 1 turns ON and OFF the MOS transistors Q1 and Q2 according to the feedback voltage $V_{FB}$; meanwhile, the output signal S1 of the comparator 2 remains at high level, so that, while the ON-duty D (0≤D≤1) of the MOS transistor Q3 is kept at a fixed value D' (0<D'<1), the MOS transistors Q3 and Q4 are turned ON and OFF in a complementary fashion. As a result, the first switching voltage $V_{SW1}$, which is the voltage at the connection node between the MOS transistors Q1 and Q2, and the second switching voltage $V_{SW2}$, which is the voltage at the connection node between the MOS transistors Q3 and Q4, behave as shown in FIG. 4B. In the step-up/down mode, the ON-duty D of the MOS transistor Q3 is set independently of either of the output voltage $V_{OUT}$ and the battery voltage $V_{BAT}$.

Preferably, the fixed value D' is set at 0.7 or less. This makes it possible to sufficiently suppress variation in the output voltage $V_{OUT}$ in the step-up/down mode. It is then also possible to guarantee an output voltage $V_{OUT}$ of 5 [V] even if, with a 10% margin taken into consideration, the battery voltage $V_{BAT}$ falls to 2 [V]. That is, the value 0.7 can be determined according to the formula 0.1+(5 [V]−2 [V])/5 [V].

In the step-up/down mode, the transfer characteristics of the entire switching regulator 101 are expressed by formula (4) below.

$$\frac{\Delta V_{OUT}}{\Delta V_C} = \frac{R}{R_s} \cdot (1 - D') \cdot \frac{1}{1 + R \cdot C \cdot s} \qquad (4)$$

where $V_C$ represents the output voltage of the error amplifier 11;
R represents the resistance value of the output resistor R0;
$R_S$ represents the current sense gain;
C represents the capacitance of the output capacitor C1; and
D' represents the ON-duty (fixed value) of the MOS transistor Q3.

Figure 5:
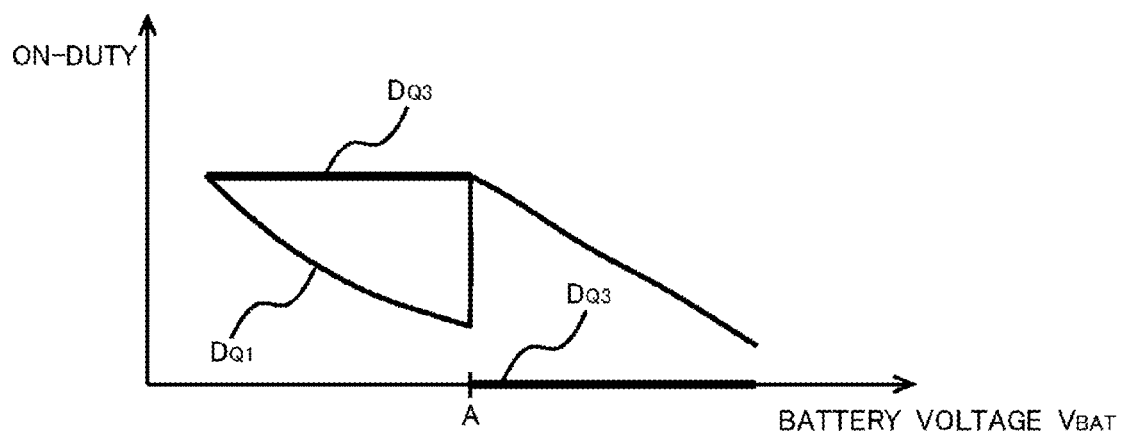
FIG. 5 is a diagram showing ON-duties of MOS transistors Q1 and Q3.

As a result of step-down operation in the step-down mode and step-up/down operation in the step-up/down mode as described above, the ON-duties $D_{Q1}$ and $D_{Q3}$ of the MOS transistors Q1 and Q3, respectively, are as shown in FIG. 5.

From formulae (3) and (4) above, it is seen that the transfer characteristics of the entire switching regulator 101 in the step-up/down mode are given by multiplying together (1−D') and the transfer characteristics of the entire switching regulator 101 in the step-down mode. This makes the response characteristics of the switching regulator 101 in the step-up/down mode similar to the response characteristics of the switching regulator 101 in the step-down mode. Thus, the transfer function of the switching regulator 101 in the step-up/down mode does not have right-half-plane-zero characteristics. This eliminates the need to give the output capacitor C1 a high capacitance, and thus helps suppress the cost of the output capacitor.

Moreover, the switching regulator 101 is configured so as not to require separate reactors in a step-up switching regulator portion and in a step-down switching regulator portion, and this helps suppress the cost of reactors.

Figure 6:
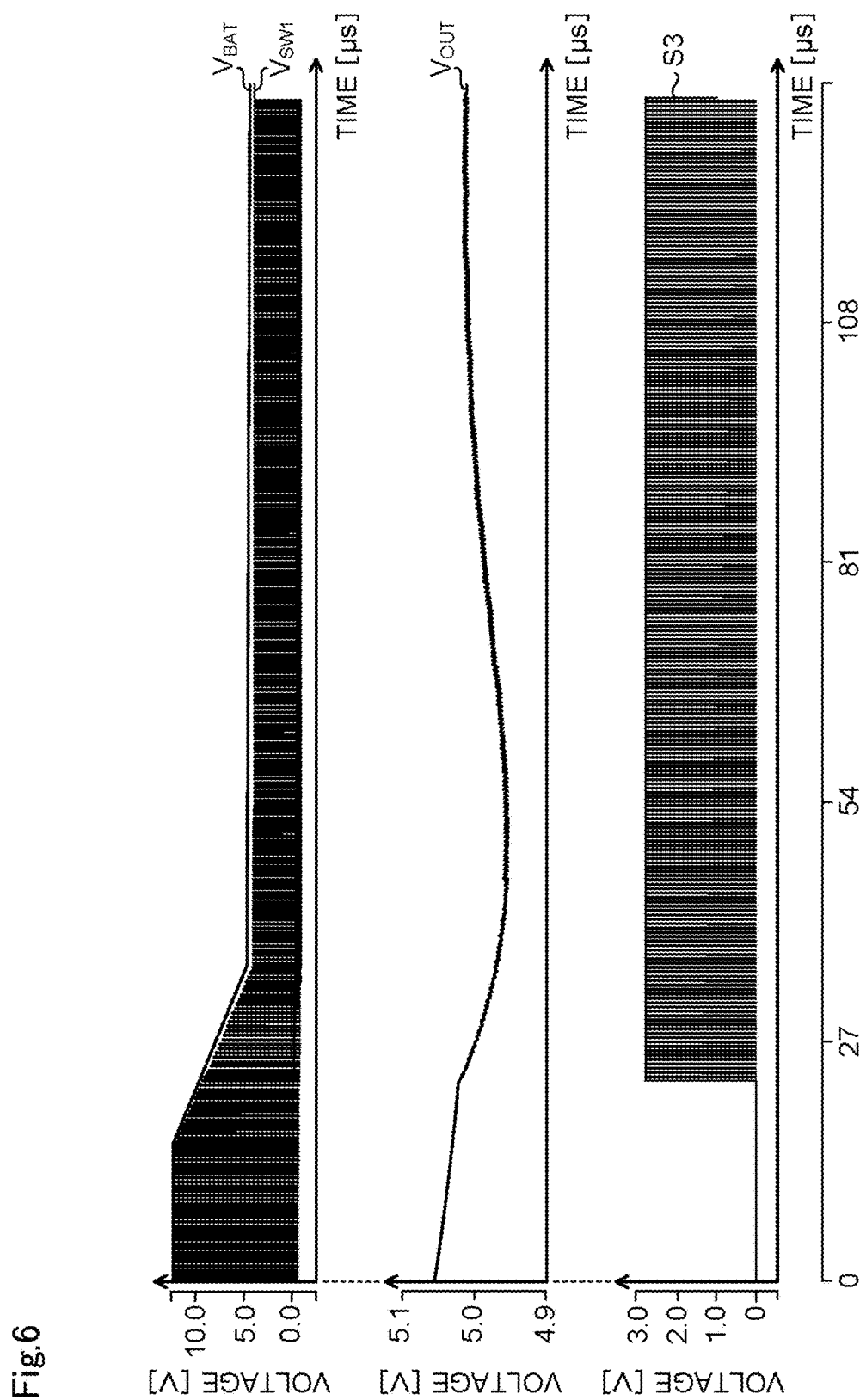
FIG. 6 is a diagram showing results of a simulation of a drop in a battery voltage $V_{BAT}$.

FIG. 6 shows the results of a simulation performed to study how the first switching voltage $V_{SW1}$, the output voltage $V_{OUT}$, and the output signal S3 of the AND gate 4 behave in the switching regulator 101 when the battery voltage $V_{BAT}$ falls from 12.4 [V] to 4.9 [V]. According to the simulation results shown in FIG. 6, the output voltage $V_{OUT}$ immediately before the shift from the step-down mode to the step-up/down mode is 5.02 [V], and the minimum value of the output voltage $V_{OUT}$ in the step-up/down mode is 4.95 [V]; throughout the transition from the step-down mode to the step-up/down mode, the output voltage $V_{OUT}$ remains approximately constant. That is, the simulation confirms that the switching regulator 101 has a good response in the step-up/down mode.

Figure 7A:
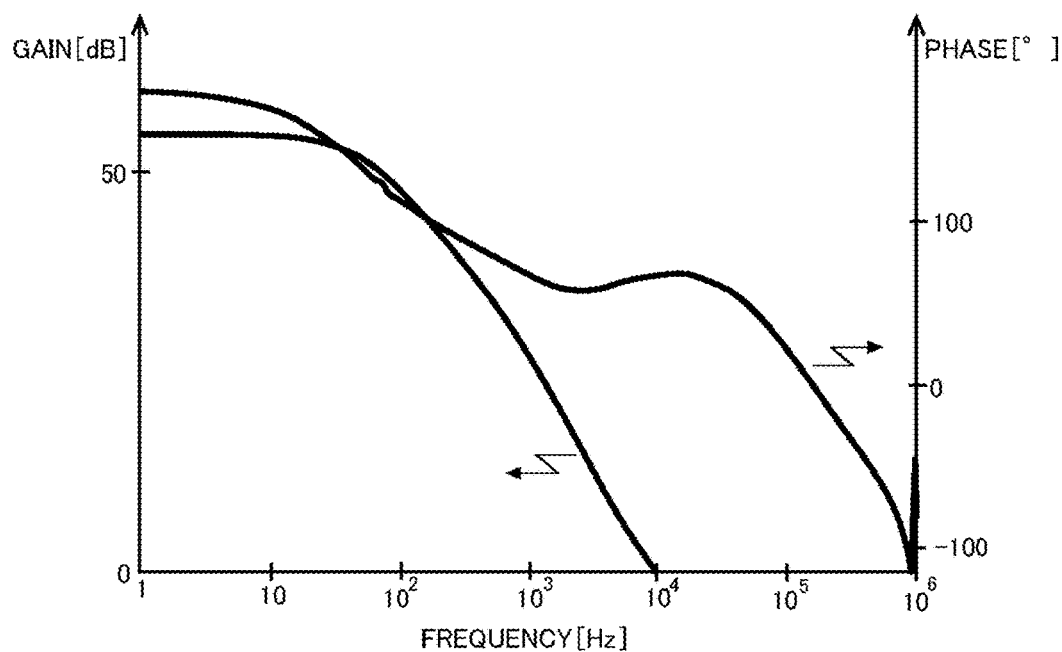
FIG. 7A is a Bode plot in a step-down mode.
Figure 7B:
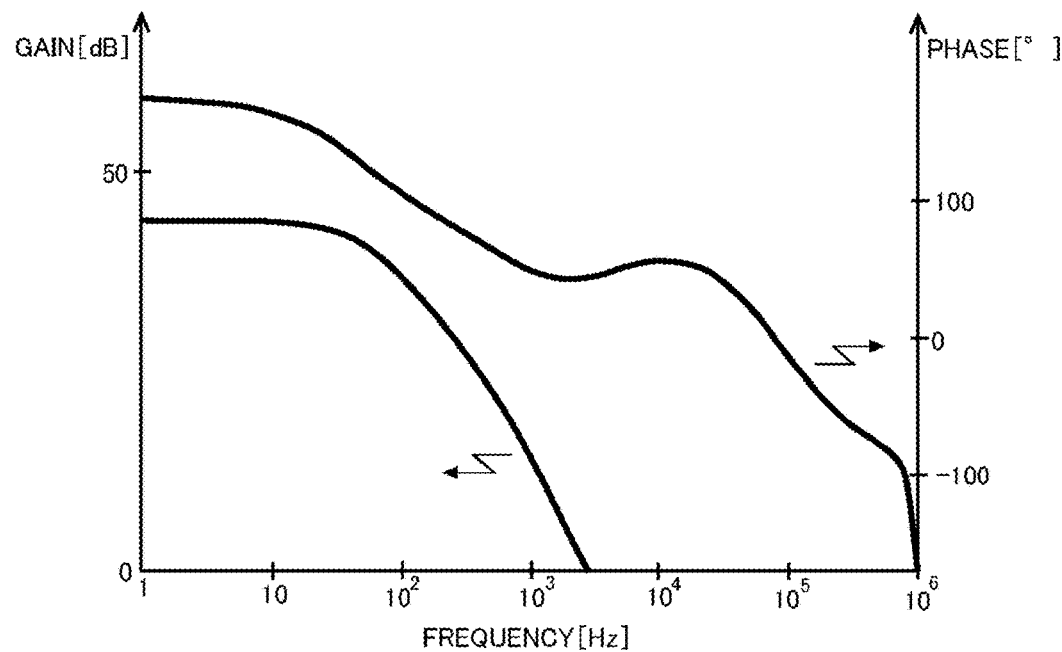
FIG. 7B is a Bode plot in a step-up/down mode.

FIGS. 7A and 7B show the results of simulations performed to study Bode plots of the switching regulator 101. FIG. 7A is a Bode plot obtained assuming that the battery voltage $V_{BAT}$ is 12 [V] and the output voltage $V_{OUT}$ is 5 [V], that is, in the step-down mode, and FIG. 7B is a Bode plot obtained assuming that the battery voltage $V_{BAT}$ is 4 [V] and the output voltage $V_{OUT}$ is 5 [V], that is, in the step-up/down mode. In both the step-down mode and step-up/down mode, the control system is stable. As will be described later in connection with a second embodiment, by making the value obtained by multiplying together 1 minus the fixed value D' and the gain of the error amplifier 11 in the step-up/down mode equal to the gain of the error amplifier 11 in the step-down mode, it is possible to improve the gain in the step-up/down mode as shown in FIG. 7C.

Overall Configuration (Second Embodiment)

Figure 8:
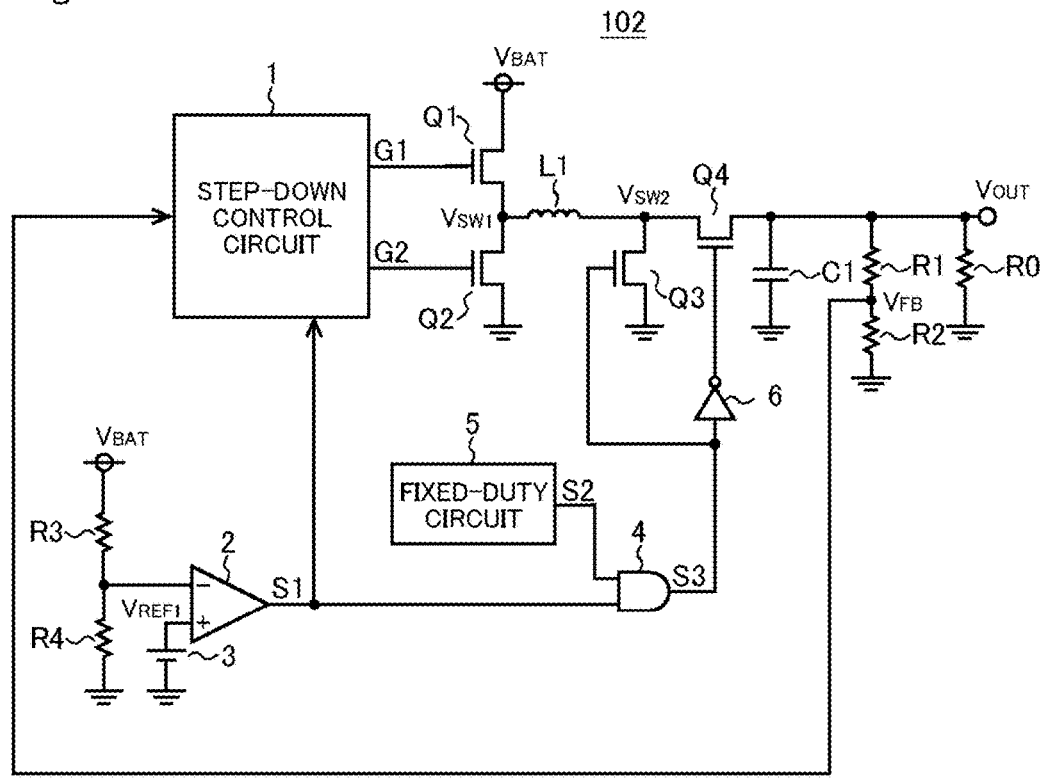
FIG. 8 is a diagram showing an exemplary overall configuration of a switching regulator according to a second embodiment of the present invention.

FIG. 8 is a diagram showing an exemplary overall configuration of a switching regulator according to a second embodiment of the present invention. The switching regulator 102 of this exemplary configuration differs from the switching regulator 101 in that the output signal S1 of the comparator 2 is fed, as well as to the AND gate 4, also to the step-down control circuit 1; in other respects, the switching regulator 102 is basically identical with the switching regulator 101.

Figure 9:
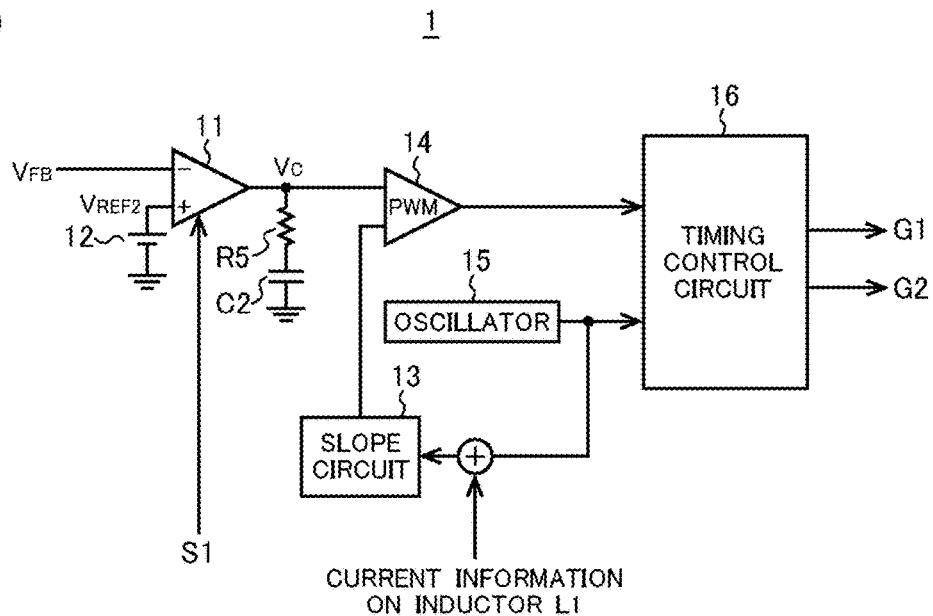
FIG. 9 is a diagram showing one exemplary configuration of a step-down control circuit in the second embodiment.

Exemplary Configuration of the Step-Down Control Circuit:

FIG. 9 is a diagram showing one exemplary configuration of the step-down control circuit 1. The step-down control circuit 1 in the example shown in FIG. 9 differs from the step-down control circuit 1 in the example shown in FIG. 2A in that the error amplifier 11 is a variable-gain amplifier; in other respects, the step-down control circuit 1 here is basically identical with that in the example shown in FIG. 2A.

The error amplifier 11 operates at a higher gain when the output signal S1 of the comparator 2 is at high level (in the step-up/down mode) than when the output signal S1 of the comparator 2 is at low level (in the step-down mode). This makes the transfer characteristics of the entire switching regulator 102 in the step-up/down mode closer to the transfer characteristics of the entire switching regulator 102 in the step-down mode, and thus helps further improve the response characteristics of the switching regulator 102 in the step-up/down mode.

Preferably, the error amplifier 11 changes its gain according to the output signal S1 of the comparator 2 such that the value obtained by multiplying together 1 minus the fixed value D' and the gain of the error amplifier 11 as it is when the output signal S1 of the comparator 2 is at high level (in the step-up/down mode) equals the gain of the error amplifier 11 as it is when the output signal S1 of the comparator 2 is at low level (in the step-down mode). In this way, it is possible to make the transfer characteristics of the entire switching regulator 102 in the step-up/down mode identical with the transfer characteristics of the entire switching regulator 102 in the step-down mode. It is thus possible to make the response characteristics of the switching regulator 102 in the step-up/down mode identical with the response characteristics of the switching regulator 102 in the step-down mode.

Overall Configuration (Third Embodiment)

Figure 10:
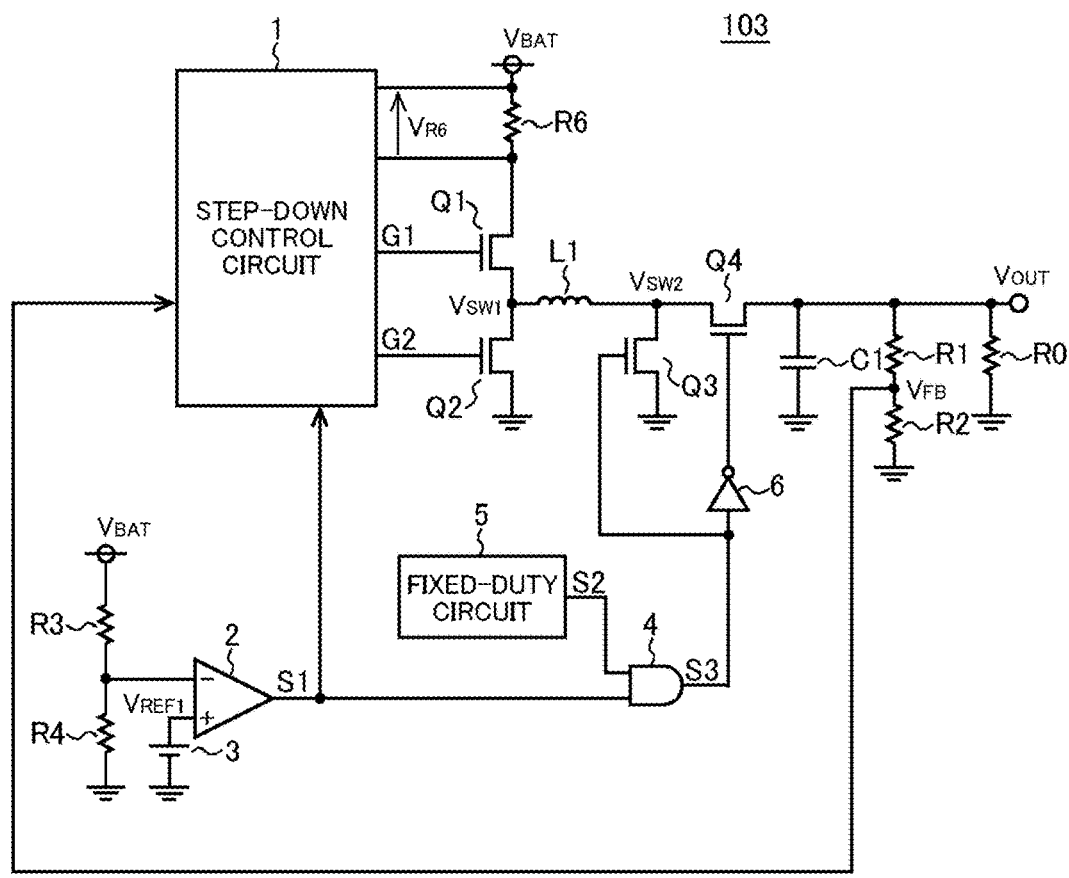
FIG. 10 is a diagram showing an exemplary overall configuration of a switching regulator according to a third embodiment of the present invention.

FIG. 10 is a diagram showing an exemplary overall configuration of a switching regulator according to a third embodiment of the present invention. The switching regulator 103 of this exemplary configuration differs from the switching regulator 101 in that the output signal S1 of the comparator 2 is fed, as well as to the AND gate 4, also to the step-down control circuit 1, and that the drain of the MOS transistor Q1 is connected via a current detection resistor R6 to the input voltage application terminal, to which the battery voltage $V_{BAT}$ is applied, so that the voltage $V_{R6}$ across the current detection resistor R6 is fed to the step-down control circuit 1; in other respects, the switching regulator 103 is basically identical with the switching regulator 101.

Figure 11:
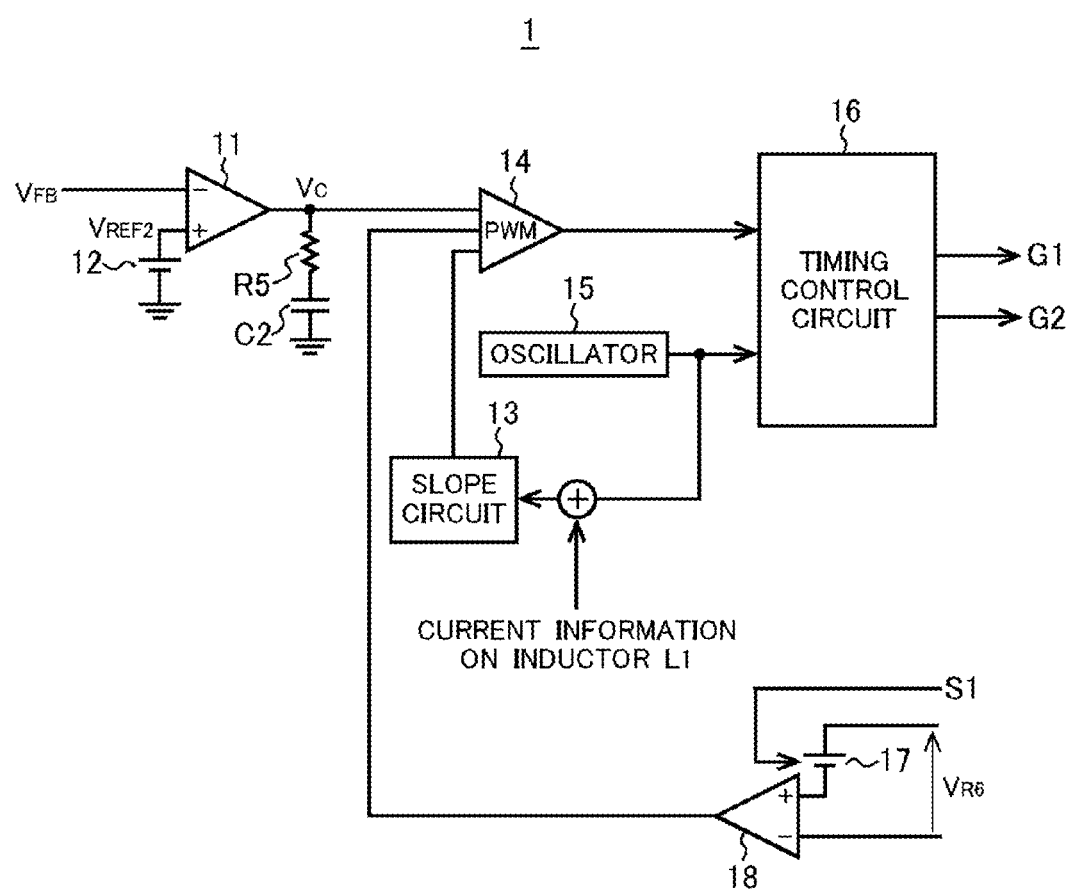
FIG. 11 is a diagram showing one exemplary configuration of a step-down control circuit in the third embodiment.

Exemplary Configuration of the Step-Down Control Circuit:

FIG. 11 is a diagram showing one exemplary configuration of the step-down control circuit 1. The step-down control circuit 1 in the example shown in FIG. 11 differs from the step-down control circuit 1 in the example shown in FIG. 2A in that it additionally includes a variable voltage source 17 and a comparator 18, and that the output signal of the comparator 18 is fed to the comparator 14; in other respects, the step-down control circuit 1 here is basically identical with that in the example shown in FIG. 2A.

The current detection resistor R6 (see FIG. 10), the variable voltage source 17, and the comparator 18 monitor whether or not the current through the MOS transistor Q1 has reached a predetermined overcurrent detection threshold value. The output voltage (offset voltage) of the variable voltage source 17 corresponds to the predetermined overcurrent detection threshold value, so that, when the current through the MOS transistor Q1 is equal to or higher than the predetermined overcurrent detection threshold value, the comparator 18 outputs a high-level signal and, when the current through the MOS transistor Q1 is lower than the predetermined overcurrent detection threshold value, the comparator 18 outputs a low-level signal. The current detection resistor R6 may be used, as well as for overcurrent detection, also for acquisition of current information as to the inductor L1.

The comparator 14 compares the phase-compensated error signal with the output voltage of the slope circuit 13 to generate a comparison signal and to output it as the reset signal when the output signal of the comparator 18 is at low level, and generates a high-level signal to output it as the reset signal when the output signal of the comparator 18 is at high level. Thus, when the output signal of the comparator 18 is at high level, the step-down control circuit 1 keeps the MOS transistor Q1 OFF, and thus the current through the MOS transistor Q1 is suppressed.

The variable voltage source 17 makes the value of the constant voltage (offset voltage) higher when the output signal S1 of the comparator 2 is at high level (in the step-up/down mode) than when the output signal S1 is at low level (in the step-down mode). In this way, it is possible to make the predetermined overcurrent detection threshold value of the switching regulator 103 in the step-up/down mode higher than the predetermined overcurrent detection threshold value of the switching regulator 103 in the step-down mode.

Whereas the average current through the inductor L1 in the step-down mode equals the output current of the switching regulator 103, the average current through the inductor L1 in the step-up/down mode equals the value obtained by dividing the output current of the switching regulator 103 by 1 minus the fixed value D'. Thus, by making the current detection threshold value variable as described above, it is possible to prevent excessively strict overcurrent detection in the step-up/down mode.

Preferably, the variable voltage source 17 changes the value of the constant voltage (offset voltage) according to the output signal S1 of the comparator 2 such that the value obtained by multiplying together 1 minus the fixed value D' and the overcurrent detection threshold value as it is when the output signal S1 of the comparator 2 is at high level (in the step-up/down mode) equals the overcurrent detection threshold value as it is when the output signal S1 of the comparator 2 is at low level (in the step-down mode). In this way, it is possible to make the tolerated output current value of the switching regulator 103 equal in the step-up/down mode and in the step-down mode.

Overall Configuration (Fourth Embodiment)

Figure 12:
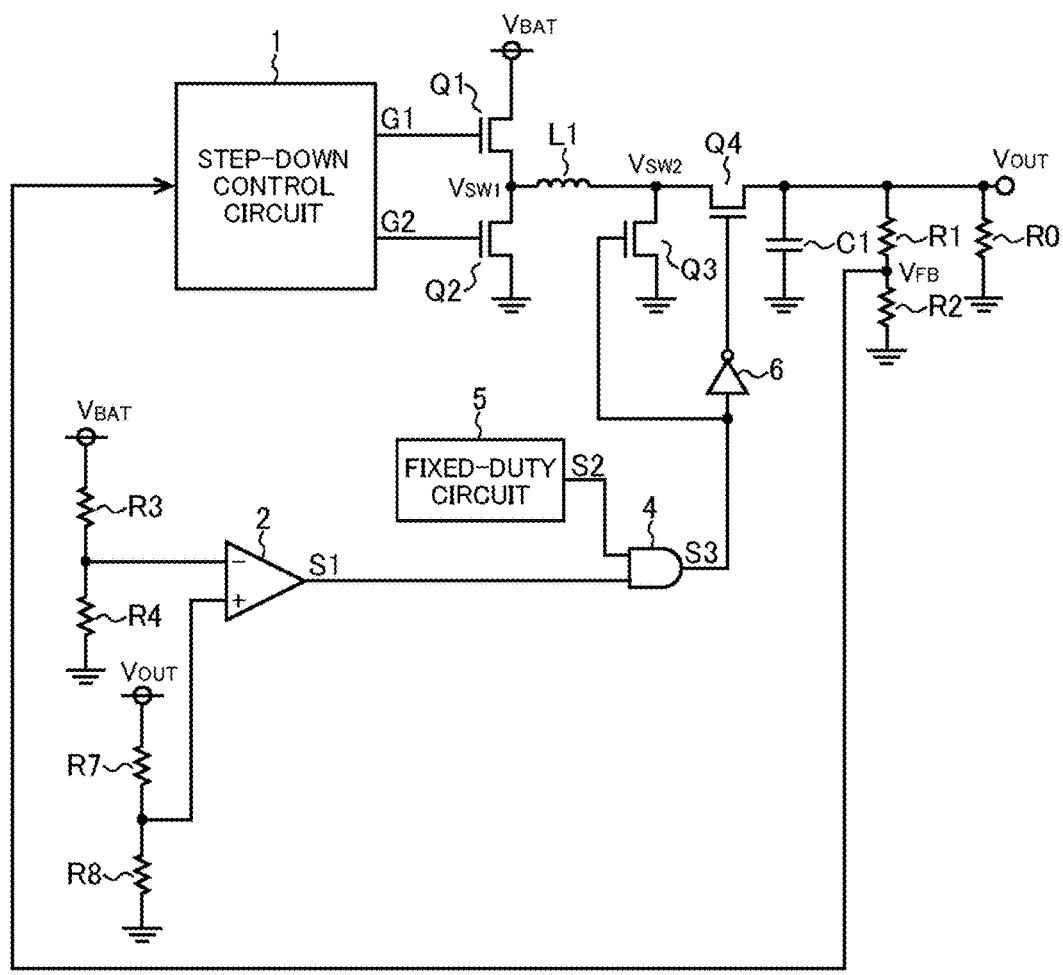
FIG. 12 is a diagram showing an exemplary overall configuration of a switching regulator according to a fourth embodiment of the present invention.

FIG. 12 is a diagram showing an exemplary overall configuration of a switching regulator according to a fourth embodiment of the present invention. The switching regulator 104 of this exemplary configuration differs from the switching regulator 101 in that, instead of the first reference voltage $V_{REF1}$ output from the reference voltage source 3, a division voltage of the output voltage $V_{OUT}$ that is produced by voltage division resistors R7 and R8 is fed to the non-inverting input terminal of the comparator 2; in other respects, the switching regulator 104 is basically identical with the switching regulator 101. In the description of this embodiment, for those parts which are identical with or similar to their counterparts in the switching regulator 101, no overlapping description will be repeated unless necessary.

Figure 13:
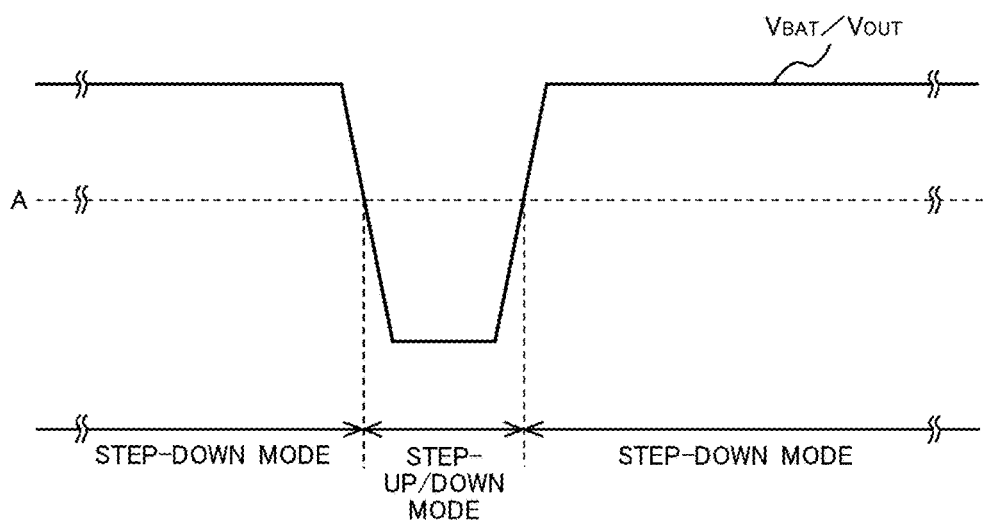
FIG. 13 is a diagram showing an outline of a waveform of a ratio of a battery voltage to an output voltage.

Operation Modes:

When the division voltage of the battery voltage $V_{BAT}$ is higher than a division voltage of the output voltage $V_{OUT}$, that is, when the ratio of the battery voltage $V_{BAT}$ to the output voltage $V_{OUT}$ is higher than a predetermined value A, the switching regulator 104 operates in a step-down mode (see FIG. 13). In the step-down mode, the step-down control circuit 1 turns ON and OFF the MOS transistors Q1 and Q2 according to the feedback voltage $V_{FB}$; meanwhile, the output signal S1 of the comparator 2 remains at low level, so that the MOS transistor Q3 is kept OFF and the MOS transistor Q4 is kept ON.

On the other hand, when the division voltage of the battery voltage $V_{BAT}$ is equal to or lower than the division voltage of the output voltage $V_{OUT}$, that is, when the ratio of the battery voltage $V_{BAT}$ to the output voltage $V_{OUT}$ is equal to or lower than the predetermine value A, the switching regulator 104 operates in a step-up/down mode (see FIG. 13). In the step-up/down mode, the step-down control circuit 1 turns ON and OFF the MOS transistors Q1 and Q2 according to the feedback voltage $V_{FB}$; meanwhile, the output signal S1 of the comparator 2 remains at high level, so that, while the ON-duty D (0≤D≤1) of the MOS transistor Q3 is kept at a fixed value D' (0<D'<1), the MOS transistors Q3 and Q4 are turned ON and OFF in a complementary fashion.

Figure 14:
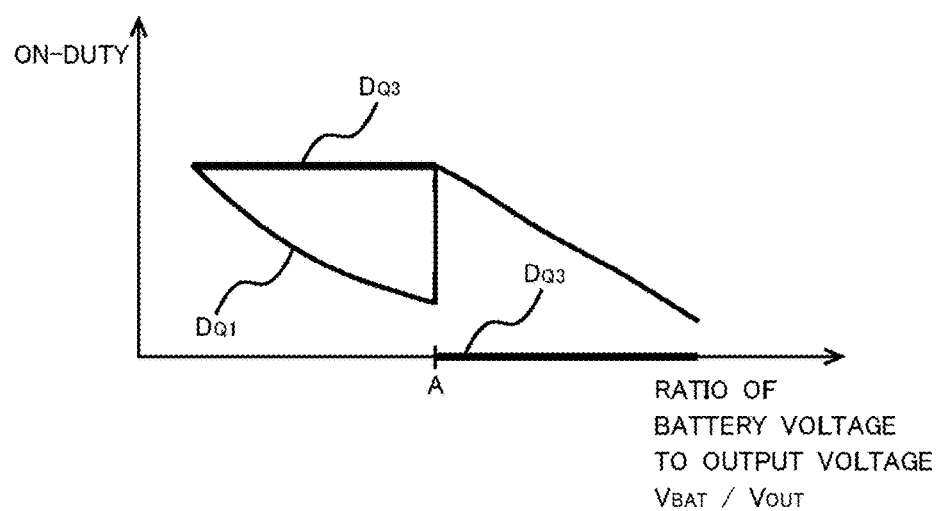
FIG. 14 is a diagram showing ON-duties of MOS transistors Q1 and Q3.

As a result of step-down operation in the step-down mode and step-up/down operation in the step-up/down mode as described above, the ON-duties $D_{Q1}$ and $D_{Q3}$ of the MOS transistors Q1 and Q3, respectively, are as shown in FIG. 14.

The switching regulator 104 provides a similar effect to the switching regulator 101.

Figure 38:
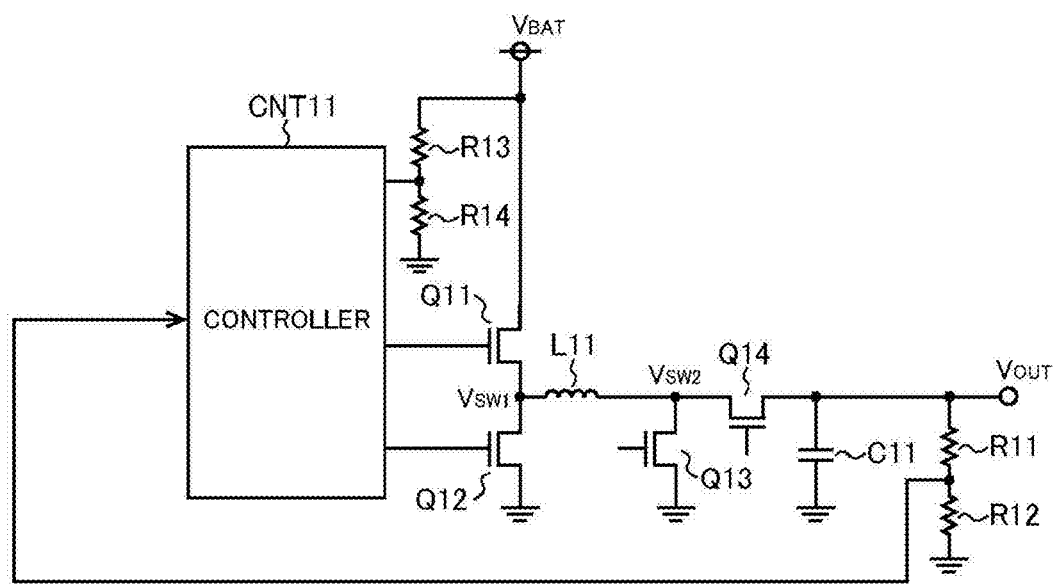
FIG. 38 is a diagram showing a configuration of a common step-up/down switching regulator.
Figure 39:
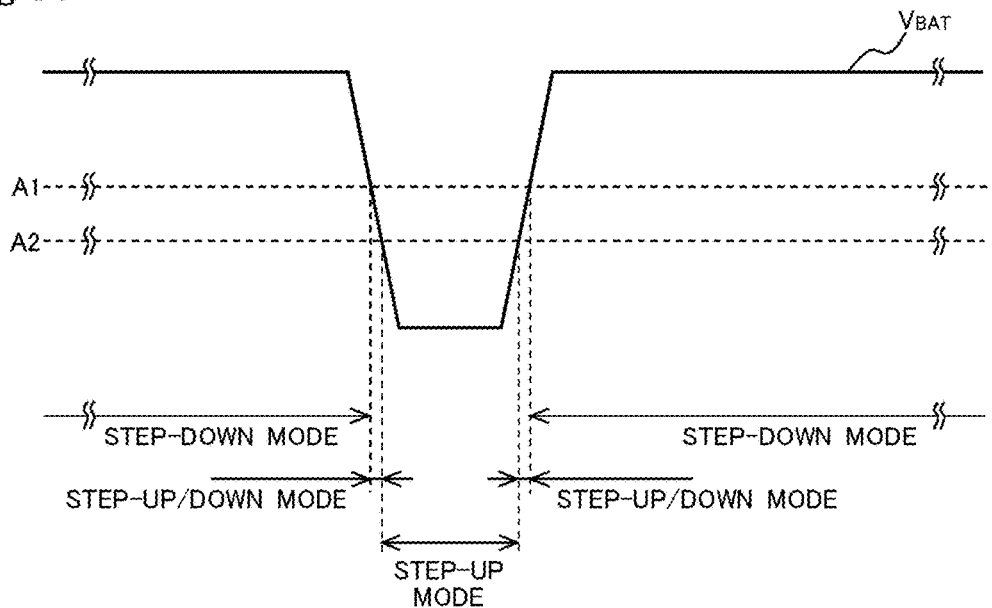
FIG. 39 is a diagram showing an outline of a waveform of a battery voltage.
Figure 40A:
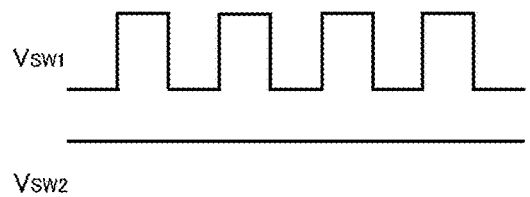
FIG. 40A is a diagram showing an outline of waveforms of switch voltages in a step-down mode.
Figure 40B:
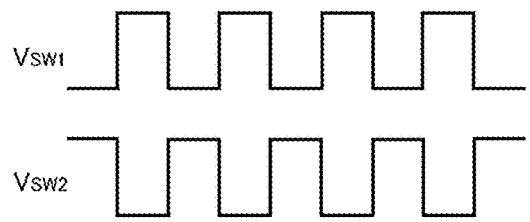
FIG. 40B is a diagram showing an outline of waveforms of switch voltages in a step-up/down mode.
Figure 40C:
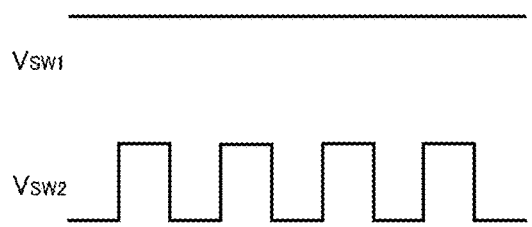
FIG. 40C is a diagram showing an outline of waveforms of switch voltages in a step-up mode.

Moreover, the switching regulator 104 shifts between the step-up/down mode and the step-down mode according to whether or not the ratio of the battery voltage $V_{BAT}$ to the output voltage $V_{OUT}$ is equal to or lower than the predetermined value A. By contrast, a common step-up/down switching regulator as shown in FIG. 38 shifts between the step-up/down or step-up mode and the step-down mode according to whether or not the battery voltage $V_{BAT}$ is equal to or lower than a first predetermined value A1. The common step-up/down switching regulator shown in FIG. 38 has the shortcoming of the optimum value of the first predetermine value A1 varying with how the output voltage $V_{OUT}$ is set. In contrast, in the switching regulator 104, how the output voltage $V_{OUT}$ is set does not affect the optimum value of the predetermined value A, and thus does not require the predetermined value A to be varied.

Overall Configuration (Fifth Embodiment)

Figure 15:
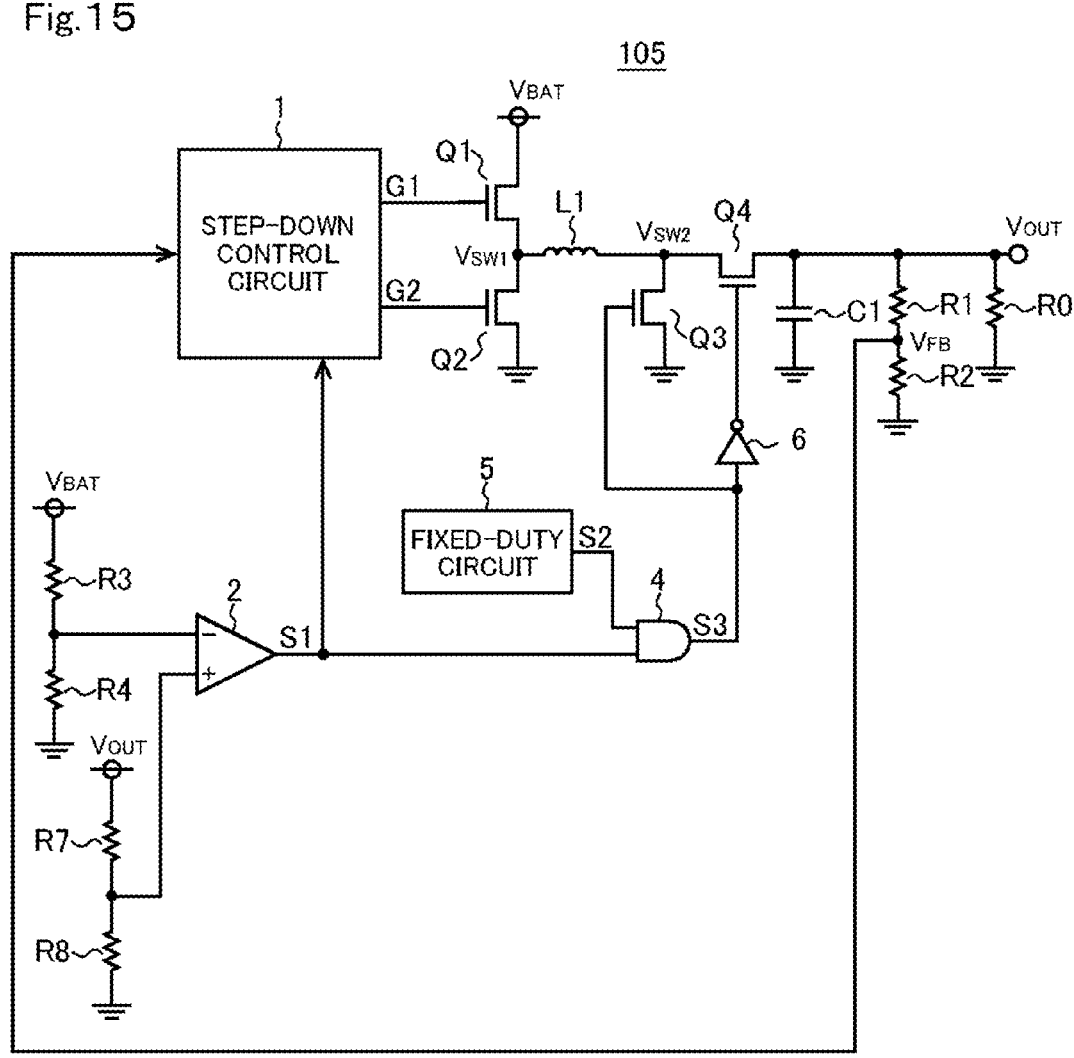
FIG. 15 is a diagram showing an exemplary overall configuration of a switching regulator according to a fifth embodiment of the present invention.

FIG. 15 is a diagram showing an exemplary overall configuration of a switching regulator according to a fifth embodiment of the present invention. The switching regulator 105 of this exemplary configuration differs from the switching regulator 102 in that, instead of the first reference voltage $V_{REF1}$ output from the reference voltage source 3, a division voltage of the output voltage $V_{OUT}$ that is produced by voltage division resistors R7 and R8 is fed to the non-inverting input terminal of the comparator 2; in other respects, the switching regulator 105 is basically identical with the switching regulator 102. The difference of the switching regulator 105 from the switching regulator 102 is the same as the difference of the switching regulator 104 described previously from the switching regulator 101.

The switching regulator 105 provides a similar effect to the switching regulator 102.

Moreover, the switching regulator 105 shifts between the step-up/down mode and the step-down mode according to whether or not the ratio of the battery voltage $V_{BAT}$ to the output voltage $V_{OUT}$ is equal to or lower than the predetermined value A. By contrast, a common step-up/down switching regulator as shown in FIG. 38 shifts between the step-up/down or step-up mode and the step-down mode according to whether or not the battery voltage $V_{BAT}$ is equal to or lower than a first predetermine value A1. The common step-up/down switching regulator shown in FIG. 38 has the shortcoming of the optimum value of the first predetermine value A1 varying with how the output voltage $V_{OUT}$ is set. In contrast, in the switching regulator 105, how the output voltage $V_{OUT}$ is set does not affect the optimum value of the predetermined value A, and thus does not require the predetermined value A to be varied.

Overall Configuration (Sixth Embodiment)

Figure 16:
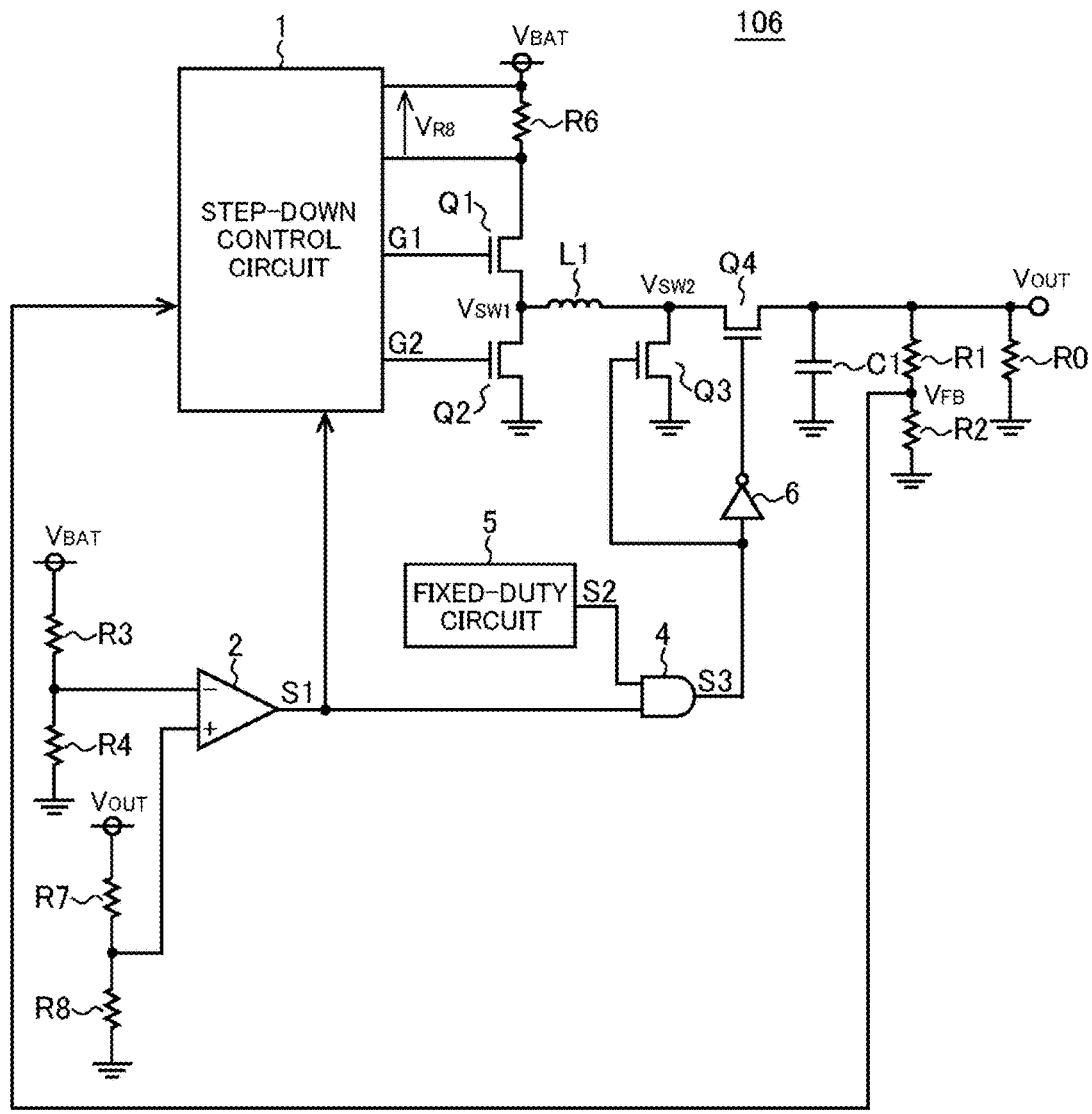
FIG. 16 is a diagram showing an exemplary overall configuration of a switching regulator according to a sixth embodiment of the present invention.

FIG. 16 is a diagram showing an exemplary overall configuration of a switching regulator according to a sixth embodiment of the present invention. The switching regulator 106 of this exemplary configuration differs from the switching regulator 103 in that, instead of the first reference voltage $V_{REF1}$ output from the reference voltage source 3, a division voltage of the output voltage $V_{OUT}$ that is produced by voltage division resistors R7 and R8 is fed to the non-inverting input terminal of the comparator 2; in other respects, the switching regulator 106 is basically identical with the switching regulator 103. The difference of the switching regulator 106 from the switching regulator 103 is the same as the difference of the switching regulator 104 described previously from the switching regulator 101.

The switching regulator 106 provides a similar effect to the switching regulator 103.

Moreover, the switching regulator 106 shifts between the step-up/down mode and the step-down mode according to whether or not the ratio of the battery voltage $V_{BAT}$ to the output voltage $V_{OUT}$ is equal to or lower than the predetermined value A. By contrast, a common step-up/down switching regulator as shown in FIG. 38 shifts between the step-up/down or step-up mode and the step-down mode according to whether or not the battery voltage $V_{BAT}$ is equal to or lower than a first predetermine value A1. The common step-up/down switching regulator shown in FIG. 38 has the shortcoming of the optimum value of the first predetermine value A1 varying with how the output voltage $V_{OUT}$ is set. In contrast, in the switching regulator 106, how the output voltage $V_{OUT}$ is set does not affect the optimum value of the predetermined value A, and thus does not require the predetermined value A to be varied.

Overall Configuration (Seventh Embodiment)

Figure 17A:
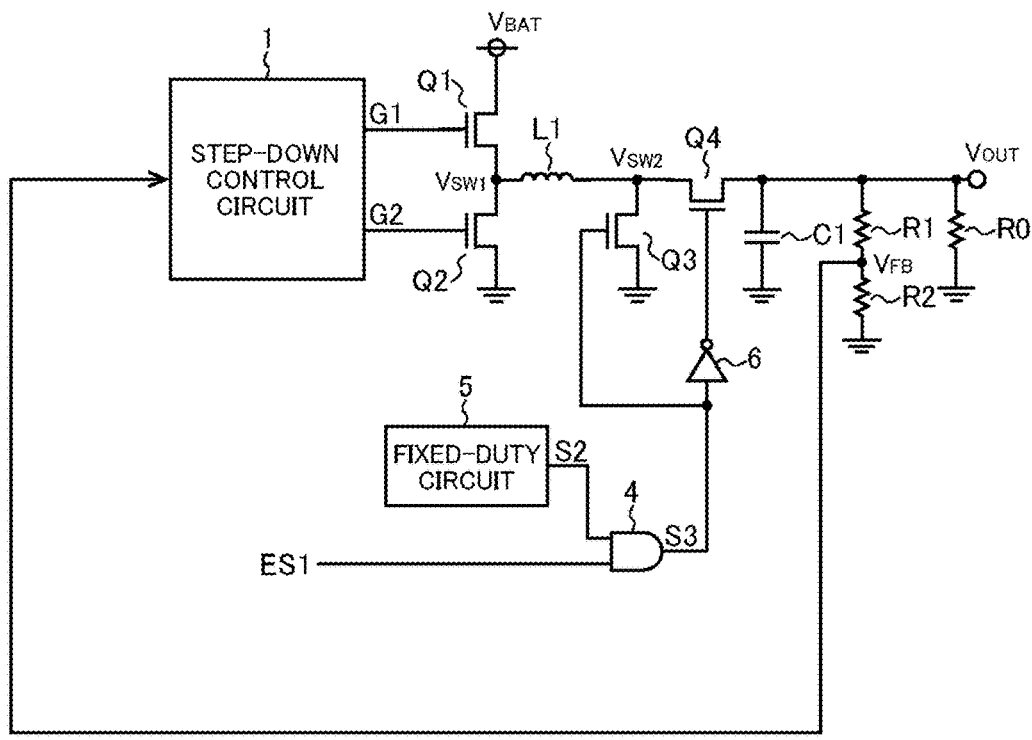
FIG. 17A is a diagram showing an exemplary overall configuration of a switching regulator according to a seventh embodiment of the present invention.

FIG. 17A is a diagram showing an exemplary overall configuration of a switching regulator according to a seventh embodiment of the present invention. The switching regulator 107 of this exemplary configuration differs from the switching regulator 101 in that, instead of the output signal S1 of the comparator 2, an external signal ES1 is fed to the AND gate 4; in other respects, the switching regulator 107 is basically identical with the switching regulator 101. In the description of this embodiment, for those parts which are identical with or similar to their counterparts in the switching regulator 101, no overlapping description will be repeated unless necessary.

Figure 17B:
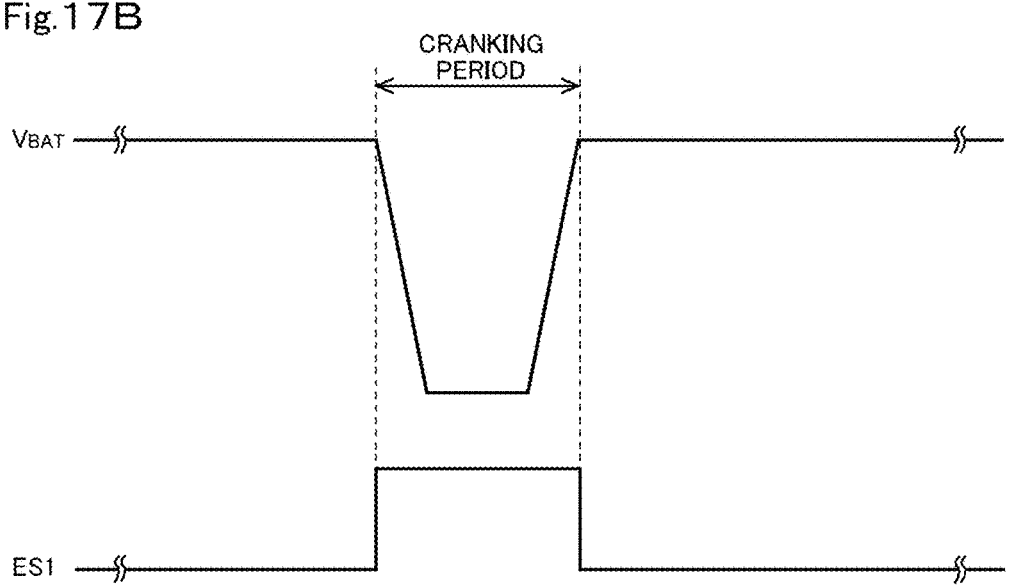
FIG. 17B is a diagram showing an outline of waveforms of a battery voltage and an external signal.

The external signal ES1 that is fed to the switching regulator 107 can be, for example in a case where the battery voltage $V_{BAT}$ is a voltage that is output from a battery mounted on an automobile, a signal that is output from a microcontroller such as an ECU (engine control unit) that is mounted, like the battery, on the automobile. The microcontroller such as an ECU can then turn the external signal ES1 to high level during a cranking period (a period in which an engine starter motor is operated) (see FIG. 17B). The external signal ES1 that is fed to the switching regulator 107 is not limited to a signal that indicates cranking on a vehicle; it may instead be any signal that indicates a period in which a drop in the battery voltage $V_{BAT}$ is expected.

A modification similar to that from the switching regulator 101 to the switching regulator 102 may be applied to the switching regulator 107. Likewise, a modification similar to that from the switching regulator 101 to the switching regulator 103 may be applied to the switching regulator 107.

Figure 17C:
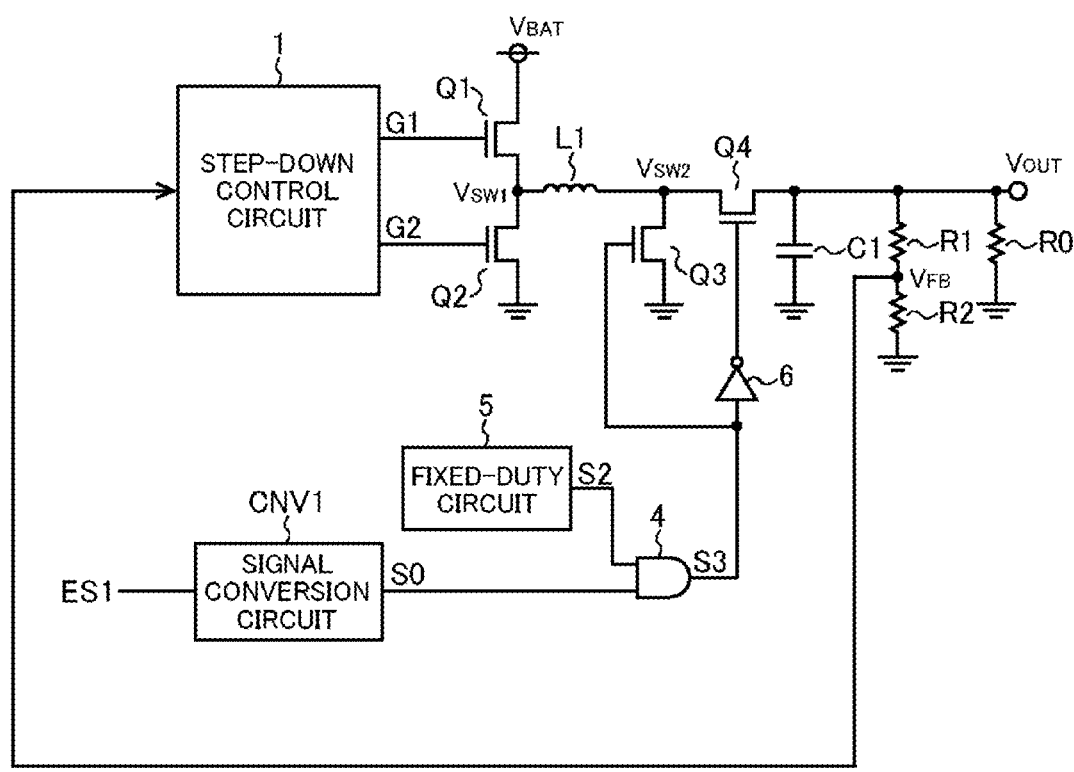
FIG. 17C is a diagram showing an exemplary overall configuration of a switching regulator according to a modified example of the seventh embodiment.

The switching regulator 107 may be modified like a switching regulator 107' as shown in FIG. 17C. The switching regulator 107' is configured to include a signal conversion circuit CNV1 that converts the external signal ES1 into a signal S0. The signal conversion circuit CNV1 feeds the signal S0 to the AND gate 4.

The external signal ES1 that is fed to the switching regulator 107' can be, for example in a case where the battery voltage $V_{BAT}$ is a voltage that is output from a battery mounted on an automobile, a signal that is output from a microcontroller such as an ECU that is mounted, like the battery, on the automobile. The microcontroller such as an ECU can then generate a pulse in the external signal ES1 at a start timing of a cranking period (see FIG. 17D). After the pulse is generated in the external signal ES1, for a predetermined period that is determined with the cranking period into consideration, the signal conversion circuit CNV1 keeps the signal S0 at high level. Preferably, the predetermined period that is determined with the cranking period into consideration is made variable according to a setting change signal or the like that is fed from outside the switching regulator 107' to the signal conversion circuit CNV1. The external signal ES1 that is fed to the switching regulator 107' is not limited to a signal that indicates cranking on a vehicle; it may instead be any signal that indicates a period in which a drop in the battery voltage $V_{BAT}$ is expected.

Overall Configuration (Eighth Embodiment)

Figure 18:
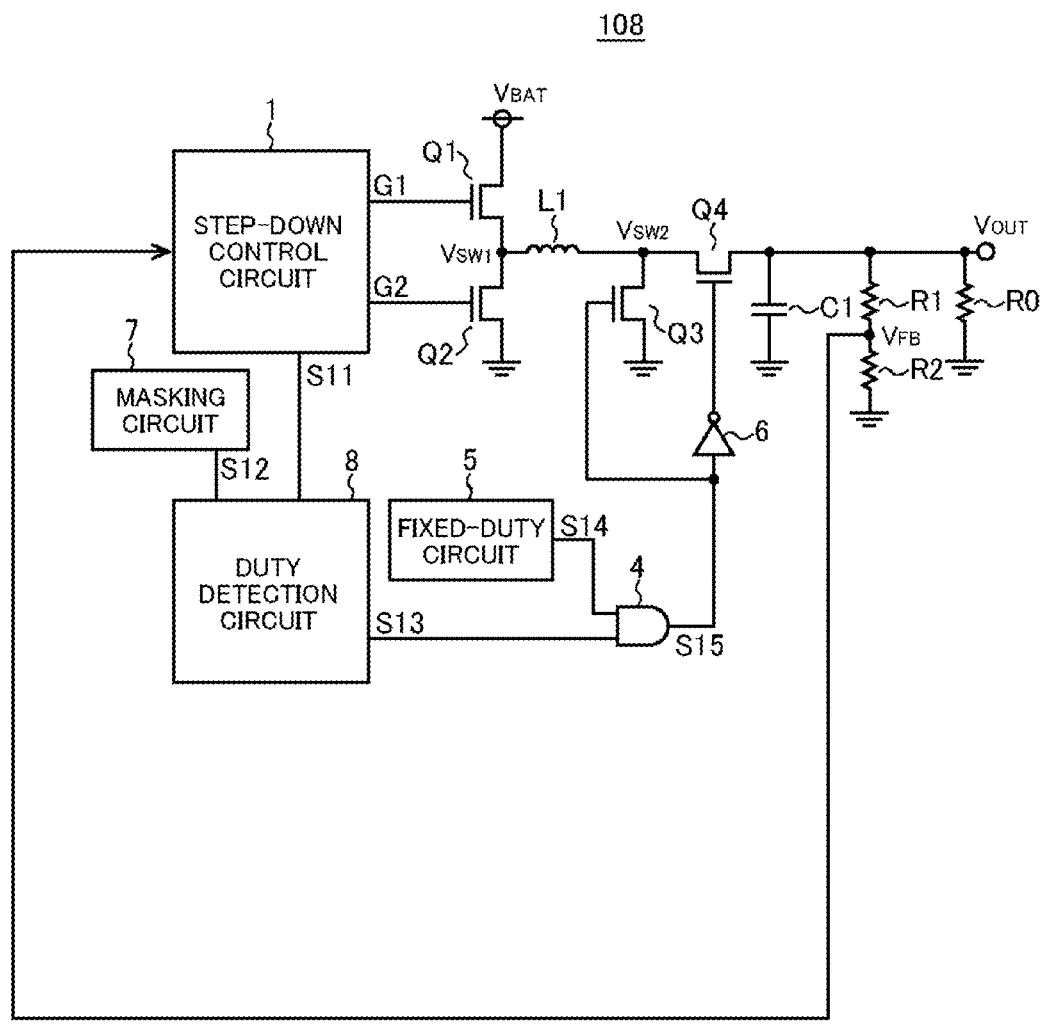
FIG. 18 is a diagram showing an exemplary overall configuration of a switching regulator according to an eighth embodiment of the present invention.

FIG. 18 is a diagram showing an exemplary overall configuration of a switching regulator according to an eighth embodiment of the present invention. The switching regulator 108 of this exemplary configuration differs from the switching regulator 101 in that, instead of the comparator 2 and the reference voltage source 3, a masking circuit 7 and a duty detection circuit 8 are provided; in other respects, the switching regulator 108 is basically identical with the switching regulator 101. In the description of this embodiment, for those parts which are identical with or similar to their counterparts in the switching regulator 101, no overlapping description will be repeated unless necessary.

In this embodiment, the step-down control circuit 1 feeds a signal S11 (hereinafter referred to as the duty signal S11) that indicates the ON-duty of the MOS transistor Q1 to the duty detection circuit 8.

The masking circuit 7 feeds a masking signal S12 to the duty detection circuit 8. The masking signal S12 is synchronous with the duty signal S11, and is the inversion of the duty signal S11 as it is when the ON-duty of the MOS transistor Q1 equals a first threshold value. The first threshold value is set equal to or smaller than the maximum value of the ON-duty of the MOS transistor Q1 as it is set by the step-down control circuit 1.

The duty detection circuit 8 generates a mode designation signal S13 on the basis of the duty signal S11 and the masking signal S12. An example of how the mode designation signal S13 is generated will be described in detail later. The mode designation signal S13, when at high level, serves as a signal that designates the step-up/down mode and, when at low level, serves as a signal that designates the step-down mode.

The AND gate 4 outputs a signal S15 which is the logical product of the mode designation signal S13, which is output from the duty detection circuit 8, and a fixed-ON-duty pulse signal S14, which is output from the fixed-duty circuit 5.

The output signal S15 of the AND gate 4 is, on one hand, fed to the gate of the MOS transistor Q3 and, on the other hand, logically inverted by the NOT gate 6 and then fed to the gate of the MOS transistor Q4. Preferably, a dead-time generation circuit is used instead of the NOT gate 6 so that a dead time in which the MOS transistors Q3 and Q4 are both OFF is provided during the ON-OFF transition of the MOS transistors Q3 and Q4.

Figure 19A:
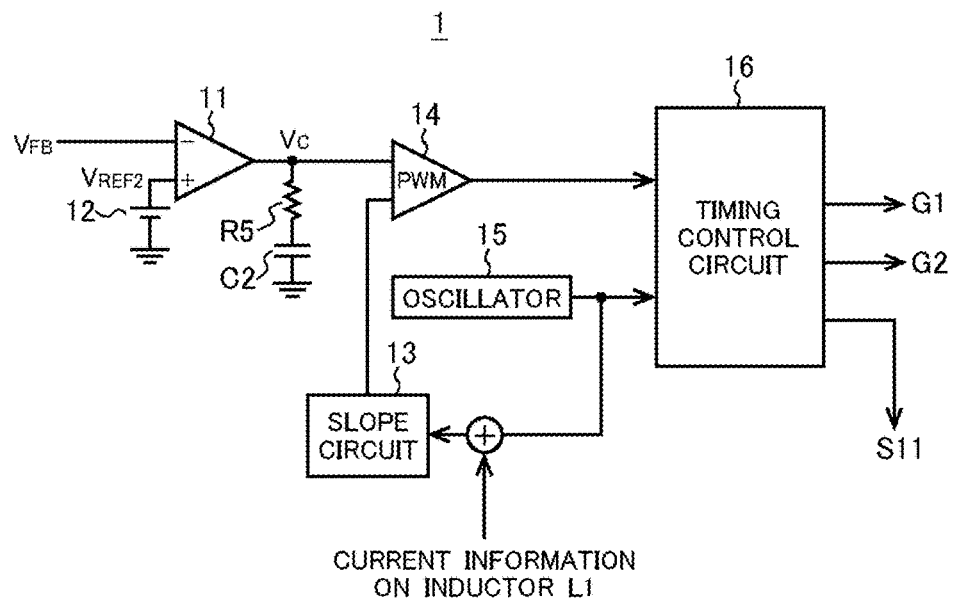
FIG. 19A is a diagram showing one exemplary configuration of a step-down control circuit in the eighth embodiment.

Exemplary Configuration of the Step-Down Control Circuit:

FIG. 19A is a diagram showing one exemplary configuration of the step-down control circuit 1. The step-down control circuit 1 in the example shown in FIG. 19A differs from the step-down control circuit 1 in the example shown in FIG. 2A in that the timing control circuit 16 outputs the duty signal S11; in other respects, the step-down control circuit 1 here is basically identical with that in the example shown in FIG. 2A.

Figure 19B:
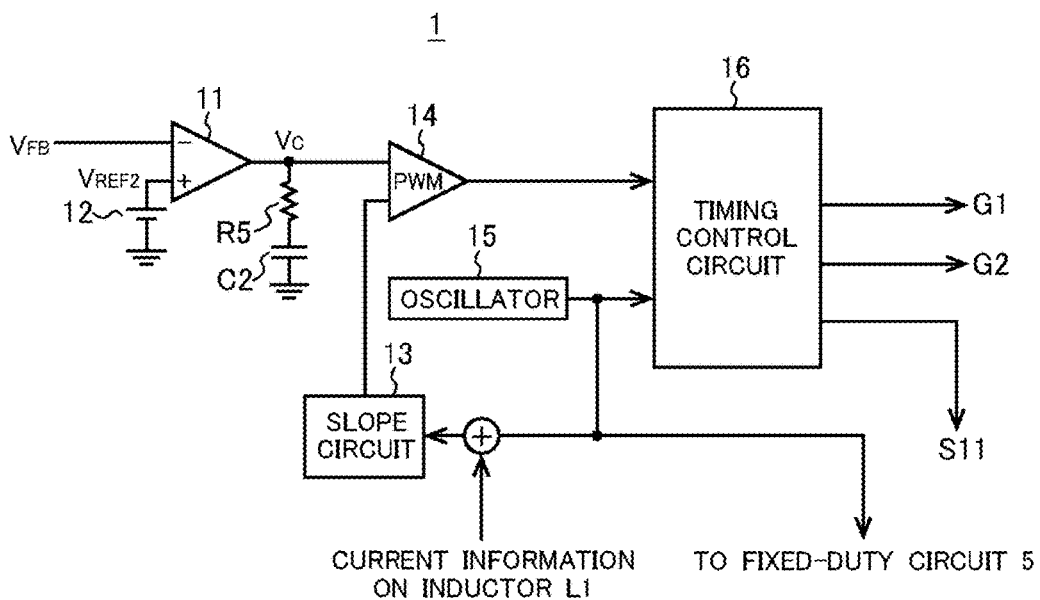
FIG. 19B is a diagram showing another exemplary configuration of a step-down control circuit in the eighth embodiment.

FIG. 19B is a diagram showing another exemplary configuration of the step-down control circuit 1. The step-down control circuit 1 in the example shown in FIG. 19B differs from the step-down control circuit 1 in the example shown in FIG. 2B in that the timing control circuit 16 outputs the duty signal S11; in other respects, the step-down control circuit 1 here is basically identical with that in the example shown in FIG. 2B.

In the examples shown in FIGS. 19A and 19B, the timing control circuit 16 outputs, as the duty signal S11, a signal that has the same waveform as, and is synchronous with, the gate signal G1 to the duty detection circuit 8.

Figure 19C:
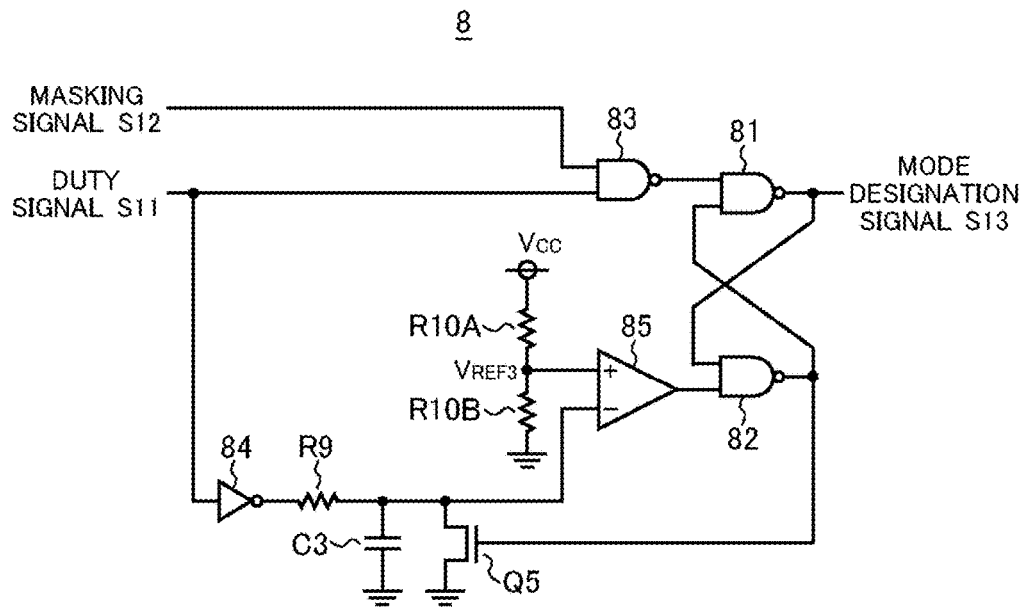
FIG. 19C is a diagram showing one exemplary configuration of a duty detection circuit in the eighth embodiment.

Exemplary Configuration of the Duty Detection Circuit:

FIG. 19C is a diagram showing one exemplary configuration of the duty detection circuit 8. In the example shown in FIG. 19C, the duty detection circuit 8 includes NAND gates 81 to 83, a NOT gate 84, a comparator 85, a resistor R9, a capacitor C3, a MOS transistor Q5, and voltage division resistors R10A and R10B.

The NAND gates 81 and 82 constitute a latch. The NAND gate 83 feeds the negative logical product of the duty signal S11 and the masking signal S12 to the set terminal of the latch constituted by the NAND gates 81 and 82.

The masking signal S12 is the inversion of the duty signal S11 as it is when the ON-duty of the MOS transistor Q1 equals the first threshold value. The masking signal S12 is so set that a falling edge in it is timed with immediately before a rising edge in the duty signal S11, and is so configured that, at a falling edge in the masking signal S12, the NAND gate 83 outputs a low level. Accordingly, while the ON-duty of the MOS transistor Q1 is equal to or lower than the first threshold value, the output of the NAND gate 83 is fixed at high level; when the ON-duty of the MOS transistor Q1 becomes equal to or higher than the first threshold value, the output of the NAND gate 83 falls to low level, with the result that the latch constituted by the NAND gates 81 and 82 is set, and the mode designation signal S13 turns to high level (see FIG. 19D). Instead of the latch constituted by the NAND gates 81 and 82 being set by the negative logical product of the duty signal S11 and the masking signal S12, a configuration is also possible where the latch constituted by the NAND gates 81 and 82 is set by the result of comparison of a signal obtained by smoothing the duty signal S11 with a threshold value.

The duty signal S11 is inverted by the NOT gate 84, and is then smoothed by an RC low-pass filter that is constituted by the resistor R9 and the capacitor C3. Accordingly, the analog output of the RC low-pass filter constituted by the resistor R9 and the capacitor C3 is higher the lower the ON-duty of the MOS transistor Q1 is.

The comparator 85 compares the analog output of the RC low-pass filter constituted by the resistor R9 and capacitor C3 with a reference voltage $V_{REF3}$. When the analog output of the RC low-pass filter constituted by the resistor R9 and capacitor C3 is equal to or higher than the reference voltage $V_{REF3}$, the output of the comparator 85 is at low level. The reference voltage $V_{REF3}$ is a voltage that is generated by dividing a constant voltage $V_C$ by the voltage division resistors R10A and R10B, and is set at the same value as the analog output of the RC low-pass filter constituted by the resistor R9 and capacitor C3 as it is when the ON-duty of the MOS transistor Q1 equals a second threshold value. The second threshold value is set equal to or lower than the first threshold value.

Figure 19D:
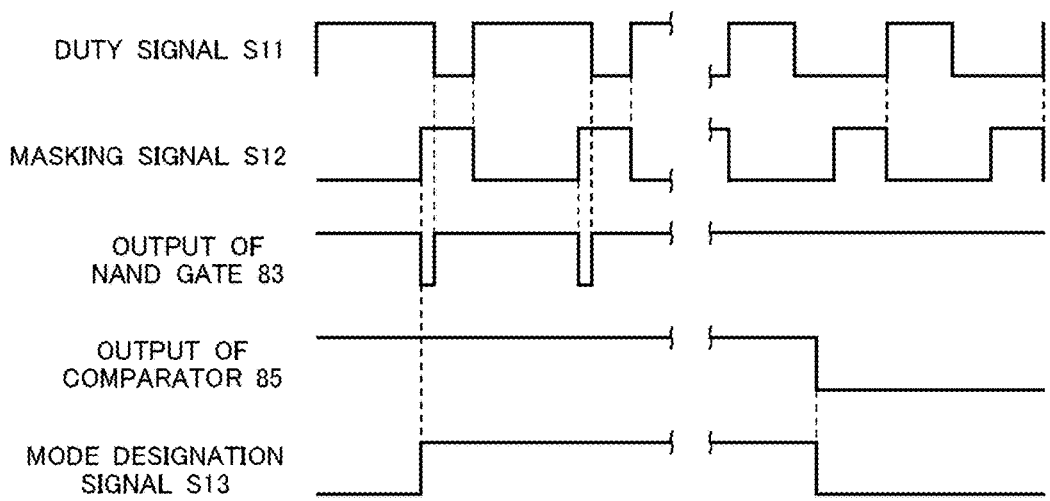
FIG. 19D is a timing chart showing voltages at relevant points in a duty detection circuit.

When the output of the comparator 85 turns to low level, the latch constituted by the NAND gates 81 and 82 is reset, and the mode designation signal S13 turns to low level (see FIG. 19D).

The MOS transistor Q5 is an N-channel MOS transistor for initializing the voltage across the capacitor C3 to low level. The MOS transistor Q5 is ON when the mode designation signal S13 is at low level, and is OFF when the mode designation signal S13 is at high level.

When the mode designation signal S13 is at low level, the voltage across the capacitor C3 is initialized to low level by the MOS transistor Q5. Thus, the capacitor C3 starts to be charged at the time point that the mode designation signal S13 turns from low level to high level. This ensures that it takes a certain time after the mode designation signal S13 turns from low level to high level until it turns back to low level. It is thus possible to ensure that, after the mode designation signal S13 turns from low level to high level, operation in the step-up/down mode continues for a certain period.

As described above, in the example shown in FIG. 19C, a configuration is adopted where the MOS transistor Q5 is provided to ensure that, when the mode designation signal S13 turns from low level to high level, operation in the step-up/down mode continues for a certain period. A configuration without the MOS transistor Q5 is also possible.

Operation Modes:

Consider a case where the duty detection circuit 8 is configured as shown in FIG. 19C and the first and second threshold values mentioned above both equal a threshold value TH. When the ON-duty of the MOS transistor Q1 is lower than the threshold value TH, that is, when the ratio of the battery voltage $V_{BAT}$ to the output voltage $V_{OUT}$ is higher than the reciprocal of the threshold value TH, the switching regulator 108 operates in the step-down mode (see FIG. 19E). In the step-down mode, the step-down control circuit 1 turns ON and OFF the MOS transistors Q1 and Q2 according to the feedback voltage $V_{FB}$; meanwhile, the duty signal S11 remains at low level, so that the MOS transistor Q3 is kept OFF and the MOS transistor Q4 is kept ON. As a result, the first switching voltage $V_{SW1}$, which is the voltage at the connection node between the MOS transistors Q1 and Q2, and the second switching voltage $V_{SW2}$, which is the voltage at the connection node between the MOS transistors Q3 and Q4, behave as shown in FIG. 4A as in the first and other embodiments.

In the step-down mode, the transfer characteristics of the entire switching regulator 108 are expressed by formula (3) above as in the first and other embodiments.

Figure 19E:
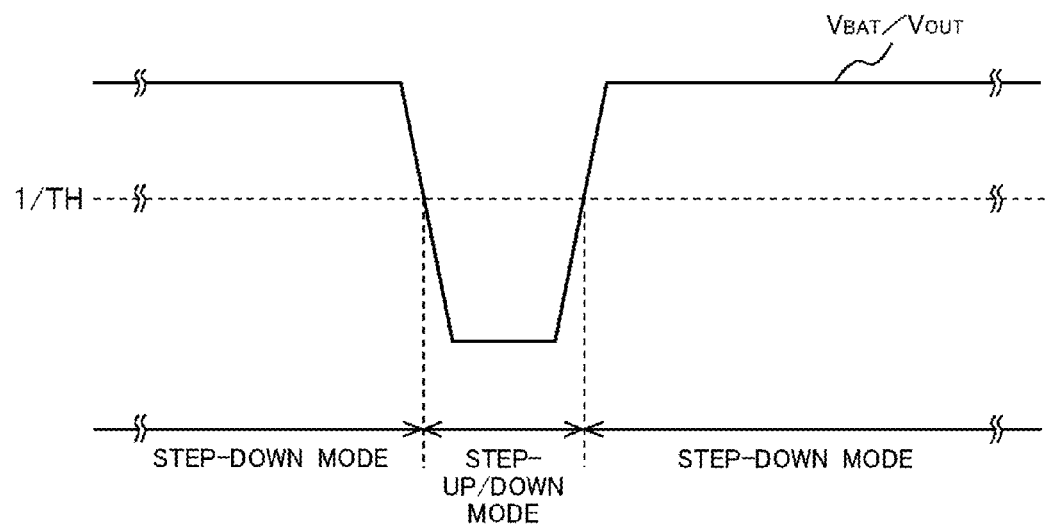
FIG. 19E is a diagram showing an outline of a waveform of a ratio of a battery voltage to an output voltage.

On the other hand, when the ON-duty of the MOS transistor Q1 is equal to or higher than the threshold value TH, that is, when the ratio of the battery voltage $V_{BAT}$ to the output voltage $V_{OUT}$ is equal to or lower than the reciprocal of the threshold value TH, the switching regulator 108 operates in the step-up/down mode (see FIG. 19E). In the step-up/down mode, the step-down control circuit 1 turns ON and OFF the MOS transistors Q1 and Q2 according to the feedback voltage $V_{FB}$; meanwhile, the duty signal S11 remains at high level, so that, while the ON-duty D (0≤D≤1) of the MOS transistor Q3 is kept at a fixed value D' (0<D'<1), the MOS transistors Q3 and Q4 are turned ON and OFF in a complementary fashion. As a result, the first switching voltage $V_{SW1}$, which is the voltage at the connection node between the MOS transistors Q1 and Q2, and the second switching voltage $V_{SW2}$, which is the voltage at the connection node between the MOS transistors Q3 and Q4, behave as shown in FIG. 4B as in the first and other embodiments. In the step-up/down mode, the ON-duty D of the MOS transistor Q3 is set independently of either of the output voltage $V_{OUT}$ and the battery voltage $V_{BAT}$.

Preferably, the fixed value D' is set at 0.7 or less. This makes it possible to sufficiently suppress variation in the output voltage $V_{OUT}$ in the step-up/down mode. It is then also possible to guarantee an output voltage $V_{OUT}$ of 5 [V] even if, with a 10% margin taken into consideration, the battery voltage $V_{BAT}$ falls to 2 [V]. That is, the value 0.7 can be determined according to the formula 0.1+(5 [V]−2 [V])/5 [V].

In the step-up/down mode, the transfer characteristics of the entire switching regulator 108 are expressed by formula (4) above as in the first and other embodiments.

Figure 20:
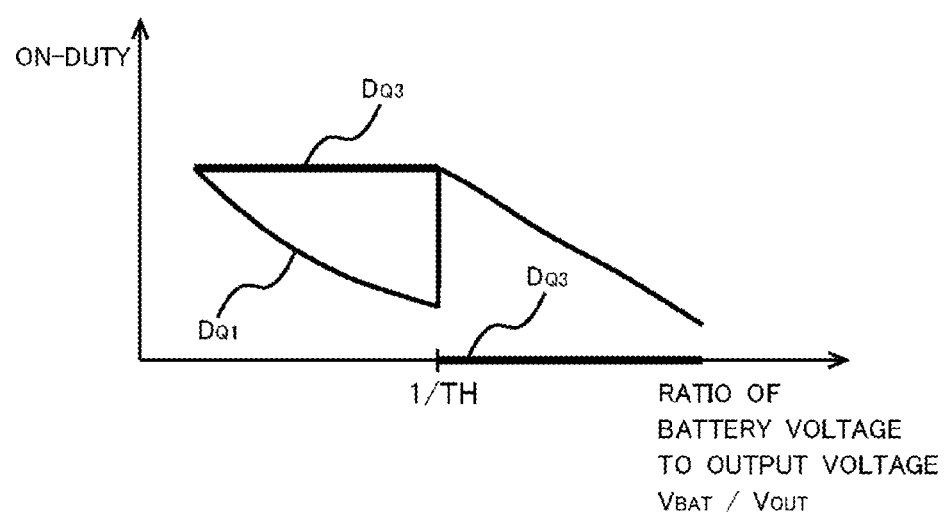
FIG. 20 is a diagram showing ON-duties of MOS transistors Q1 and Q3.

As a result of step-down operation in the step-down mode and step-up/down operation in the step-up/down mode as described above, the ON-duties $D_{Q1}$ and $D_{Q3}$ of the MOS transistors Q1 and Q3, respectively, are as shown in FIG. 20.

From formulae (3) and (4) above, it is seen that the transfer characteristics of the entire switching regulator 108 in the step-up/down mode are given by multiplying together (1−D') and the transfer characteristics of the entire switching regulator 108 in the step-down mode. This makes the response characteristics of the switching regulator 108 in the step-up/down mode similar to the response characteristics of the switching regulator 108 in the step-down mode. Thus, the transfer function of the switching regulator 108 in the step-up/down mode does not have right-half-plane-zero characteristics. This eliminates the need to give the output capacitor C1 a high capacitance, and thus helps suppress the cost of the output capacitor.

Moreover, the switching regulator 108 is configured so as not to require separate reactors in a step-up switching regulator portion and in a step-down switching regulator portion, and this helps suppress the cost of reactors. Moreover, in the example of operation shown in FIG. 19E, shifting between the step-up/down mode and the step-down mode is performed according to whether or not the ON-duty of the MOS transistor Q1 is equal to or higher than the threshold value TH. By contrast, a common step-up/down switching regulator as shown in FIG. 38 shifts between the step-up/down or step-up mode and the step-down mode according to whether or not the battery voltage $V_{BAT}$ is equal to or lower than a first predetermine value A1. The common step-up/down switching regulator shown in FIG. 38 has the shortcoming of the optimum value of the first predetermine value A1 varying with how the output voltage $V_{OUT}$ is set. In contrast, in the example of operation shown in FIG. 19E, how the output voltage $V_{OUT}$ is set does not affect the optimum value of the threshold value TH, and thus does not require the threshold value TH to be varied.

Figure 21:
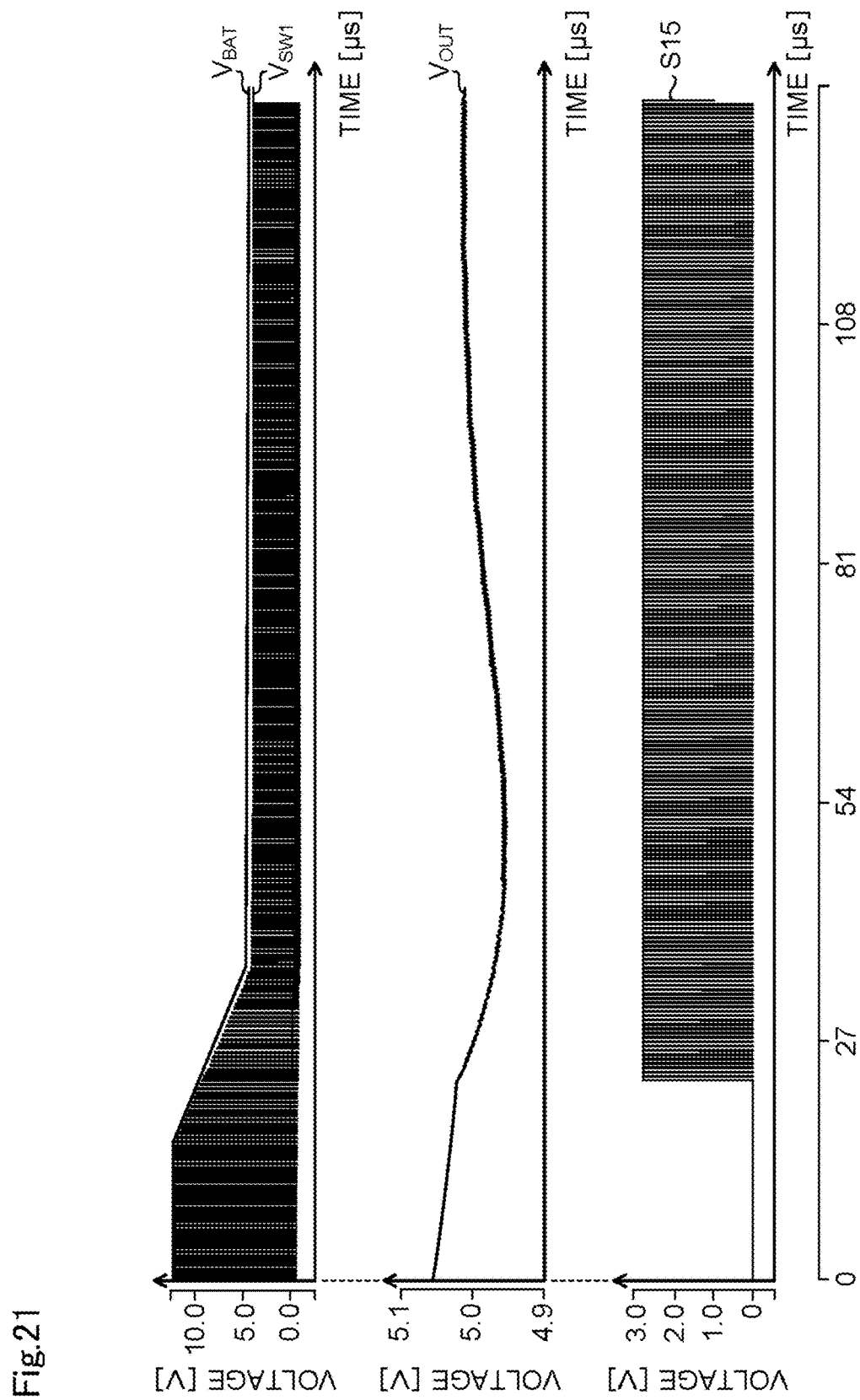
FIG. 21 is a diagram showing results of a simulation of a drop in a battery voltage $V_{BAT}$.

FIG. 21 shows the results of a simulation performed to study how the first switching voltage $V_{SW1}$, the output voltage $V_{OUT}$, and the mode designation signal S13 behave in the switching regulator 108 when the battery voltage $V_{BAT}$ falls from 12.4 [V] to 4.9 [V]. According to the simulation results shown in FIG. 21, the output voltage $V_{OUT}$ immediately before the shift from the step-down mode to the step-up/down mode is 5.02 [V], and the minimum value of the output voltage $V_{OUT}$ in the step-up/down mode is 4.95 [V]; throughout the transition from the step-down mode to the step-up/down mode, the output voltage $V_{OUT}$ remains approximately constant. That is, the simulation confirms that the switching regulator 108 has a good response in the step-up/down mode.

The results of simulations performed to study Bode plots of the switching regulator 108 are as shown in FIGS. 7A and 7B as in the first and other embodiments. As will be described later in connection with a ninth embodiment, by making the value obtained by multiplying together 1 minus the fixed value D' and the gain of the error amplifier 11 in the step-up/down mode equal to the gain of the error amplifier 11 in the step-down mode, it is possible to improve the gain in the step-up/down mode as shown in FIG. 7C.

In the above description, the fixed-duty circuit 5 sets one fixed value D' for the ON-duty; instead, the fixed-duty circuit 5 may set a plurality of fixed values D'. An example of how the duty detection circuit 8 operates when the fixed-duty circuit 5 sets a plurality of fixed values D' will now be described with reference to a flow chart in FIG. 22.

After start-up, the duty detection circuit 8 outputs a low level as the mode designation signal S13 (Step #10). That is, immediately after start-up, the switching regulator 108 operates in the step-down mode. Immediately after start-up, the fixed-duty circuit 5 sets the fixed value D' of the ON-duty at a middle value.

Subsequently to Step #10, at Step #20, the duty detection circuit 8 checks whether or not the ON-duty of the MOS transistor Q1 is equal to or higher than the first threshold value on the basis of the duty signal S11 and the masking signal S12.

Here, if, within m cycles of the switching operation of the MOS transistor Q1, the ON-duty of the MOS transistor Q1 becomes equal to or higher than the first threshold value n times or more (where n is a natural number that is equal to or less than m), the duty detection circuit 8 determines that the ON-duty of the MOS transistor Q1 is equal to or higher than the first threshold value. For m that is greater than one, the m cycles may be consecutive m cycles, or may be discontinuous m cycles.

So long as the ON-duty of the MOS transistor Q1 is not found to be equal to or higher than the first threshold value (Step #20, NO), the check at Step #20 is repeated.

On the other hand, if the ON-duty of the MOS transistor Q1 is found to be equal to or higher than the first threshold value (Step #20, YES), the duty detection circuit 8 turns the level of the mode designation signal S13 from low level to high level (Step #30).

Subsequently to Step #30, at Step #40, the duty detection circuit 8 checks whether or not the ON-duty of the MOS transistor Q1 is equal to or higher than the first threshold value on the basis of the duty signal S11 and the masking signal S12. The check here is made in the same manner as at Step #20.

If the ON-duty of the MOS transistor Q1 is found to be equal to or higher than the first threshold value (Step #40, YES), the duty detection circuit 8 then checks whether or not the fixed value D' of the ON-duty that is set by the fixed-duty circuit 5 has reached an upper limit value (Step #50).

If the fixed value D' of the ON-duty has reached the upper limit value (Step #50, YES), it cannot be increased further; thus, the flow returns to Step #40 with the fixed value D' of the ON-duty unchanged. On the other hand, if the fixed value D' of the ON-duty has not reached the upper limit value (Step #50, NO), the duty detection circuit 8 controls the fixed-duty circuit 5 to increase the fixed value D' of the ON-duty one step (Step #60), and the flow then returns to Step #40.

If, at Step #40, the ON-duty of the MOS transistor Q1 is found not to be equal to or higher than the first threshold value (Step #40, NO), the duty detection circuit 8 checks whether or not the ON-duty of the MOS transistor Q1 is equal to or lower than the second threshold value on the basis of the duty signal S11 and the masking signal S12 (Step #70).

Here, if, within m' cycles of the switching operation of the MOS transistor Q1, the ON-duty of the MOS transistor Q1 becomes equal to or lower than the second threshold value n' times (where n' is a natural number that is equal to or less than m'), the duty detection circuit 8 determines that the ON-duty of the MOS transistor Q1 is equal to or lower than the second threshold value. For m' that is greater than one, the m' cycles may be consecutive m' cycles, or may be discontinuous m' cycles.

If the ON-duty of the MOS transistor Q1 is found to be equal to or lower than the second threshold value (Step #70, YES), the duty detection circuit 8 then checks whether or not the fixed value D' of the ON-duty that is set by the fixed-duty circuit 5 has reached a lower limit value (Step #80).

If the fixed value D' of the ON-duty has reached the lower limit value (Step #80, YES), the flow returns to Step #10 to turn the level of the mode designation signal S13 from high level to low level. When the flow returns to Step #10, the duty detection circuit 8 controls the fixed-duty circuit 5 to set the fixed value D' of the ON-duty at the middle value. On the other hand, if the fixed value D' of the ON-duty has not reached the lower limit value (Step #80, NO), the duty detection circuit 8 controls the fixed-duty circuit 5 to decrease the fixed value D' of the ON-duty one step (Step #90), and the flow then returns to Step #70.

Figure 22:
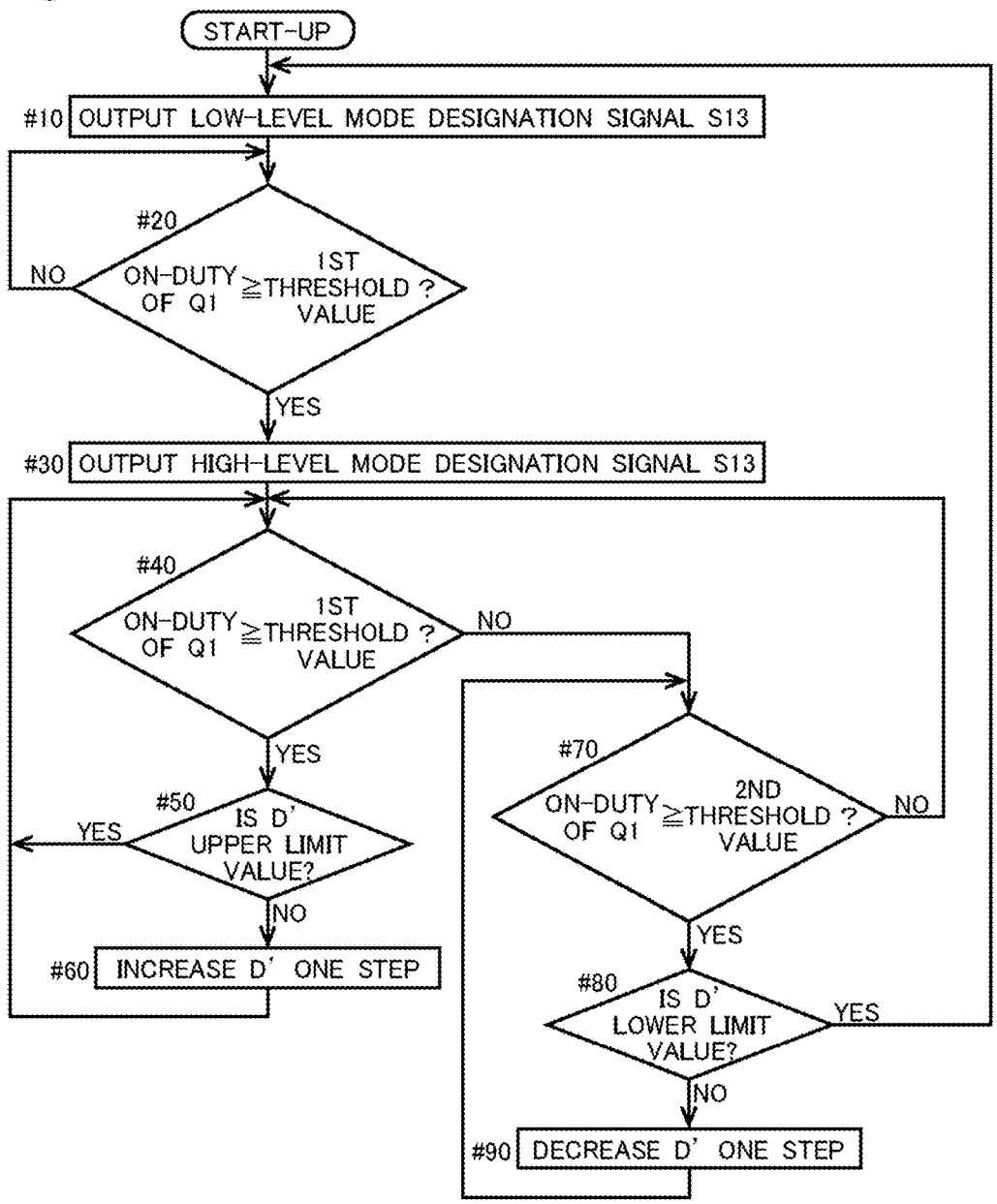
FIG. 22 is a flow chart showing an example of operation of a duty detection circuit in the eighth embodiment.

According to the operation in the flow chart in FIG. 22, when the ratio of the battery voltage $V_{BAT}$ to the output voltage $V_{OUT}$ decreases, it is possible to gradually increase the fixed value D' of the ON-duty without changing the first threshold value. It is thus possible to achieve easy and stable control in the step-up/down mode. Likewise, according to the operation in the flow chart in FIG. 22, when the ratio of the battery voltage $V_{BAT}$ to the output voltage $V_{OUT}$ increases, it is possible to gradually decrease the fixed value D' of the ON-duty without changing the second threshold value. It is thus possible to achieve easy and stable control in the step-up/down mode.

Overall Configuration (Ninth Embodiment)

Figure 23:
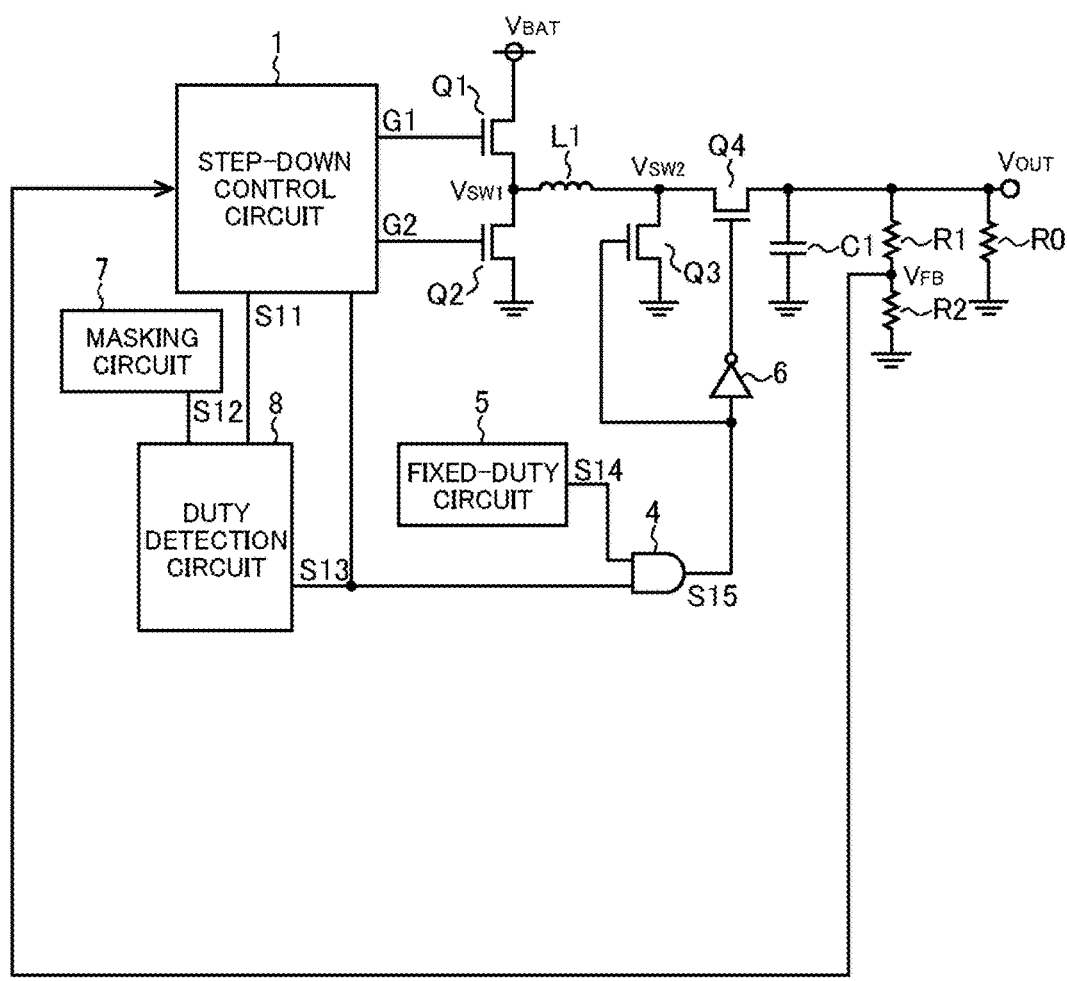
FIG. 23 is a diagram showing an exemplary overall configuration of a switching regulator according to a ninth embodiment of the present invention.

FIG. 23 is a diagram showing an exemplary overall configuration of a switching regulator according to a ninth embodiment of the present invention. The switching regulator 109 of this exemplary configuration differs from the switching regulator 108 in that the mode designation signal S13 is fed, as well as to the AND gate 4, also to the step-down control circuit 1; in other respects, the switching regulator 109 is basically identical with the switching regulator 108.

Figure 24:
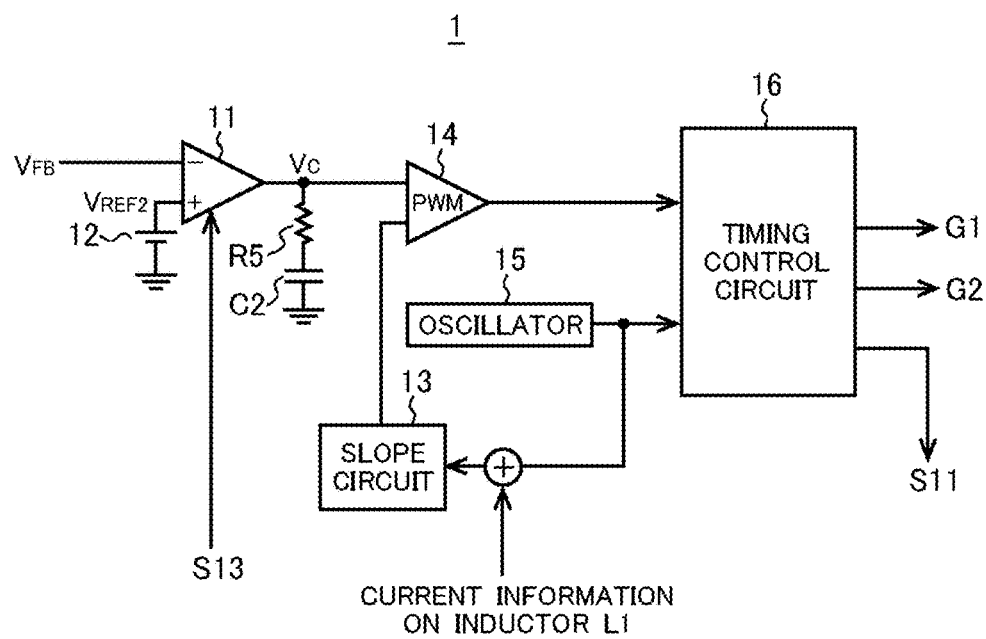
FIG. 24 is a diagram showing one exemplary configuration of a step-down control circuit in the ninth embodiment.

Exemplary Configuration of the Step-Down Control Circuit:

FIG. 24 is a diagram showing one exemplary configuration of the step-down control circuit 1. The step-down control circuit 1 in the example shown in FIG. 24 differs from the step-down control circuit 1 in the example shown in FIG. 19A in that the error amplifier 11 is a variable-gain amplifier; in other respects, the step-down control circuit 1 here is basically identical with that in the example shown in FIG. 19A.

The error amplifier 11 operates at a higher gain when the mode designation signal S13 is at high level (in the step-up/down mode) than when the mode designation signal S13 is at low level (in the step-down mode). This makes the transfer characteristics of the entire switching regulator 109 in the step-up/down mode closer to the transfer characteristics of the entire switching regulator 109 in the step-down mode, and thus helps further improve the response characteristics of the switching regulator 109 in the step-up/down mode.

Preferably, the error amplifier 11 changes its gain according to the mode designation signal S13 such that the value obtained by multiplying together 1 minus the fixed value D' and the gain of the error amplifier 11 as it is when the mode designation signal S13 is at high level (in the step-up/down mode) equals the gain of the error amplifier 11 as it is when the mode designation signal S13 is at low level (in the step-down mode). In this way, it is possible to make the transfer characteristics of the entire switching regulator 109 in the step-up/down mode identical with the transfer characteristics of the entire switching regulator 109 in the step-down mode. It is thus possible to make the response characteristics of the switching regulator 109 in the step-up/down mode identical with the response characteristics of the switching regulator 109 in the step-down mode.

Overall Configuration (Tenth Embodiment)

Figure 25:
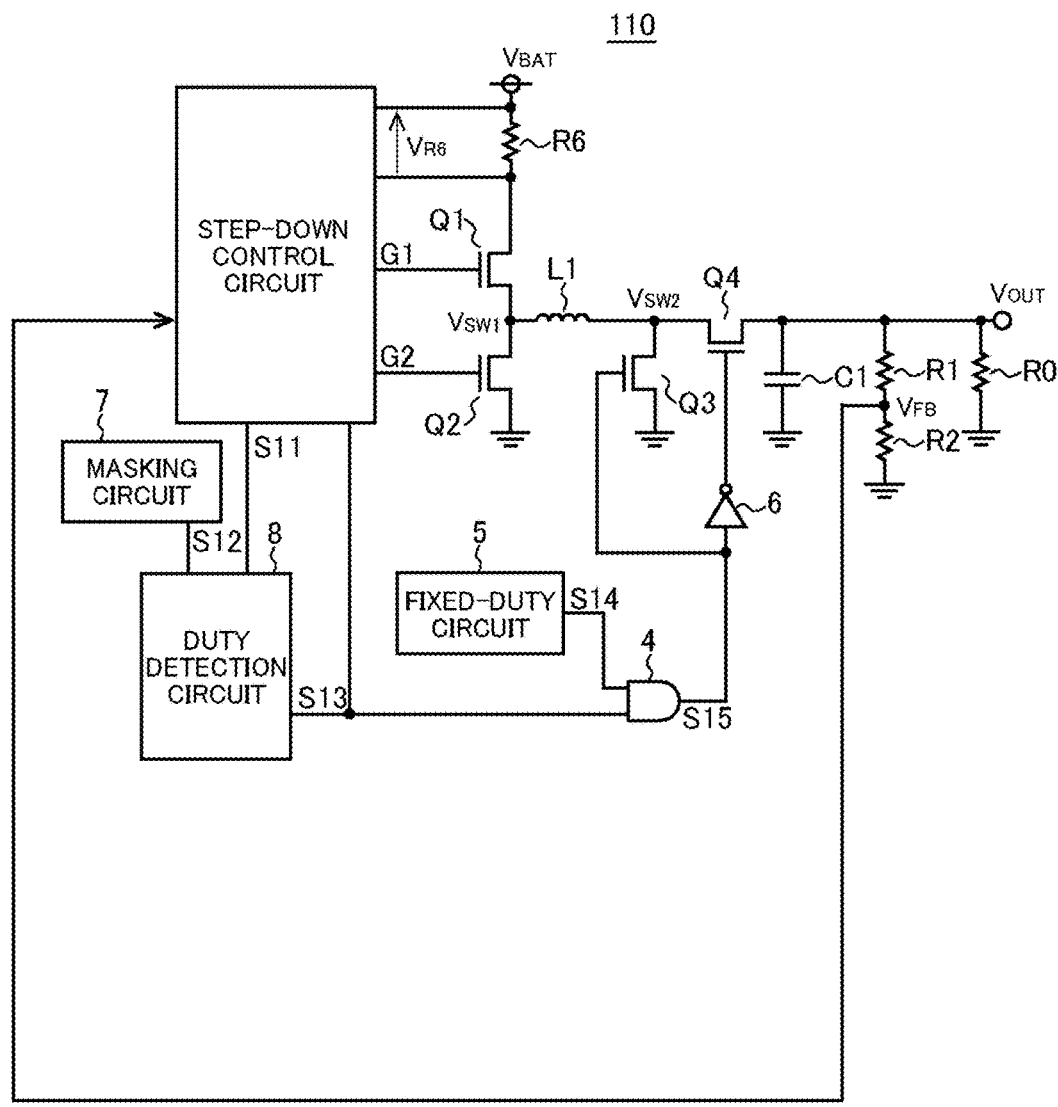
FIG. 25 is a diagram showing an exemplary overall configuration of a switching regulator according to a tenth embodiment of the present invention.

FIG. 25 is a diagram showing an exemplary overall configuration of a switching regulator according to a tenth embodiment of the present invention. The switching regulator 110 of this exemplary configuration differs from the switching regulator 108 in that the mode designation signal S13 is fed, as well as to the AND gate 4, also to the step-down control circuit 1, and that the drain of the MOS transistor Q1 is connected via a current detection resistor R6 to the input voltage application terminal, to which the battery voltage $V_{BAT}$ is applied, so that the voltage $V_{R6}$ across the current detection resistor R6 is fed to the step-down control circuit 1; in other respects, the switching regulator 110 is basically identical with the switching regulator 108.

Figure 26:
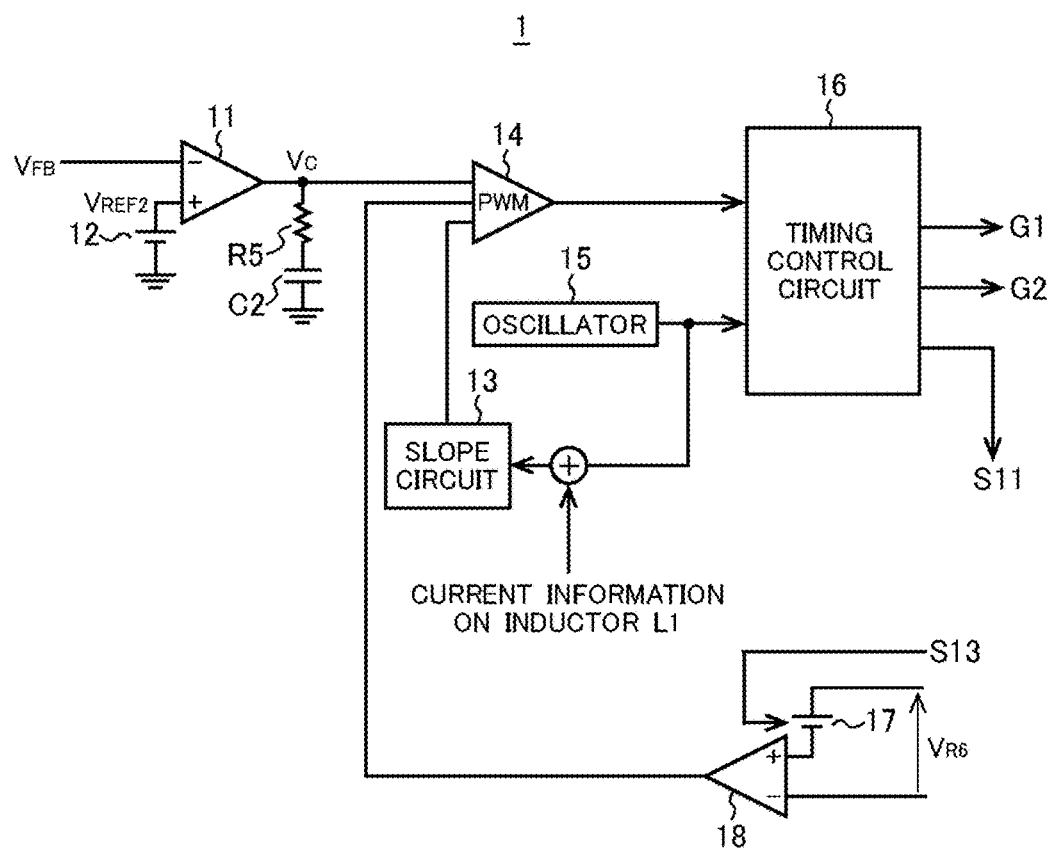
FIG. 26 is a diagram showing one exemplary configuration of a step-down control circuit in the tenth embodiment.

Exemplary Configuration of the Step-Down Control Circuit:

FIG. 26 is a diagram showing one exemplary configuration of the step-down control circuit 1. The step-down control circuit 1 in the example shown in FIG. 26 differs from the step-down control circuit 1 in the example shown in FIG. 19A in that it additionally includes a variable voltage source 17 and a comparator 18, and that the output signal of the comparator 18 is fed to the comparator 14; in other respects, the step-down control circuit 1 here is basically identical with that in the example shown in FIG. 19A.

The current detection resistor R6 (see FIG. 25), the variable voltage source 17, and the comparator 18 monitor whether or not the current through the MOS transistor Q1 has reached a predetermined overcurrent detection threshold value. The output voltage (offset voltage) of the variable voltage source 17 corresponds to the predetermined overcurrent detection threshold value, so that, when the current through the MOS transistor Q1 is equal to or higher than the predetermined overcurrent detection threshold value, the comparator 18 outputs a high-level signal and, when the current through the MOS transistor Q1 is lower than the predetermined overcurrent detection threshold value, the comparator 18 outputs a low-level signal. The current detection resistor R6 may be used, as well as for overcurrent detection, also for acquisition of current information as to the inductor L1.

The comparator 14 compares the phase-compensated error signal with the output voltage of the slope circuit 13 to generate a comparison signal and to output it as the reset signal when the output signal of the comparator 18 is at low level, and generates a high-level signal to output it as the reset signal when the output signal of the comparator 18 is at high level. Thus, when the output signal of the comparator 18 is at high level, the step-down control circuit 1 keeps the MOS transistor Q1 OFF, and thus the current through the MOS transistor Q1 is suppressed.

The variable voltage source 17 makes the value of the constant voltage (offset voltage) higher when the mode designation signal S13 is at high level (in the step-up/down mode) than when the mode designation signal S13 is at low level (in the step-down mode). In this way, it is possible to make the predetermined overcurrent detection threshold value of the switching regulator 110 in the step-up/down mode higher than the predetermined overcurrent detection threshold value of the switching regulator 110 in the step-down mode.

Whereas the average current through the inductor L1 in the step-down mode equals the output current of the switching regulator 110, the average current through the inductor L1 in the step-up/down mode equals the value obtained by dividing the output current of the switching regulator 110 by 1 minus the fixed value D'. Thus, by making the current detection threshold value variable as described above, it is possible to prevent excessively strict overcurrent detection in the step-up/down mode.

Preferably, the variable voltage source 17 changes the value of the constant voltage (offset voltage) according to the mode designation signal S13 such that the value obtained by multiplying together 1 minus the fixed value D' and the overcurrent detection threshold value as it is when the mode designation signal S13 is at high level (in the step-up/down mode) equals the overcurrent detection threshold value as it is when the mode designation signal S13 is at low level (in the step-down mode). In this way, it is possible to make the tolerated output current value of the switching regulator 110 equal in the step-up/down mode and in the step-down mode.

Semiconductor Package:

An example of how a switching regulator as described above is implemented in a semiconductor package will now be described, with the switching regulator 104 taken up as a specific example.

Figure 27:
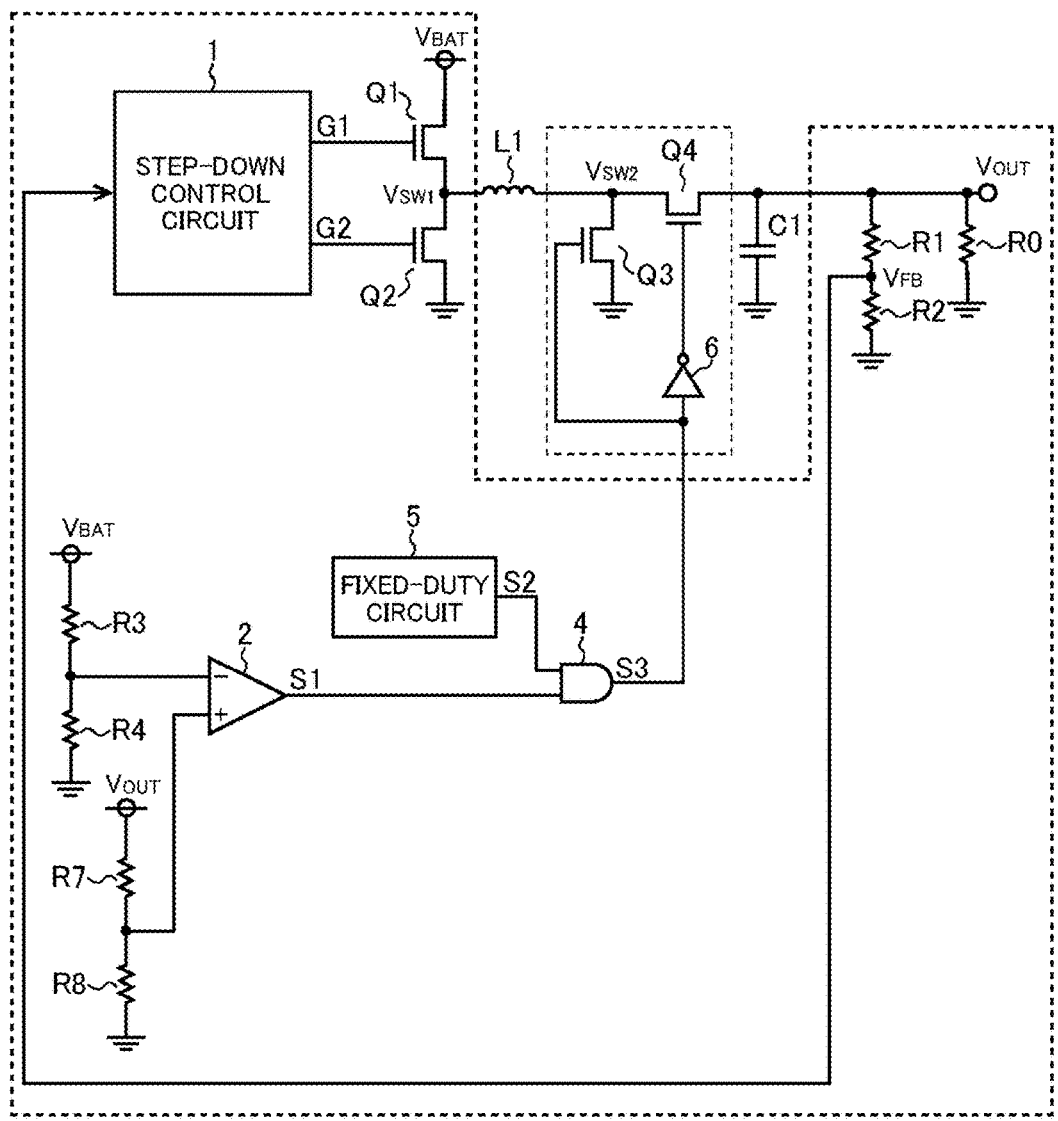
FIG. 27 is a diagram illustrating parts of the switching regulator shown in FIG. 12 that are accommodated in semiconductor packages.

Of the switching regulator 104, the part surrounded by a thick broken line in FIG. 27 is accommodated in a first semiconductor package U1. Of the switching regulator 104, the part surrounded by a thin broken line in FIG. 27 is accommodated in a second semiconductor package U2.

Figure 28:
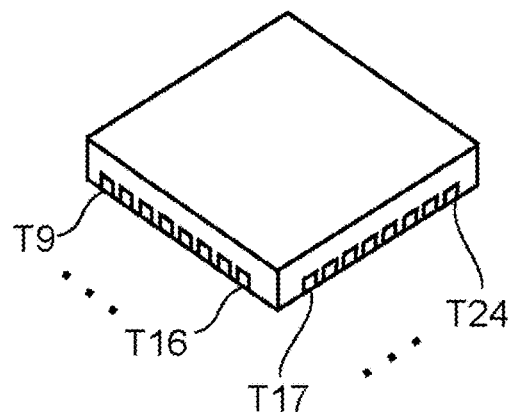
FIG. 28 is a perspective top view of a first semiconductor package.
Figure 29:
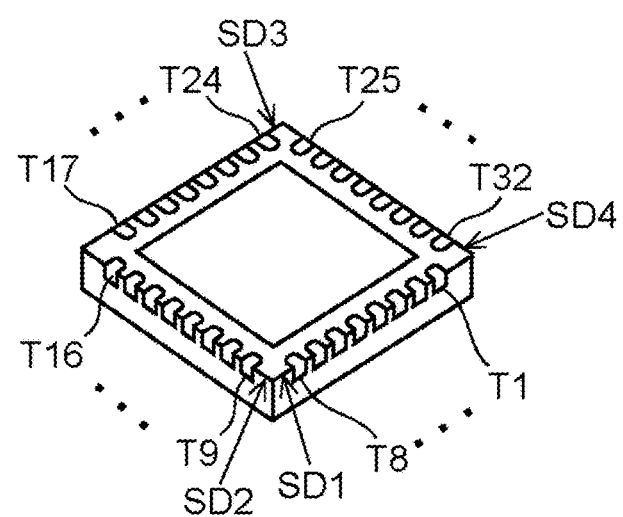
FIG. 29 is a perspective bottom view of a first semiconductor package.
Figure 30:
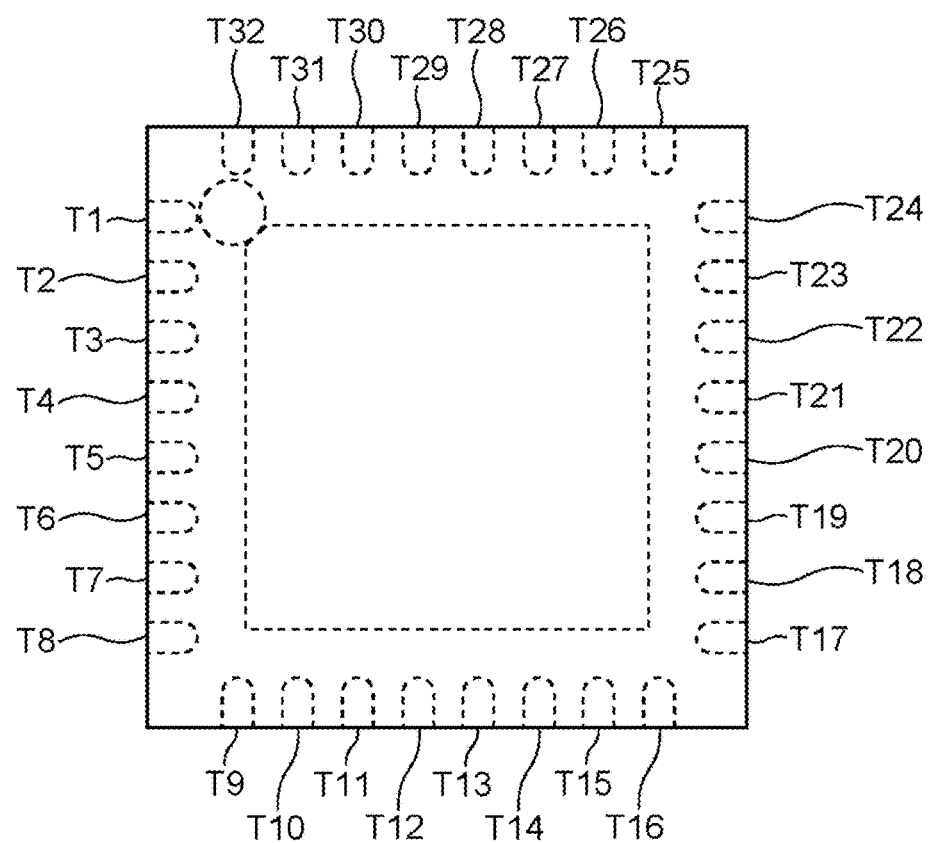
FIG. 30 is a top view of a first semiconductor package.

The first semiconductor package U1 is a QFN (quad flat no-leads) package as shown in FIGS. 28 and 29; it has 32 terminals T1 to T32 along the four sides of its bottom part, and has a substantially square heat dissipation pad P1 at the center of the bottom part. FIG. 30 is a top view of the first semiconductor package U1.

Terminal No. 1 T1 is an analog supply input terminal. Terminals Nos. 2 to 8 T2 to T8 are power supply input terminals. Terminals Nos. 9 to 16 T9 to T16 are power ground terminals. Terminals Nos. 17 to 23 T17 to T23 are output terminals. Terminal No. 24 T24 is a driver supply terminal. Terminal No. 25 T25 is a step-up switching control signal terminal. Terminal No. 26 T26 is a mode switch terminal. Terminal No. 27 T27 is an output voltage sense terminal. Terminal No. 28 T28 is an output voltage feedback terminal. Terminal No. 29 T29 is a ground terminal. Terminal No. 30 T30 is an internal 5 V supply terminal. Terminal No. 31 T31 is an output fault signal output terminal. Terminal No. 32 T32 is an enable control/external synchronization terminal.

Terminals Nos. 1 to 8 T1 to T8, at which voltages are fed in, are provided along a first side SD1 of the bottom part of the first semiconductor package U1. Terminals Nos. 9 to 16 T9 to T16, which are power ground terminals, are provided along a second side SD2 of the bottom part of the first semiconductor package U1, the second side SD2 being adjacent to the first side SD1. Terminals Nos. 17 to 23 T17 to T23, which are output terminals, and terminal No. 24 T24, which is a driver supply terminal, are provided along a third side SD3 of the bottom part of the first semiconductor package U1, the third side SD3 being opposite the first side SD1 and adjacent to the second side SD2. Terminals Nos. 25 to 32 T25 to T32 are provided along a fourth side SD4 of the bottom part of the first semiconductor package U1, the fourth side SD4 being opposite the second side SD2 and adjacent to the first side SD1 and the third side SD3.

Terminal No. 1 T1 is an input terminal at which an analog supply power is fed in to be supplied to a constant voltage generation circuit. The constant voltage generation circuit is a circuit that generates DC (direct-current) 5 V; it is accommodated in the first semiconductor package U1, and supplies the DC 5 V to part of the other circuits accommodated in the first semiconductor package U1. Terminals Nos. 2 to 8 T2 to T8 correspond to the input voltage application terminal that is connected to the drain of the MOS transistor Q1. Terminals Nos. 9 to 16 T9 to T16 correspond to the ground terminal that is connected to the source of the MOS transistor Q2. Terminals Nos. 17 to 23 T17 to T23 correspond to the connection node between the MOS transistors Q1 and Q2. Terminal No. 24 T24 is an input terminal at which a supply power is fed in to be supplied to the part of the step-down control circuit that generates the gate signal G1. Terminal No. 25 T25 is an output terminal at which the output signal S3 is fed out. Terminal No. 26 T26 is a terminal for selection, according to whether the signal applied to it is at high or low level, of whether or not to use light-load control, whereby switching is stopped under a light load. Terminal No. 27 T27 is an input terminal at which the output voltage $V_{OUT}$ is fed in to be supplied to the voltage division circuit constituted by the resistors R1 and R2. Terminal No. 29 T29 corresponds to the ground terminal of the control and other circuits accommodated in the first semiconductor package U1. Terminal No. 30 T30 is an output terminal at which the constant DC 5 V voltage generated by the above-mentioned constant voltage generation circuit is fed out. Terminal No. 31 T31 is an output terminal at which a power good signal is fed out of the first semiconductor package U1. Terminal No. 32 T32 is an input terminal at which an enable signal or an external synchronization signal is fed in. By means of the enable signal or the external synchronization signal, the constant voltage generation circuit can be switched between an operating and a non-operating state.

Figure 31:
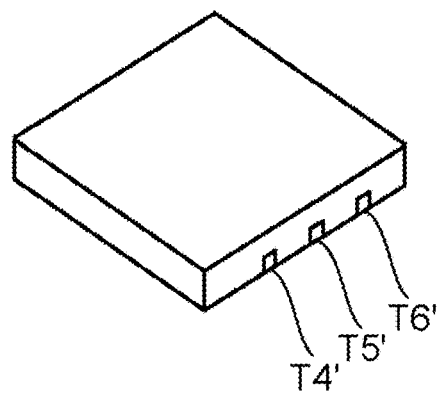
FIG. 31 is a perspective top view of a second semiconductor package.
Figure 32:
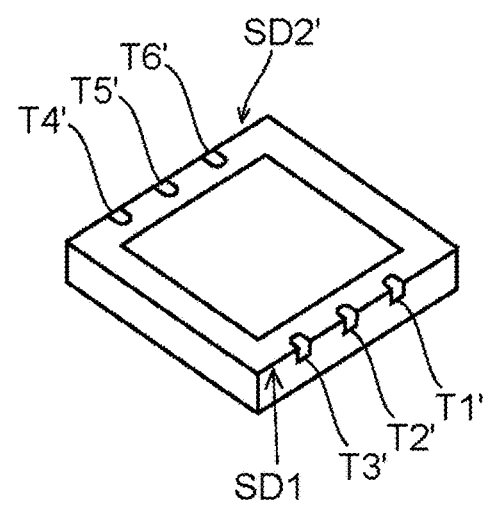
FIG. 32 is a perspective bottom view of a second semiconductor package.
Figure 33:
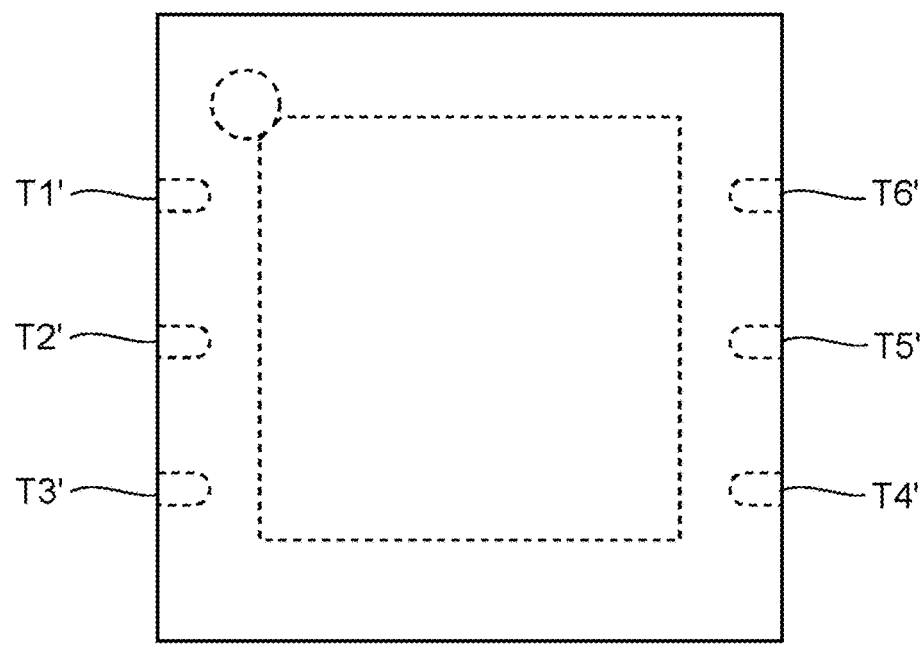
FIG. 33 is a top view of a second semiconductor package.

The second semiconductor package U2 is an SON (small-outline no-leads) package as shown in FIGS. 31 and 32; it has six terminals T1' to T6' along two opposite sides of its bottom part, and has a substantially square heat dissipation pad P1' at the center of the bottom part. FIG. 33 is a top view of the second semiconductor package U2.

Terminals Nos. 1 and 2 T1' and T2' are input terminals. Terminal No. 3 T3' is a power ground terminal. Terminals Nos. 4 and 5 T4' and T5' are step-up switching control signal terminals. Terminal No. 6 T6' is an output terminal.

Terminals Nos. 1 to 3 T1' to T3' are provided along a first side SD1' of the bottom part of the second semiconductor package U2. Terminals Nos. 4 to 6 T4' to T6' are provided along a second side SD2' of the bottom part of the second semiconductor package U2. The first and second sides SD1' and SD2' of the bottom part of the second semiconductor package U2 are located opposite each other.

Terminals Nos. 1 and 2 T1' and T2' correspond to the connection node between the MOS transistors Q3 and Q4. Terminal No. 3 T3' corresponds to the ground terminal that is connected to the source of the MOS transistor Q3. Terminal No. 4 T4' is an input terminal at which the signal S3 is fed in. Terminals Nos. 5 and 6 T5' and T6' are an output terminal that are connected to the source of the MOS transistor Q4.

Figure 34:
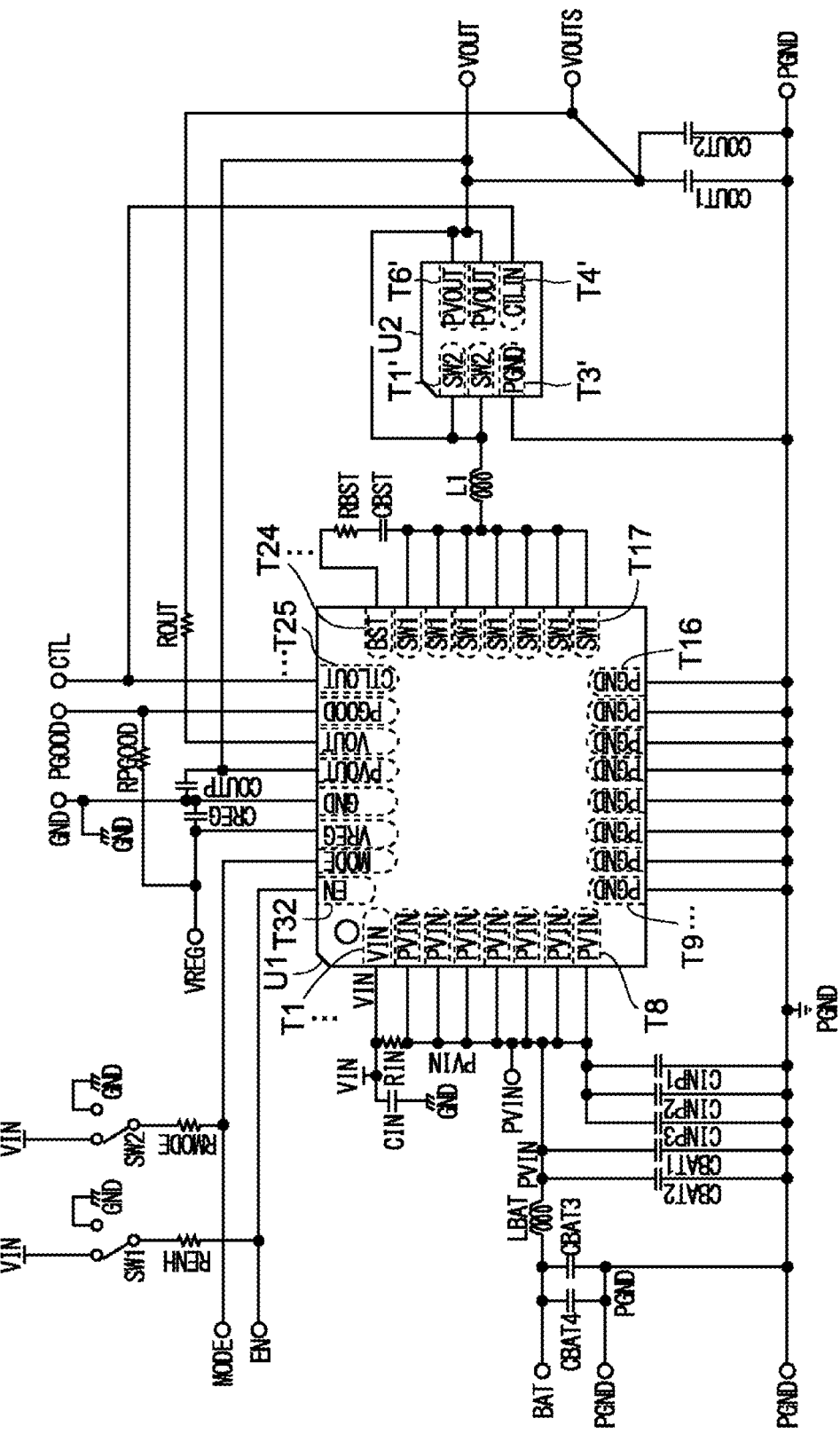
FIG. 34 is a diagram showing an example of a specific circuit configuration of the switching regulator shown in FIG. 12 when built by use of a first and a second semiconductor package.

FIG. 34 is a diagram showing an exemplary specific circuit configuration of the switching regulator 104 implemented in the first and second semiconductor packages U1 and U2. The input voltage PVIN shown in FIG. 34 corresponds to the battery voltage $V_{BAT}$ shown in FIG. 12, and the output voltage VOUT shown in FIG. 34 corresponds to the output voltage $V_{OUT}$ shown in FIG. 12.

Figure 35:
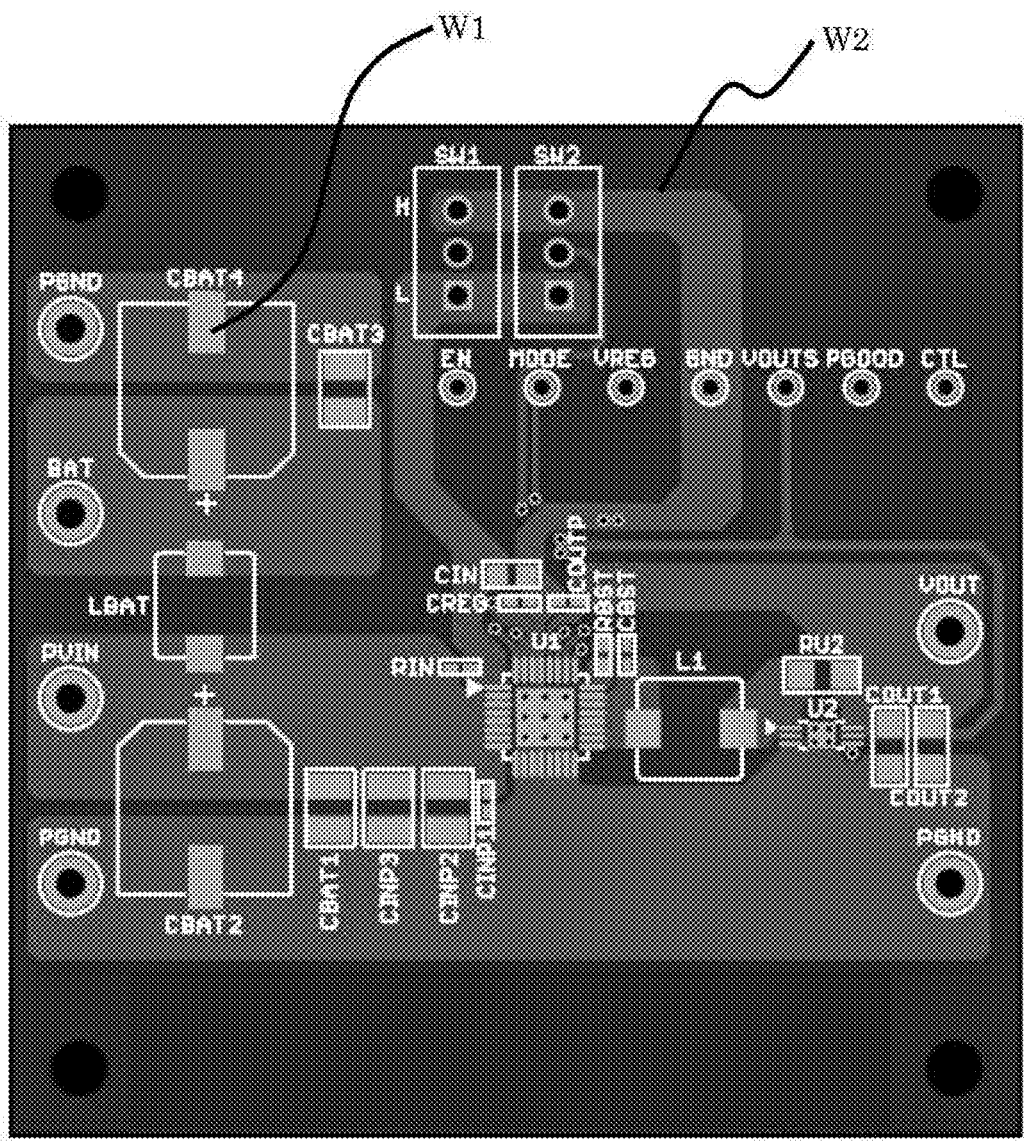
FIG. 35 is a diagram showing one example of a printed circuit board on which to mount the components of the switching regulator shown in FIG. 34.

FIG. 35 is a diagram showing an example of a printed circuit board on which to mount the first and second semiconductor packages U1 and U2 along with discrete circuit elements as the components of the switching regulator shown in FIG. 34.

The printed circuit board shown in FIG. 35 is a printed circuit board with two wiring layers. On the surface (on the side on which the components of the switching regulator shown in FIG. 34 are mounted) of the printed circuit board shown in FIG. 35, the names of the components to be mounted are printed in white letters, and the positions at which they are to be mounted are printed with white lines. A solid white triangular mark printed on the surface of the printed circuit board shown in FIG. 35 indicates the mounting position of terminal No. 1 of a semiconductor package. A first wiring layer W1 is exposed at the surface of the printed circuit board shown in FIG. 35. A second wiring layer W2 is provided inside the printed circuit board shown in FIG. 35. At positions where the first wiring layer W1 overlaps the second wiring layer W2 in FIG. 35, connecting elements for electrical connection between the first and second wiring layers W1 and W2 are provided inside the printed circuit board shown in FIG. 35.

In the switching regulator shown in FIG. 34, a high pulsating current passes around two loops in the step-down mode. The first loop is one around which the current passes when the MOS transistor Q1 is ON, passing through the input capacitors (capacitors CINP1 to CINP3), the MOS transistor Q1, the inductor L1, and the output capacitors (capacitors COUT1 to COUT2) in this order and returning from the ground of the output capacitors to the ground of the input capacitors. The second loop is one around which the current passes when the MOS transistor Q2 is ON, passing through the MOS transistor Q2, the inductor L1, and the output capacitors (capacitors COUT1 to COUT2) in this order and returning from the ground of the output capacitors to the ground of the MOS transistor Q2. By implementing those two loops with as thick and short paths as possible, it is possible to reduce noise and enhance efficiency.

Accordingly, the printed circuit board shown in FIG. 35 is laid out such that the input capacitors (capacitors CINP1 to CINP3) are mounted near the terminals Nos. 2 to 8 T2 to T8 of the first semiconductor package U1, on the same side as the first semiconductor package U1. Moreover, the printed circuit board shown in FIG. 35 is laid out such that terminals Nos. 17 to 23 T17 to T23 are mounted near the inductor L1. Moreover, the printed circuit board shown in FIG. 35 is laid out such that the output capacitors (capacitors COUT1 to COUT2) are mounted far away from the input capacitors (capacitors CINP1 to CINP3) so as to be prevented from being influenced by high-frequency noise from the input side. Connecting the input and output capacitors to the copper foil plane that serves as a GND node helps reduce noise and enhance efficiency. Moreover, arranging the copper foil plane that serves as a GND node over a large area helps prompt heat dissipation from the ICs and the components around them.

The printed circuit board shown FIG. 35 includes a region where a resistor RU2 can be mounted.

Figure 36:
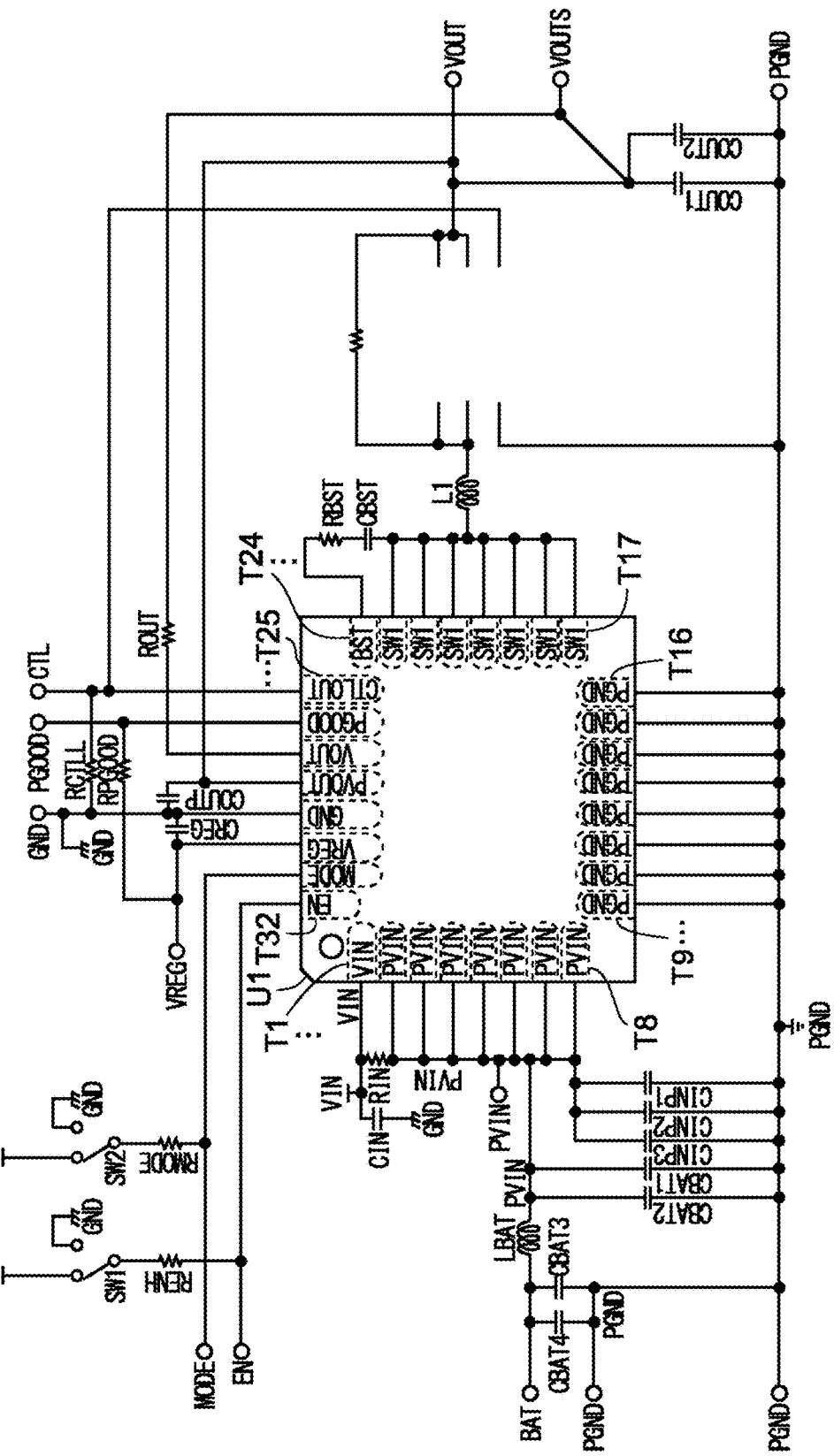
FIG. 36 is a diagram showing a circuit configuration obtained when, instead of the second semiconductor package in the switching regulator shown in FIG. 34, a resistor is mounted on the printed circuit board shown in FIG. 35.

FIG. 36 is a diagram showing a circuit configuration for a case where, instead of the second semiconductor package U2 in the switching regulator shown in FIG. 34, a resistor RU2 is mounted on the printed circuit board shown in FIG. 35, and in addition a resistor RCTLL is mounted. In the switching regulator shown in FIG. 36, a first terminal of the resistor RU2 is connected to a second terminal of the inductor L1, and a second terminal of the resistor RU2 is connected to the terminal to which the output voltage VOUT is applied, the switching regulator thus functioning as a step-down switching regulator. Here, at start-up, a control circuit in the first semiconductor package U1 may detect the resistor RCTLL connected to GND being connected to terminal No. 25 T25 to change operation modes so that the switching regulator performs only step-down operation. The configuration shown in FIG. 36 may be modified to one where terminal No. 25 T25 is connected via the resistor RCTLL directly to a power source or to a fixed potential node, or one where terminal No. 25 T25 is connected directly to GND, a power source, or a fixed potential node.

Thus, when a step-up/down switching regulator is required, the second semiconductor package U2 can be mounted on the printed circuit board shown in FIG. 35; in a case where a step-down switching regulator is required, the resistor RU2 and the resistor RCTLL can be mounted on the printed circuit board shown in FIG. 35. In other words, by use of the printed circuit board shown in FIG. 35, a step-up/down switching regulator and a step-down switching regulator can share components except the second semiconductor package U2 and the resistor RU2. That is, the first semiconductor package U1 can be used even in a case where a step-down switching regulator is required, and thus there is no need to select a semiconductor package dedicated to a step-down switching regulator.

Figure 37:
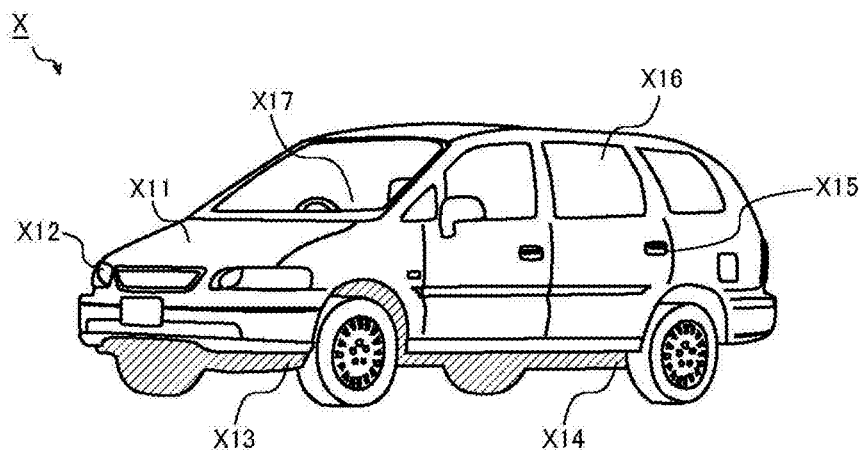
FIG. 37 is an exterior view showing one exemplary configuration of a vehicle incorporating vehicle-mounted appliances.

Application:

Examples of application of the switching regulators 101 to 110 and 107' described previously will now be described. FIG. 37 an exterior view showing one exemplary configuration of a vehicle that incorporates a vehicle-mounted appliance. The vehicle X of this exemplary configuration incorporates a battery (unillustrated), a primary switching regulator (unillustrated) that is fed with a direct-current voltage supplied from the battery, a secondary switching regulator (unillustrated) that is fed with a direct-current voltage output from the primary switching regulator, and vehicle-mounted appliances X11 to X17. Any one of the switching regulators 101 to 110 and 107' described previously can be applied to the primary switching regulator.

The vehicle-mounted appliances X11 to X17 are each fed with, as its supply voltage, either the output voltage of the primary switching regulator or the output voltage of the secondary switching regulator.

The vehicle-mounted appliance X11 is an engine control unit that performs control related to an engine (such as injection control, electronic throttle control, idling control, oxygen sensor heater control, and automatic cruising control).

The vehicle-mounted appliance X12 is a lamp control unit that controls the lighting and extinguishing of HIDs (high-intensity discharge lamps), DRLs (daytime running lamps), etc.

The vehicle-mounted appliance X13 is a transmission control unit that performs control related to a transmission.

The vehicle-mounted appliance X14 is a body control unit that performs control related to the movement of the vehicle X (such as ABS (anti-lock braking system) control, EPS (electric power steering) control, and electronic suspension control).

The vehicle-mounted appliance X15 is a security control unit that drives and controls door locks, anti-burglar alarms, etc.

The vehicle-mounted appliance X16 encompasses electronic appliances that are incorporated in the vehicle X before factory shipment as standard or optional equipment, such as wipers, power door mirrors, power windows, a power sunroof, power seats, and an air conditioner.

The vehicle-mounted appliance X17 encompasses electronic appliances that are attached to the vehicle X according to a user's needs, such as A/V (audiovisual) equipment, a car navigation system, and an ETC (electronic toll collection system).

Variations and Modifications:

The present invention can be implemented in any manners other than specifically described herein, and allows for many variations and modifications without departing from the spirit of the invention.

For example, the second and third embodiments can be implemented in combination. The modified and preferred examples described in connection with the first embodiment (e.g., using a diode instead of the MOS transistor Q2; using a diode instead of the MOS transistor Q4, providing a dead time, setting the fixed value D' at 0.7 or less, sharing the oscillator 15, etc.) are applicable also to other embodiments.

Although the embodiments described above deal with a current-mode-control switching regulator, this is not meant as any limitation; instead, any other control method, such as voltage mode control, may be adopted.

Although the embodiments described above deal with configurations where a battery voltage is used as the input voltage to the switching regulator, this is not meant as any limitation; instead, any direct-current voltage other than a battery voltage may be used as the input voltage to the switching regulator.

In the first to seventh embodiments described above, the fixed-duty circuit 5 may set one or a plurality of fixed values of the ON-duty. In a case where the fixed-duty circuit 5 sets a plurality of fixed values of the ON-duty, a configuration is adopted that allows a desired one of the plurality of values can be selected arbitrarily. This selection may be performed automatically within the switching regulator, or may be performed on the basis of input operation by a user. Here, a description will be given of an example where the just-mentioned selection is performed automatically within the switching regulator. In this example, at the time point that the output signal S1 of the comparator 2 turns from low level to high level, the switching regulator sets the fixed value D' at an initial value, and starts switching operation on the step-up side. Moreover, the switching regulator includes a first monitoring circuit that monitors, at a predetermined cycle starting at the time point that the output signal S1 of the comparator 2 turns from low level to high level, whether or not the output signal S1 of the comparator 2 remains at high level. Based on the result of monitoring by the first monitoring circuit, the fixed-duty circuit 5 increases the fixed value D' every predetermined cycle so long as the output signal S1 of the comparator 2 remains at high level. If, even when the fixed value D' has reached the maximum value, the output signal S1 of the comparator 2 remains at high level, the fixed value D' is set at the maximum value. In the seventh embodiment described above, the external signal ES1 can be used instead of the output signal S1 of the comparator 2, and in the modified example of the seventh embodiment described above, the signal S0 can be used instead of the output signal S1 of the comparator 2.

Although in the third and sixth embodiments described above, the constant voltage (offset voltage) of the variable voltage source 17 is changed according to the output signal S1 of the comparator 2, this is not meant as any limitation; instead, for example, the variable voltage source 17 may be replaced with a constant voltage source, and the voltage $V_{R6}$ across the current detection resistor R6 may be attenuated according to the output signal S1 of comparator 2 and is then applied between the positive terminal of the constant voltage source and the inverting input terminal of the comparator 18.

Although in the tenth embodiment described above, the constant voltage (offset voltage) of the variable voltage source 17 is changed according to the mode designation signal S13, this is not meant as any limitation; instead, for example, the variable voltage source 17 may be replaced with a constant voltage source, and the voltage $V_{R6}$ across the current detection resistor R6 may be attenuated according to the mode designation signal S13 and is then applied between the positive terminal of the constant voltage source and the inverting input terminal of the comparator 18.

The embodiments disclosed herein should be considered to be in every aspect illustrative and not restrictive. It should be understood that the technical scope of the present invention is defined not by the description of embodiments given above but by the scope of the appended claims and encompasses all variations and modifications in the sense and scope equivalent to those of the claims.

Synopsis:

According to one aspect of what is disclosed herein, a switching regulator for generating an output voltage from an input voltage includes: a first switch of which the first end is connected to a first application terminal to which the input voltage is applied; a second switch of which the first end is connected to the second end of the first switch and of which the second end is connected to a second application terminal to which a predetermined voltage lower than the input voltage is applied; an inductor of which the first end is connected to the connection node between the first and second switches; a third switch of which the first end is connected to the second end of the inductor and of which the second end is connected to the second application terminal; a fourth switch of which the first end is connected to the connection node between the inductor and the third switch and of which the second end is connected to a third application terminal to which the output voltage is applied; a first control circuit that generates a step-down control signal for complementarily turning ON and OFF the first and second switches according to the output voltage; and a second control circuit that generates a step-up control signal for complementarily turning ON and OFF the third and fourth switches while keeping the ON-duty D (0≤D≤1) of the third switch fixed at a fixed value D' (0<D'<1) in a step-up/down mode (a first configuration).

In the switching regulator of the first configuration described above, preferably, there is further provided a discriminator that checks whether or not the input voltage is equal to or lower than a predetermined value so that, in a step-down mode, in which the second control circuit does not generate the step-up control signal, when the discriminator finds the input voltage equal to or lower than the predetermined value, a mode shift occurs from the step-down mode to the step-up/down mode (a second configuration).

In the switching regulator of the first configuration described above, preferably, there is further provided a discriminator that checks whether or not the ratio of the input voltage to the output voltage is equal to or lower than a predetermine value so that, in a step-down mode, in which the second control circuit does not generate the step-up control signal, when the discriminator finds the ratio of the input voltage to the output voltage equal to or lower than the predetermine value, a mode shift occurs from the step-down mode to the step-up/down mode (a third configuration).

In the switching regulator of the first configuration described above, preferably, the switching regulator can be brought into the step-up/down mode by use of an external signal (a fourth configuration).

In the switching regulator of the fourth configuration described above, preferably, the external signal is a signal that indicates cranking on a vehicle (a fifth configuration).

In the switching regulator of any one of the first to fifth configurations described above, preferably, the second control circuit generates a control signal for keeping the third switch OFF and the fourth switch ON when the step-up/down mode is not in effect (a sixth configuration).

In the switching regulator of any one of the first to sixth configurations described above, preferably, the fixed value D' equals 0.7 or less (a seventh configuration).

In the switching regulator of any one of the first to seventh configurations described above, preferably, the first and second control circuits share an oscillator, the first control circuit generates the step-down control signal based on an output signal of the oscillator, and the second control circuit generates the step-up control signal based on the output signal of the oscillator (an eighths configuration).

In the switching regulator of any one of the first to eighth configurations described above, preferably, the first control circuit includes an error signal generation circuit that generates an error signal by giving a gain to the difference between a feedback voltage commensurate with the output voltage and a predetermined reference voltage, and the error signal generation circuit makes the gain higher when the step-up/down mode is in effect than when the step-up/down mode is not in effect (a ninth configuration).

In the switching regulator of the ninth configuration described above, preferably, the value obtained by multiplying together 1 minus the fixed value D' and the gain when the step-up/down mode is in effect equals the gain when the step-up/down mode is not in effect (a tenth configuration).

In the switching regulator of any one of the first to tenth configurations described above, preferably, there is further provided an overcurrent protection circuit that monitors whether or not the current passing through the first switch has reached an overcurrent detection threshold value and that, when the current is detected being an overcurrent, feeds the first control circuit with an instruction to reduce the current so that the overcurrent protection circuit sets the overcurrent detection threshold value higher when the step-up/down mode is in effect than when the step-up/down mode is not in effect (an eleventh configuration).

In the switching regulator of the eleventh configuration described above, preferably, the value obtained by multiplying together 1 minus the fixed value D' and the overcurrent detection threshold value when the step-up/down mode is in effect equals the overcurrent detection threshold value when the step-up/down mode is not in effect (a twelfth configuration).

In the switching regulator of any one of the first to twelfth configurations described above, preferably, a plurality of values are set as the fixed value D' so that the fixed value D' can be selected arbitrarily from the plurality of values (a thirteenth configuration).

In the switching regulator of the second or third configuration described above, preferably, hysteresis is introduced in the check of whether or not the step-up/down mode is in effect (a fourteenth configuration).

In the switching regulator of the first configuration described above, preferably, there is further provided a first discriminator that checks whether or not the ON-duty of the first switch is equal to or higher than a first threshold value so that, in a step-down mode, in which the second control circuit does not generate the step-up control signal, when the first discriminator finds the ON-duty of the first switch equal to or higher than the first threshold value, a mode shift occurs from the step-down mode to the step-up/down mode (a fifteenth configuration).

In the switching regulator of the fifteenth configuration described above, preferably, a plurality of values are set as the fixed value D' so that the fixed value D' can be selected arbitrarily from the plurality of values, and in the step-up/down mode, when the first discriminator finds the ON-duty of the first switch equal to or higher than the first threshold value, the second control circuit increases the fixed value D' (a sixteenth configuration).

In the switching regulator of the fifteenth or sixteenth configuration described above, preferably, when, within m cycles of switching operation of the first switch, the ON-duty of the first switch becomes equal to or higher than the first threshold value n times or more (where n is a natural number equal to or lower than m), the first discriminator determines that the ON-duty of the first switch is equal to or higher than the first threshold value (a seventeenth configuration).

In the switching regulator of any one of the fifteenth to seventeenth configurations described above, preferably, the first discriminator checks whether or not the ON-duty of the first switch is equal to or higher than the first threshold value based on a signal obtained by smoothing the step-down control signal (an eighteenth configuration).

In the switching regulator of any one of the fifteenth to eighteenth configurations described above, preferably, the first threshold value is equal to or smaller than the maximum value of the ON-duty of the first switch as set by the first control circuit (a nineteenth configuration).

In the switching regulator of any one of the fifteenth to nineteenth configurations described above, preferably, there is further provided a second discriminator that checks whether or not the ON-duty of the first switch is equal to or lower than a second threshold value so that, in the step-up/down mode, when the second discriminator finds the ON-duty of the first switch equal to or lower than the second threshold value, a mode shift occurs from the step-up/down mode to the step-down mode, or a plurality of values are set as the fixed value D' so that the fixed value D' can be selected arbitrarily from the plurality of values and, while the step-up/down mode is kept in effect, the second control circuit reduces the fixed value D' (a twentieth configuration).

In the switching regulator of the twentieth configuration described above, preferably, when, within m' cycles of switching operation of the first switch, the ON-duty of the first switch becomes equal to or lower than the second threshold value n' times or more (where n' is a natural number equal to or lower than m'), the second discriminator determines that the ON-duty of the first switch is equal to or lower than the second threshold value (a twenty-first configuration).

In the switching regulator of the twentieth or twenty-first configuration described above, preferably, the second discriminator checks whether or not the ON-duty of the first switch is equal to or lower than the second threshold value based on a signal obtained by smoothing the step-down control signal (twenty-second configuration).

In the switching regulator of any one of the twentieth to twenty-second configurations described above, preferably, the second threshold value is smaller than the first threshold value (a twenty-third configuration).

In the switching regulator of any one of the first to twenty-third configurations described above, preferably, at least the first and second control circuits are accommodated in a first semiconductor package, the third and fourth switches are accommodated in a second semiconductor package different from the first semiconductor package, and a signal for driving the third and fourth switches is fed from an output terminal of the first semiconductor package to an input terminal of to second semiconductor package (a twenty-fourth configuration).

In a switching regulator including the first semiconductor package in the twenty-fourth configuration described above, when the output terminal of the first semiconductor package is connected directly, or via a resistor, to a ground, a supply power, or a fixed potential node, at least one of the first and second control circuits accommodated in the first semiconductor package determines that the input terminal of the second semiconductor package in the twenty-fourth configuration described above is not connected to the output terminal of the first semiconductor package, and when the input terminal of the second semiconductor package is detected not being connected to the output terminal of the first semiconductor package, the first and second control circuits accommodated in the first semiconductor package perform only step-down operation (a twenty-fifth configuration).

According to another aspect of what is disclosed herein, a switching regulator for generating an output voltage from an input voltage includes: a first switch of which the first end is connected to a first application terminal to which the input voltage is applied; a second switch of which the first end is connected to the second end of the first switch and of which the second end is connected to a second application terminal to which a predetermined voltage lower than the input voltage is applied; an inductor of which the first end is connected to the connection node between the first and second switches; a third switch of which the first end is connected to the second end of the inductor and of which the second end is connected to the second application terminal; a fourth switch of which the first end is connected to the connection node between the inductor and the third switch and of which the second end is connected to a third application terminal to which the output voltage is applied; a first control circuit that generates a step-down control signal for complementarily turning ON and OFF the first and second switches according to the output voltage; and a second control circuit that generates a step-up control signal for complementarily turning ON and OFF the third and fourth switches while setting the ON-duty of the third switch independently of either of the output voltage and the input voltage in a step-up/down mode (a twenty-sixth configuration).

According to yet another aspect of what is disclosed herein, a vehicle includes: a switching regulator as described in any one of the first to twenty-sixth configurations described above; and a battery that supplies the switching regulator with electric power (a twenty-seventh configuration).

What is claimed is:

1. A switching regulator for generating an output voltage from an input voltage, the switching regulator comprising:
   a first switch of which a first end is connected to a first application terminal to which the input voltage is applied;
   a second switch of which a first end is connected to a second end of the first switch and of which a second end is connected to a second application terminal to which a predetermined voltage lower than the input voltage is applied;
   an inductor of which a first end is connected to a connection node between the first and second switches;
   a third switch of which a first end is connected to a second end of the inductor and of which a second end is connected to the second application terminal;
   a fourth switch of which a first end is connected to a connection node between the inductor and the third switch and of which a second end is connected to a third application terminal to which the output voltage is applied;
   a first control circuit that generates a step-down control signal for complementarily turning ON and OFF the first and second switches according to the output voltage; and
   a second control circuit that generates a step-up control signal for complementarily turning ON and OFF the third and fourth switches while keeping an ON-duty D (0≤D≤1) of the third switch fixed at a fixed value D' (0<D'<1) in a step-up/down mode in which the first to fourth switches each perform switching operation.

2. The switching regulator as claimed in claim 1, further comprising:
   a discriminator that checks whether or not the input voltage is equal to or lower than a predetermined value, wherein
   in a step-down mode, in which the second control circuit does not generate the step-up control signal, when the discriminator finds the input voltage equal to or lower than the predetermined value, a mode shift occurs from the step-down mode to the step-up/down mode.

3. The switching regulator as claimed in claim 1, further comprising:
   a discriminator that checks whether or not a ratio of the input voltage to the output voltage is equal to or lower than a predetermine value, wherein
   in a step-down mode, in which the second control circuit does not generate the step-up control signal, when the discriminator finds the ratio of the input voltage to the output voltage equal to or lower than the predetermine value, a mode shift occurs from the step-down mode to the step-up/down mode.

4. The switching regulator as claimed in claim 1, wherein the switching regulator can be brought into the step-up/down mode by use of an external signal.

5. The switching regulator as claimed in claim 4, wherein the external signal is a signal that indicates cranking on a vehicle.

6. The switching regulator as claimed in claim 1, wherein the second control circuit generates a control signal for keeping the third switch OFF and the fourth switch ON when the step-up/down mode is not in effect.

7. The switching regulator as claimed in claim 1, wherein the fixed value D' equals 0.7 or less.

8. The switching regulator as claimed in claim 1, wherein the first and second control circuits share an oscillator, the first control circuit generating the step-down control signal based on an output signal of the oscillator, the second control circuit generating the step-up control signal based on the output signal of the oscillator.

9. The switching regulator as claimed in claim 1, wherein the first control circuit includes an error signal generation circuit that generates an error signal by giving a gain to a difference between a feedback voltage commensurate with the output voltage and a predetermined reference voltage, and
   the error signal generation circuit makes the gain higher when the step-up/down mode is in effect than when the step-up/down mode is not in effect.

10. The switching regulator as claimed in claim 9, wherein
    a value obtained by multiplying together 1 minus the fixed value D' and the gain when the step-up/down mode is in effect equals the gain when the step-up/down mode is not in effect.

11. The switching regulator as claimed in claim 1, further comprising:
    an overcurrent protection circuit that monitors whether or not a current passing through the first switch has reached an overcurrent detection threshold value and that, when the current is detected being an overcurrent, feeds the first control circuit with an instruction to reduce the current, and
    the overcurrent protection circuit sets the overcurrent detection threshold value higher when the step-up/down mode is in effect than when the step-up/down mode is not in effect.

12. The switching regulator as claimed in claim 11, wherein
    a value obtained by multiplying together 1 minus the fixed value D' and the overcurrent detection threshold value when the step-up/down mode is in effect equals the overcurrent detection threshold value when the step-up/down mode is not in effect.

13. The switching regulator as claimed in claim 1, wherein
    a plurality of values are set as the fixed value D' so that the fixed value D' can be selected arbitrarily from the plurality of values.

14. The switching regulator as claimed in claim 2, wherein
    hysteresis is introduced in a check of whether or not the step-up/down mode is in effect.

15. The switching regulator as claimed in claim 3, wherein
    hysteresis is introduced in a check of whether or not the step-up/down mode is in effect.

16. The switching regulator as claimed in claim 1, further comprising:
    a first discriminator that checks whether or not an ON-duty of the first switch is equal to or higher than a first threshold value, and
    in a step-down mode, in which the second control circuit does not generate the step-up control signal, when the first discriminator finds the ON-duty of the first switch equal to or higher than the first threshold value, a mode shift occurs from the step-down mode to the step-up/down mode.

17. The switching regulator as claimed in claim 16, wherein
    a plurality of values are set as the fixed value D' so that the fixed value D' can be selected arbitrarily from the plurality of values, and in the step-up/down mode, when the first discriminator finds the ON-duty of the first switch equal to or higher than the first threshold value, the second control circuit increases the fixed value D'.

18. The switching regulator as claimed in claim 16, wherein
when, within m cycles of switching operation of the first switch, the ON-duty of the first switch becomes equal to or higher than the first threshold value n times or more (where n is a natural number equal to or lower than m), the first discriminator determines that the ON-duty of the first switch is equal to or higher than the first threshold value.

19. The switching regulator as claimed in claim 16, wherein
the first discriminator checks whether or not the ON-duty of the first switch is equal to or higher than the first threshold value based on a signal obtained by smoothing the step-down control signal.

20. The switching regulator as claimed in claim 16, wherein
the first threshold value is equal to or smaller than a maximum value of the ON-duty of the first switch as set by the first control circuit.

21. The switching regulator as claimed in claim 16, further comprising:
a second discriminator that checks whether or not the ON-duty of the first switch is equal to or lower than a second threshold value, wherein
in the step-up/down mode, when the second discriminator finds the ON-duty of the first switch equal to or lower than the second threshold value,
a mode shift occurs from the step-up/down mode to the step-down mode, or
a plurality of values are set as the fixed value D' so that the fixed value D' can be selected arbitrarily from the plurality of values and, while the step-up/down mode is kept in effect, the second control circuit reduces the fixed value D'.

22. The switching regulator as claimed in claim 21, wherein
when, within m' cycles of switching operation of the first switch, the ON-duty of the first switch becomes equal to or lower than the second threshold value n' times or more (where n' is a natural number equal to or lower than m'), the second discriminator determines that the ON-duty of the first switch is equal to or lower than the second threshold value.

23. The switching regulator as claimed in claim 21, wherein
the second discriminator checks whether or not the ON-duty of the first switch is equal to or lower than the second threshold value based on a signal obtained by smoothing the step-down control signal.

24. The switching regulator as claimed in claim 21, wherein
the second threshold value is smaller than the first threshold value.

25. The switching regulator as claimed in claim 1, wherein
at least the first and second control circuits are accommodated in a first semiconductor package,
the third and fourth switches are accommodated in a second semiconductor package different from the first semiconductor package, and
a signal for driving the third and fourth switches is fed from an output terminal of the first semiconductor package to an input terminal of to second semiconductor package.

26. A switching regulator comprising the first semiconductor package as recited in claim 25, wherein
when the output terminal of the first semiconductor package is connected directly, or via a resistor, to a ground, a supply power, or a fixed potential node, at least one of the first and second control circuits accommodated in the first semiconductor package determines that the input terminal of the second semiconductor package as recited in claim 25 is not connected to the output terminal of the first semiconductor package, and
when the input terminal of the second semiconductor package is detected not being connected to the output terminal of the first semiconductor package, the first and second control circuits accommodated in the first semiconductor package perform only step-down operation.

27. A switching regulator for generating an output voltage from an input voltage, the switching regulator comprising:
a first switch of which a first end is connected to a first application terminal to which the input voltage is applied;
a second switch of which a first end is connected to a second end of the first switch and of which a second end is connected to a second application terminal to which a predetermined voltage lower than the input voltage is applied;
an inductor of which a first end is connected to a connection node between the first and second switches;
a third switch of which a first end is connected to a second end of the inductor and of which a second end is connected to the second application terminal;
a fourth switch of which a first end is connected to a connection node between the inductor and the third switch and of which a second end is connected to a third application terminal to which the output voltage is applied;
a first control circuit that generates a step-down control signal for complementarily turning ON and OFF the first and second switches according to the output voltage; and
a second control circuit that generates a step-up control signal for complementarily turning ON and OFF the third and fourth switches while setting an ON-duty of the third switch independently of either of the output voltage and the input voltage in a step-up/down mode in which the first to fourth switches each perform switching operation.

28. A vehicle, comprising:
the switching regulator as claimed in claim 1; and
a battery that supplies the switching regulator with electric power.

29. A vehicle, comprising:
the switching regulator as claimed in claim 26; and
a battery that supplies the switching regulator with electric power.

30. A vehicle, comprising:
the switching regulator as claimed in claim 27; and
a battery that supplies the switching regulator with electric power.

* * * * *

UNITED STATES PATENT AND TRADEMARK OFFICE
CERTIFICATE OF CORRECTION

PATENT NO. : 10,355,589 B2
APPLICATION NO. : 15/133384
DATED : July 16, 2019
INVENTOR(S) : Tetsuo Tateishi et al.

It is certified that error appears in the above-identified patent and that said Letters Patent is hereby corrected as shown below:

On the Title Page

Item (22), delete, "Jun. 28, 2016" and insert --April 20, 2016--.

Signed and Sealed this
Twenty-first Day of January, 2020

Andrei Iancu
*Director of the United States Patent and Trademark Office*